United States Patent
Sharma et al.

(10) Patent No.: US 12,143,798 B2
(45) Date of Patent: Nov. 12, 2024

(54) MULTI-CHANNEL SPEECH COMPRESSION SYSTEM AND METHOD

(71) Applicant: Microsoft Technology Licensing, LLC, Redmond, WA (US)

(72) Inventors: Dushyant Sharma, Mountain House, CA (US); Patrick A. Naylor, Reading (GB); Uwe Helmut Jost, Groton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 17/669,534

(22) Filed: Feb. 11, 2022

(65) Prior Publication Data

US 2022/0256303 A1 Aug. 11, 2022

Related U.S. Application Data

(60) Provisional application No. 63/148,427, filed on Feb. 11, 2021, provisional application No. 63/183,848, filed on May 4, 2021.

(51) Int. Cl.
*H04S 7/00* (2006.01)
*G06T 7/70* (2017.01)
(Continued)

(52) U.S. Cl.
CPC .............. *H04S 7/30* (2013.01); *G06T 7/70* (2017.01); *G10L 15/063* (2013.01); *G10L 15/22* (2013.01);
(Continued)

(58) Field of Classification Search
CPC ........ H04S 7/30; H04S 3/008; H04S 2400/01; H04S 2400/15; H04R 1/406; H04R 3/005; H04R 5/027; H04R 2201/401; G06T 7/70; G10L 15/063; G10L 15/22; G10L 19/008; G10L 19/167; G10L 21/0208;
(Continued)

(56) References Cited

U.S. PATENT DOCUMENTS

| 5,444,816 A | 8/1995 | Adoul et al. |
| 6,707,918 B1 | 3/2004 | Mcgrath et al. |

(Continued)

FOREIGN PATENT DOCUMENTS

WO    2021071498 A1    4/2021

OTHER PUBLICATIONS

"Non Final Office Action Issued in U.S. Appl. No. 17/669,592", Mailed Date: Apr. 12, 2023, 18 Pages.

(Continued)

*Primary Examiner* — William A Jerez Lora
(74) *Attorney, Agent, or Firm* — Brian J. Colandreo; Heath M. Sargeant; Holland & Knight LLP

(57) ABSTRACT

A method, computer program product, and computing system for generating a plurality of acoustic relative transfer functions associated with a plurality of audio acquisition devices of an audio recording system deployed in an acoustic environment. At least a pair of the plurality of acoustic relative transfer functions from time frames may be compared. A change in the acoustic environment may be detected based upon, at least in part, the comparison of the plurality of acoustic relative transfer functions from at least the pair of time frames.

15 Claims, 17 Drawing Sheets

FIG. 1

(51) Int. Cl.
  *G10L 15/06* (2013.01)
  *G10L 15/22* (2006.01)
  *G10L 19/008* (2013.01)
  *G10L 19/16* (2013.01)
  *G10L 21/0208* (2013.01)
  *H04R 1/40* (2006.01)
  *H04R 3/00* (2006.01)
  *H04R 5/027* (2006.01)
  *H04S 3/00* (2006.01)
  *G10L 19/00* (2013.01)
  *G10L 21/0216* (2013.01)

(52) U.S. Cl.
  CPC .......... *G10L 19/008* (2013.01); *G10L 19/167* (2013.01); *G10L 21/0208* (2013.01); *H04R 1/406* (2013.01); *H04R 3/005* (2013.01); *H04R 5/027* (2013.01); *H04S 3/008* (2013.01); *G10L 2019/0001* (2013.01); *G10L 2019/0002* (2013.01); *G10L 2021/02166* (2013.01); *H04R 2201/401* (2013.01); *H04S 2400/01* (2013.01); *H04S 2400/15* (2013.01)

(58) Field of Classification Search
  CPC ..... G10L 2019/0001; G10L 2019/0002; G10L 2021/02166
  USPC .......................................... 381/1, 56, 58, 124
  See application file for complete search history.

(56) References Cited

U.S. PATENT DOCUMENTS

| | | | |
|---|---|---|---|
| RE40,054 E | 2/2008 | Girod | |
| 9,992,587 B2 | 6/2018 | Farmani et al. | |
| 10,219,083 B2 | 2/2019 | Farmani et al. | |
| 10,373,612 B2 | 8/2019 | Parthasarathi et al. | |
| 10,390,171 B2 | 8/2019 | Lee et al. | |
| 10,598,543 B1 | 3/2020 | Mansour et al. | |
| 2006/0217977 A1 | 9/2006 | Gaeta | |
| 2010/0324890 A1 | 12/2010 | Adeney | |
| 2012/0163606 A1 | 6/2012 | Eronen et al. | |
| 2013/0022189 A1 | 1/2013 | Ganong, III et al. | |
| 2013/0151249 A1 | 6/2013 | Nakadai et al. | |
| 2013/0162821 A1* | 6/2013 | Park ................ | G08B 13/19697 381/56 |
| 2013/0253923 A1 | 9/2013 | Mustiere | |
| 2013/0287225 A1 | 10/2013 | Niwa et al. | |
| 2015/0189455 A1 | 7/2015 | Donaldson | |
| 2017/0353789 A1 | 12/2017 | Kim et al. | |
| 2018/0007488 A1 | 1/2018 | Horowitz et al. | |
| 2018/0255418 A1 | 9/2018 | Tzirkel-Hancock | |
| 2018/0262849 A1 | 9/2018 | Farmani et al. | |
| 2018/0359596 A1 | 12/2018 | Breebaart et al. | |
| 2019/0122686 A1 | 4/2019 | Slapak | |
| 2019/0172450 A1 | 6/2019 | Mustiere et al. | |
| 2019/0208351 A1 | 7/2019 | Lyren et al. | |
| 2019/0212441 A1 | 7/2019 | Casner et al. | |
| 2019/0219660 A1 | 7/2019 | Cordourier Maruri et al. | |
| 2019/0311730 A1* | 10/2019 | Looney ................ | G10L 25/90 |
| 2019/0355380 A1 | 11/2019 | Hatfield | |
| 2019/0394564 A1 | 12/2019 | Mehra et al. | |
| 2019/0394565 A1* | 12/2019 | Mehra ................ | G06T 7/90 |
| 2020/0035231 A1 | 1/2020 | Parthasarathi et al. | |
| 2020/0051565 A1 | 2/2020 | Singh | |
| 2020/0058310 A1 | 2/2020 | Goodwin | |
| 2020/0077185 A1 | 3/2020 | Nakadai et al. | |
| 2020/0118547 A1 | 4/2020 | Weng et al. | |
| 2020/0304933 A1 | 9/2020 | Lien et al. | |
| 2020/0342857 A1 | 10/2020 | Moreno et al. | |
| 2020/0372897 A1 | 11/2020 | Battenberg et al. | |
| 2020/0374646 A1 | 11/2020 | Lee et al. | |
| 2020/0395003 A1 | 12/2020 | Sharma et al. | |
| 2020/0410045 A1 | 12/2020 | Vozila et al. | |
| 2021/0076150 A1 | 3/2021 | Ithapu et al. | |
| 2021/0158086 A1 | 5/2021 | Salamon | |
| 2021/0160605 A1 | 5/2021 | Igarashi | |
| 2021/0211829 A1 | 7/2021 | Riggs et al. | |
| 2021/0235213 A1 | 7/2021 | Lee | |
| 2022/0254356 A1 | 8/2022 | Sharma et al. | |
| 2022/0254357 A1 | 8/2022 | Sharma et al. | |
| 2022/0254358 A1 | 8/2022 | Sharma et al. | |
| 2022/0254359 A1 | 8/2022 | Sharma et al. | |
| 2022/0254360 A1 | 8/2022 | Sharma et al. | |
| 2022/0254361 A1 | 8/2022 | Sharma et al. | |

OTHER PUBLICATIONS

"Non Final Office Action Issued in U.S. Appl. No. 17/669,592", Mailed Date: May 4, 2023, 20 Pages.

Laufer, et al., "Relative Transfer Function Modeling for Supervised Source Localization", In Proceedings of IEEE Workshop on Applications of Signal Processing to Audio and Acoustics, Oct. 20, 2013, 4 Pages.

"International Search Report and Written Opinion Issued in PCT Application No. PCT/US22/016021", Mailed Date: Jun. 22, 2022, 8 Pages.

"International Search Report and Written Opinion Issued in PCT Application No. PCT/US22/016024", Mailed Date: May 12, 2022, 11 Pages.

"International Search Report and Written Opinion Issued in PCT Application No. PCT/US22/016027", Mailed Date: May 26, 2022, 9 Pages.

"International Search Report and Written Opinion Issued in PCT Application No. PCT/US22/016030", Mailed Date: May 12, 2022, 9 Pages.

"International Search Report and Written Opinion Issued in PCT Application No. PCT/US22/016032", Mailed Date: Jul. 5, 2022, 11 Pages.

"International Search Report and Written Opinion Issued in PCT Application No. PCT/US22/016033", Mailed Date: Jun. 8, 2022, 11 Pages.

"International Search Report and Written Opinion Issued in PCT Application No. PCT/US22/016034", Mailed Date: Jun. 3, 2022, 10 Pages.

"Non Final Office Action Issued in U.S. Appl. No. 17/669,574", Mailed Date: Aug. 11, 2023, 10 Pages.

"Notice of Allowance Issued in U.S. Appl. No. 17/669,549", Mailed Date: Aug. 29, 2023, 7 Pages.

"Final Office Action Issued in U.S. Appl. No. 17/669,592", Mailed Date: Sep. 26, 2023, 22 Pages.

"Notice of Allowance Issued in U.S. Appl. No. 17/669,574", Mailed Date: Nov. 27, 2023, 8 Pages.

Non-Final Office Action mailed on Jan. 4, 2024, in U.S. Appl. No. 17/669,567, 11 pages.

Notice of Allowance mailed on Jan. 3, 2024, in U.S. Appl. No. 17/669,574, 2 pages.

Notice of Allowance mailed on Jan. 17, 2024, in U.S. Appl. No. 17/669,592, 12 pages.

Notice of Allowance mailed on Feb. 5, 2024, in U.S. Appl. No. 17/669,574, 2 pages.

Non-Final office Action mailed on Mar. 18, 2024, in U.S. Appl. No. 17/669,599, 9 pages.

Hu, et al., "Semi-Supervised Multiple Source Localization Using Relative Harmonic Coefficients Under Noisy and Reverberant Environments", IEEE/ACM Transactions on Audio, Speech, and Language Processing, vol. 28, 2020, pp. 3108-3123.

Non-Final Office Action mailed on Apr. 11, 2024, in U.S. Appl. No. 17/669,560, 16 pages.

Opochinsky, et al., "Deep-Ranking Based Sound Source Localization", IEEE Workshop on Applications of Signal Processing to Audio and Acoustics, Oct. 2019, 5 pages.

U.S. Appl. No. 17/669,549, filed Feb. 11, 2022.
U.S. Appl. No. 17/669,560, filed Feb. 11, 2022.
U.S. Appl. No. 17/669,567, filed Feb. 11, 2022.
U.S. Appl. No. 17/669,574, filed Feb. 11, 2022.
U.S. Appl. No. 17/669,592, filed Feb. 11, 2022.
U.S. Appl. No. 17/669,599, filed Feb. 11, 2022.

(56) References Cited

OTHER PUBLICATIONS

Notice of Allowance mailed on May 22, 2024, in U.S. Appl. No. 17/669,567 8 pages.

* cited by examiner

MULTI-CHANNEL SPEECH COMPRESSION SYSTEM AND METHOD

RELATED APPLICATION(S)

This application claims the benefit of the following U.S. Provisional Application No. 63/148,427 filed on 11 Feb. 2021, the contents of which are all incorporated herein by reference.

BACKGROUND

Automated Cooperative Documentation (ACD) may be used, e.g., to turn transcribed conversational (e.g., physician, patient, and/or other participants such as patient's family members, nurses, physician assistants, etc.) speech into formatted (e.g., medical) reports. Such reports may be reviewed, e.g., to assure accuracy of the reports by the physician, scribe, etc.

To improve the speech processing of ACD, various audio recording devices and various computing devices may be utilized. For example, front-end systems (e.g., computing devices coupled to audio recording devices) may perform certain speech processing tasks and may transmit the speech signals to a back-end system (e.g., a server or cloud-based system) configured to perform more advanced or computationally expensive tasks. Additionally, the use of multi-channel signals from multiple audio recording devices may further reduce the processing capabilities of front-end devices, requiring more speech processing by the back-end system. As such, the lack of sufficient bandwidth to transmit all the raw audio recording device channels may limit the efficiency of multi-channel speech processing systems.

SUMMARY OF DISCLOSURE

In one implementation, a computer-implemented method executed by a computer may include but is not limited to generating a plurality of acoustic relative transfer functions associated with a plurality of audio acquisition devices of an audio recording system deployed in an acoustic environment. At least a pair of the plurality of acoustic relative transfer functions from time frames may be compared. A change in the acoustic environment may be detected based upon, at least in part, the comparison of the plurality of acoustic relative transfer functions from at least the pair of time frames.

One or more of the following features may be included. The plurality of audio acquisition devices of the audio recording system may be positioned within a fixed geometry relative to each other. Detecting a change in the acoustic environment based upon, at least in part, the comparison of the plurality of acoustic relative transfer functions from at least the pair of time frames may include determining at least a threshold change in the acoustic relative transfer functions between the at least a pair of time frames. A machine learning model may be trained to output a change classification based upon, at least in part, the plurality of acoustic relative transfer functions from at least the pair of time frames. Detecting a change in the acoustic environment based upon, at least in part, the comparison of the plurality of acoustic relative transfer functions from at least the pair of time frames may include detecting the change in the acoustic environment using the trained machine learning model. Generating a plurality of acoustic relative transfer functions associated with a plurality of audio acquisition devices of an audio recording system deployed in an acoustic environment may include generating a plurality of residual signals associated with the plurality of audio acquisition devices based upon, at least in part, the acoustic relative transfer functions for each audio acquisition device of the plurality of audio acquisition devices. Detecting a change in the acoustic environment based upon, at least in part, the comparison of at least the pair of time frames from the plurality of acoustic relative transfer functions may include: comparing the plurality of residual signals from at least a pair of time frames; and detecting a change in the acoustic environment based upon, at least in part, the comparison of the plurality of residual signals from at least the pair of time frames.

In another implementation, a computer program product resides on a computer readable medium and has a plurality of instructions stored on it. When executed by a processor, the instructions cause the processor to perform operations including but not limited to generating a plurality of acoustic relative transfer functions associated with a plurality of audio acquisition devices of an audio recording system deployed in an acoustic environment. At least a pair of the plurality of acoustic relative transfer functions from time frames may be compared. A change in the acoustic environment may be detected based upon, at least in part, the comparison of the plurality of acoustic relative transfer functions from at least the pair of time frames.

One or more of the following features may be included. The plurality of audio acquisition devices of the audio recording system may be positioned within a fixed geometry relative to each other. Detecting a change in the acoustic environment based upon, at least in part, the comparison of the plurality of acoustic relative transfer functions from at least the pair of time frames may include determining at least a threshold change in the acoustic relative transfer functions between the at least a pair of time frames. A machine learning model may be trained to output a change classification based upon, at least in part, the plurality of acoustic relative transfer functions from at least the pair of time frames. Detecting a change in the acoustic environment based upon, at least in part, the comparison of the plurality of acoustic relative transfer functions from at least the pair of time frames may include detecting the change in the acoustic environment using the trained machine learning model. Generating a plurality of acoustic relative transfer functions associated with a plurality of audio acquisition devices of an audio recording system deployed in an acoustic environment may include generating a plurality of residual signals associated with the plurality of audio acquisition devices based upon, at least in part, the acoustic relative transfer functions for each audio acquisition device of the plurality of audio acquisition devices. Detecting a change in the acoustic environment based upon, at least in part, the comparison of at least the pair of time frames from the plurality of acoustic relative transfer functions may include: comparing the plurality of residual signals from at least a pair of time frames; and detecting a change in the acoustic environment based upon, at least in part, the comparison of the plurality of residual signals from at least the pair of time frames.

In another implementation, a computing system includes a processor and memory is configured to perform operations including but not limited to, generating a plurality of acoustic relative transfer functions associated with a plurality of audio acquisition devices of an audio recording system deployed in an acoustic environment. At least a pair of the plurality of acoustic relative transfer functions from time frames may be compared. A change in the acoustic environment may be detected based upon, at least in part, the comparison of the plurality of acoustic relative transfer functions from at least the pair of time frames.

One or more of the following features may be included. The plurality of audio acquisition devices of the audio recording system may be positioned within a fixed geometry relative to each other. Detecting a change in the acoustic environment based upon, at least in part, the comparison of the plurality of acoustic relative transfer functions from at least the pair of time frames may include determining at least a threshold change in the acoustic relative transfer functions between the at least a pair of time frames. A machine learning model may be trained to output a change classification based upon, at least in part, the plurality of acoustic relative transfer functions from at least the pair of time frames. Detecting a change in the acoustic environment based upon, at least in part, the comparison of the plurality of acoustic relative transfer functions from at least the pair of time frames may include detecting the change in the acoustic environment using the trained machine learning model. Generating a plurality of acoustic relative transfer functions associated with a plurality of audio acquisition devices of an audio recording system deployed in an acoustic environment may include generating a plurality of residual signals associated with the plurality of audio acquisition devices based upon, at least in part, the acoustic relative transfer functions for each audio acquisition device of the plurality of audio acquisition devices. Detecting a change in the acoustic environment based upon, at least in part, the comparison of at least the pair of time frames from the plurality of acoustic relative transfer functions may include: comparing the plurality of residual signals from at least a pair of time frames; and detecting a change in the acoustic environment based upon, at least in part, the comparison of the plurality of residual signals from at least the pair of time frames.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
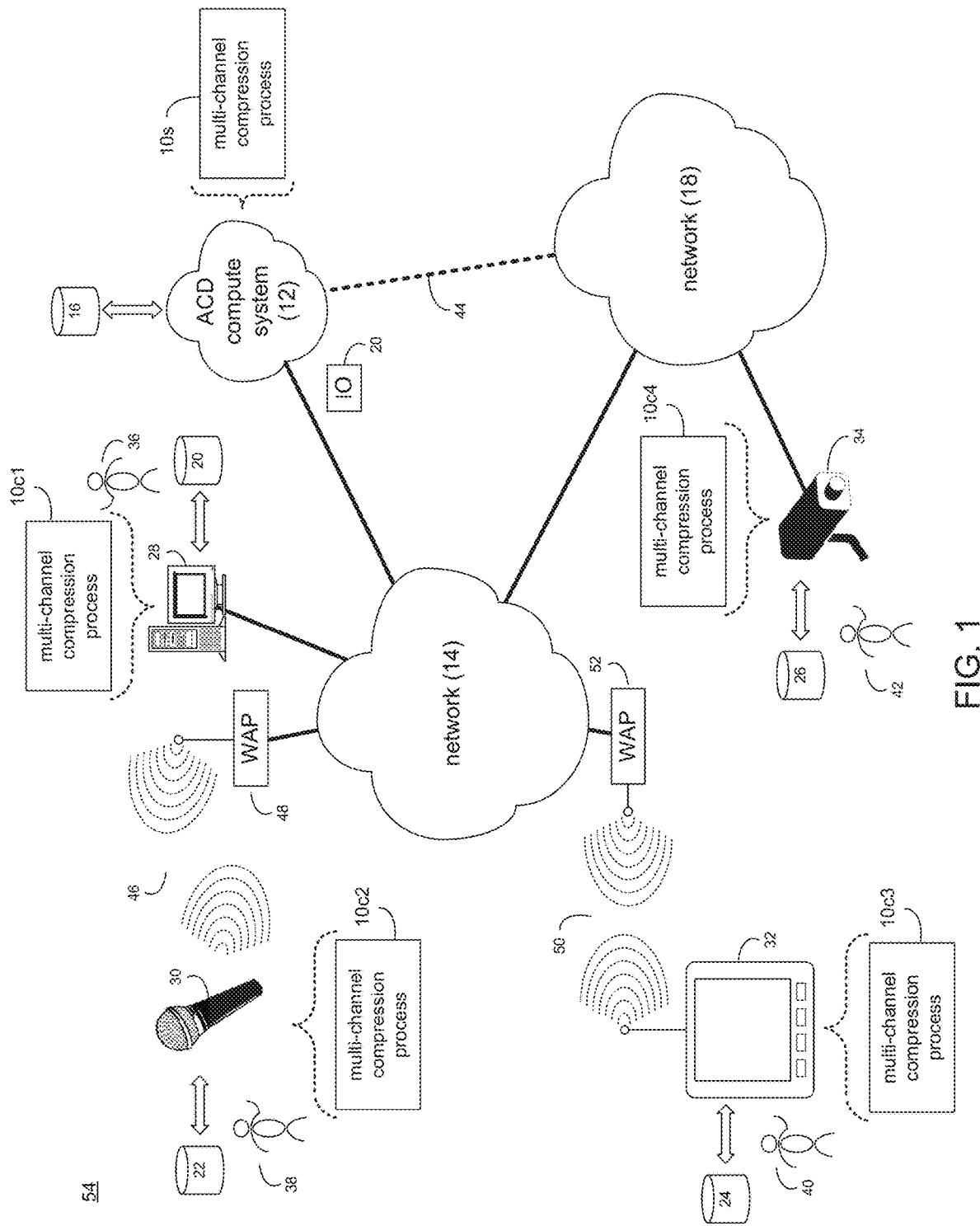
FIG. 1 is a diagrammatic view of an automated cooperative documentation computer system and a multi-channel compression process coupled to a distributed computing network.

System Overview:

Referring to FIG. 1, there is shown multi-channel compression process 10. As will be discussed below in greater detail, multi-channel compression process 10 may be configured to automate the collection and processing of cooperative encounter information to generate/store/distribute medical records.

Multi-channel compression process 10 may be implemented as a server-side process, a client-side process, or a hybrid server-side/client-side process. For example, multi-channel compression process 10 may be implemented as a purely server-side process via multi-channel compression process 10$s$. Alternatively, multi-channel compression process 10 may be implemented as a purely client-side process via one or more of multi-channel compression process 10$c1$, multi-channel compression process 10$c2$, multi-channel compression process 10$c3$, and multi-channel compression process 10$c4$. Alternatively still, multi-channel compression process 10 may be implemented as a hybrid server-side/client-side process via multi-channel compression process 10$s$ in combination with one or more of multi-channel compression process 10$c1$, multi-channel compression process 10$c2$, multi-channel compression process 10$c3$, and multi-channel compression process 10$c4$.

Accordingly, multi-channel compression process 10 as used in this disclosure may include any combination of multi-channel compression process 10$s$, multi-channel compression process 10$c1$, multi-channel compression process 10$c2$, multi-channel compression process 10$c3$, and multi-channel compression process 10$c4$.

Multi-channel compression process 10$s$ may be a server application and may reside on and may be executed by automated cooperative documentation (ACD) computer system 12, which may be connected to network 14 (e.g., the Internet or a local area network). ACD computer system 12 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

As is known in the art, a SAN may include one or more of a personal computer, a server computer, a series of server computers, a mini computer, a mainframe computer, a RAID device and a NAS system. The various components of ACD computer system 12 may execute one or more operating systems, examples of which may include but are not limited to: Microsoft Windows Server™; Redhat Linux™, Unix, or a custom operating system, for example.

The instruction sets and subroutines of multi-channel compression process 10s, which may be stored on storage device 16 coupled to ACD computer system 12, may be executed by one or more processors (not shown) and one or more memory architectures (not shown) included within ACD computer system 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from multi-channel compression process 10s, multi-channel compression process 10c1, multi-channel compression process 10c2, multi-channel compression process 10c3 and/or multi-channel compression process 10c4 to ACD computer system 12. Examples of IO request 20 may include but are not limited to data write requests (i.e. a request that content be written to ACD computer system 12) and data read requests (i.e. a request that content be read from ACD computer system 12).

The instruction sets and subroutines of multi-channel compression process 10c1, multi-channel compression process 10c2, multi-channel compression process 10c3 and/or multi-channel compression process 10c4, which may be stored on storage devices 20, 22, 24, 26 (respectively) coupled to ACD client electronic devices 28, 30, 32, 34 (respectively), may be executed by one or more processors (not shown) and one or more memory architectures (not shown) incorporated into ACD client electronic devices 28, 30, 32, 34 (respectively). Storage devices 20, 22, 24, 26 may include but are not limited to: hard disk drives; optical drives; RAID devices; random access memories (RAM); read-only memories (ROM), and all forms of flash memory storage devices. Examples of ACD client electronic devices 28, 30, 32, 34 may include, but are not limited to, personal computing device 28 (e.g., a smart phone, a personal digital assistant, a laptop computer, a notebook computer, and a desktop computer), audio input device 30 (e.g., a handheld microphone, a lapel microphone, an embedded microphone (such as those embedded within eyeglasses, smart phones, tablet computers and/or watches) and an audio recording device), display device 32 (e.g., a tablet computer, a computer monitor, and a smart television), machine vision input device 34 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 36, 38, 40, 42 may access ACD computer system 12 directly through network 14 or through secondary network 18. Further, ACD computer system 12 may be connected to network 14 through secondary network 18, as illustrated with link line 44.

The various ACD client electronic devices (e.g., ACD client electronic devices 28, 30, 32, 34) may be directly or indirectly coupled to network 14 (or network 18). For example, personal computing device 28 is shown directly coupled to network 14 via a hardwired network connection. Further, machine vision input device 34 is shown directly coupled to network 18 via a hardwired network connection. Audio input device 30 is shown wirelessly coupled to network 14 via wireless communication channel 46 established between audio input device 30 and wireless access point (i.e., WAP) 48, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between audio input device 30 and WAP 48. Display device 32 is shown wirelessly coupled to network 14 via wireless communication channel 50 established between display device 32 and WAP 52, which is shown directly coupled to network 14.

The various ACD client electronic devices (e.g., ACD client electronic devices 28, 30, 32, 34) may each execute an operating system, examples of which may include but are not limited to Microsoft Windows™, Apple Macintosh™, Redhat Linux™, or a custom operating system, wherein the combination of the various ACD client electronic devices (e.g., ACD client electronic devices 28, 30, 32, 34) and ACD computer system 12 may form modular ACD system 54.

Figure 2:
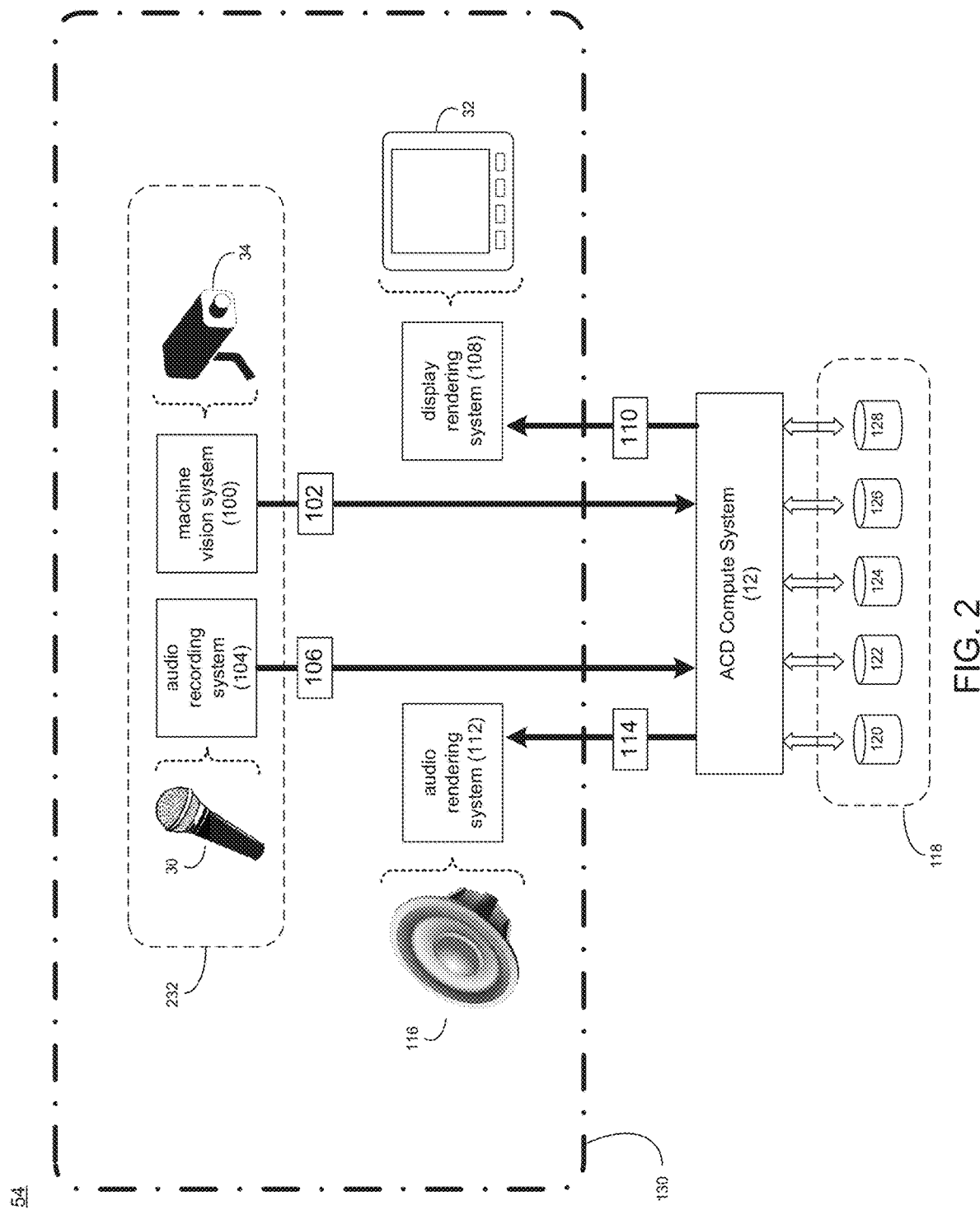
FIGS. 2-3 are diagrammatic views of a modular ACD system according to various implementations of the multi-channel compression process of FIG. 1.

Referring also to FIG. 2, there is shown a simplified example embodiment of modular ACD system 54 that is configured to automate cooperative documentation. Modular ACD system 54 may include: machine vision system 100 configured to obtain machine vision encounter information 102 concerning a patient encounter; audio recording system 104 configured to obtain audio encounter information 106 concerning the patient encounter; and a computer system (e.g., ACD computer system 12) configured to receive machine vision encounter information 102 and audio encounter information 106 from machine vision system 100 and audio recording system 104 (respectively). Modular ACD system 54 may also include: display rendering system 108 configured to render visual information 110; and audio rendering system 112 configured to render audio information 114, wherein ACD computer system 12 may be configured to provide visual information 110 and audio information 114 to display rendering system 108 and audio rendering system 112 (respectively).

Example of machine vision system 100 may include but are not limited to: one or more ACD client electronic devices (e.g., ACD client electronic device 34, examples of which may include but are not limited to an RGB imaging system, an infrared imaging system, a ultraviolet imaging system, a laser imaging system, a SONAR imaging system, a RADAR imaging system, and a thermal imaging system). Examples of audio recording system 104 may include but are not limited to: one or more ACD client electronic devices (e.g., ACD client electronic device 30, examples of which may include but are not limited to a handheld microphone, a lapel microphone, an embedded microphone (such as those embedded within eyeglasses, smart phones, tablet computers and/or watches) and an audio recording device). Examples of display rendering system 108 may include but are not limited to: one or more ACD client electronic devices (e.g., ACD client electronic device 32, examples of which may include but are not limited to a tablet computer, a computer monitor, and a smart television). Examples of audio rendering system 112 may include but are not limited to: one or more ACD client electronic devices (e.g., audio rendering device 116, examples of which may include but are not limited to a speaker system, a headphone system, and an earbud system).

As will be discussed below in greater detail, ACD computer system 12 may be configured to access one or more datasources 118 (e.g., plurality of individual datasources 120, 122, 124, 126, 128), examples of which may include but are not limited to one or more of a user profile datasource, a voice print datasource, a voice characteristics datasource (e.g., for adapting the automated speech recognition models), a face print datasource, a humanoid shape datasource, an utterance identifier datasource, a wearable token identifier datasource, an interaction identifier datasource, a medical conditions symptoms datasource, a prescriptions compatibility datasource, a medical insurance coverage datasource, and a home healthcare datasource. While in this particular example, five different examples of datasources 118, are shown, this is for illustrative purposes only and is not intended to be a limitation of this disclosure, as other configurations are possible and are considered to be within the scope of this disclosure.

As will be discussed below in greater detail, modular ACD system 54 may be configured to monitor a monitored space (e.g., monitored space 130) in a clinical environment, wherein examples of this clinical environment may include but are not limited to: a doctor's office, a medical facility, a medical practice, a medical lab, an urgent care facility, a medical clinic, an emergency room, an operating room, a hospital, a long term care facility, a rehabilitation facility, a nursing home, and a hospice facility. Accordingly, an example of the above-referenced patient encounter may include but is not limited to a patient visiting one or more of the above-described clinical environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility).

Machine vision system 100 may include a plurality of discrete machine vision systems when the above-described clinical environment is larger or a higher level of resolution is desired. As discussed above, examples of machine vision system 100 may include but are not limited to: one or more ACD client electronic devices (e.g., ACD client electronic device 34, examples of which may include but are not limited to an RGB imaging system, an infrared imaging system, an ultraviolet imaging system, a laser imaging system, a SONAR imaging system, a RADAR imaging system, and a thermal imaging system). Accordingly, machine vision system 100 may include one or more of each of an RGB imaging system, an infrared imaging systems, an ultraviolet imaging systems, a laser imaging system, a SONAR imaging system, a RADAR imaging system, and a thermal imaging system.

Audio recording system 104 may include a plurality of discrete audio recording systems when the above-described clinical environment is larger or a higher level of resolution is desired. As discussed above, examples of audio recording system 104 may include but are not limited to: one or more ACD client electronic devices (e.g., ACD client electronic device 30, examples of which may include but are not limited to a handheld microphone, a lapel microphone, an embedded microphone (such as those embedded within eyeglasses, smart phones, tablet computers and/or watches) and an audio recording device). Accordingly, audio recording system 104 may include one or more of each of a handheld microphone, a lapel microphone, an embedded microphone (such as those embedded within eyeglasses, smart phones, tablet computers and/or watches) and an audio recording device.

Display rendering system 108 may include a plurality of discrete display rendering systems when the above-described clinical environment is larger or a higher level of resolution is desired. As discussed above, examples of display rendering system 108 may include but are not limited to: one or more ACD client electronic devices (e.g., ACD client electronic device 32, examples of which may include but are not limited to a tablet computer, a computer monitor, and a smart television). Accordingly, display rendering system 108 may include one or more of each of a tablet computer, a computer monitor, and a smart television.

Audio rendering system 112 may include a plurality of discrete audio rendering systems when the above-described clinical environment is larger or a higher level of resolution is desired. As discussed above, examples of audio rendering system 112 may include but are not limited to: one or more ACD client electronic devices (e.g., audio rendering device 116, examples of which may include but are not limited to a speaker system, a headphone system, or an earbud system). Accordingly, audio rendering system 112 may include one or more of each of a speaker system, a headphone system, or an earbud system.

ACD computer system 12 may include a plurality of discrete computer systems. As discussed above, ACD computer system 12 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform. Accordingly, ACD computer system 12 may include one or more of each of a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

Figure 3:
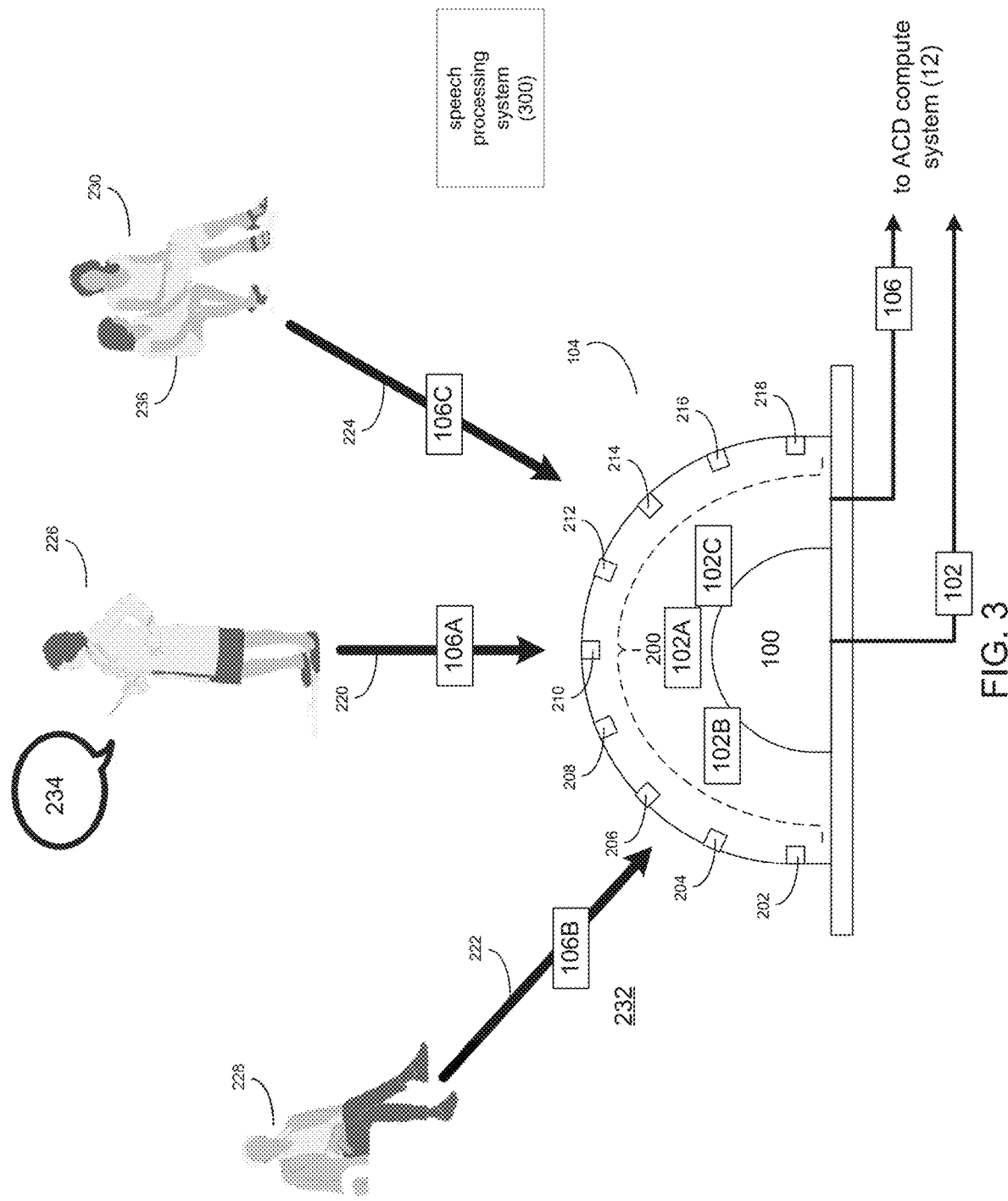

Referring also to FIG. 3, audio recording system 104 may include directional microphone array 200 having a plurality of discrete microphone assemblies. For example, audio recording system 104 may include a plurality of discrete audio acquisition devices (e.g., audio acquisition devices 202, 204, 206, 208, 210, 212, 214, 216, 218) that may form microphone array 200. As will be discussed below in greater detail, modular ACD system 54 may be configured to form one or more audio recording beams (e.g., audio recording beams 220, 222, 224) via the discrete audio acquisition devices (e.g., audio acquisition devices 202, 204, 206, 208, 210, 212, 214, 216, 218) included within audio recording system 104.

For example, modular ACD system 54 may be further configured to steer the one or more audio recording beams (e.g., audio recording beams 220, 222, 224) toward one or more encounter participants (e.g., encounter participants 226, 228, 230) of the above-described patient encounter. Examples of the encounter participants (e.g., encounter participants 226, 228, 230) may include but are not limited to: medical professionals (e.g., doctors, nurses, physician's assistants, lab technicians, physical therapists, scribes (e.g., a transcriptionist) and/or staff members involved in the patient encounter), patients (e.g., people that are visiting the above-described clinical environments for the patient encounter), and third parties (e.g., friends of the patient, relatives of the patient and/or acquaintances of the patient that are involved in the patient encounter).

Accordingly, modular ACD system 54 and/or audio recording system 104 may be configured to utilize one or more of the discrete audio acquisition devices (e.g., audio acquisition devices 202, 204, 206, 208, 210, 212, 214, 216, 218) to form an audio recording beam. For example, modular ACD system 54 and/or audio recording system 104 may be configured to utilize audio acquisition device 210 to form audio recording beam 220, thus enabling the capturing of audio (e.g., speech) produced by encounter participant 226 (as audio acquisition device 210 is pointed to (i.e., directed toward) encounter participant 226). Additionally, modular ACD system 54 and/or audio recording system 104 may be configured to utilize audio acquisition devices 204, 206 to form audio recording beam 222, thus enabling the capturing of audio (e.g., speech) produced by encounter participant 228 (as audio acquisition devices 204, 206 are pointed to (i.e., directed toward) encounter participant 228). Additionally, modular ACD system 54 and/or audio recording system 104 may be configured to utilize audio acquisition devices 212, 214 to form audio recording beam 224, thus enabling the capturing of audio (e.g., speech) produced by encounter participant 230 (as audio acquisition devices 212, 214 are pointed to (i.e., directed toward) encounter participant 230). Further, modular ACD system 54 and/or audio recording system 104 may be configured to utilize null-steering precoding to cancel interference between speakers and/or noise.

As is known in the art, null-steering precoding is a method of spatial signal processing by which a multiple antenna transmitter may null multiuser interference signals in wireless communications, wherein null-steering precoding may mitigate the impact off background noise and unknown user interference.

In particular, null-steering precoding may be a method of beamforming for narrowband signals that may compensate for delays of receiving signals from a specific source at different elements of an antenna array. In general and to improve performance of the antenna array, in incoming signals may be summed and averaged, wherein certain signals may be weighted and compensation may be made for signal delays.

Machine vision system 100 and audio recording system 104 may be stand-alone devices (as shown in FIG. 2). Additionally/alternatively, machine vision system 100 and audio recording system 104 may be combined into one package to form mixed-media ACD device 232. For example, mixed-media ACD device 232 may be configured to be mounted to a structure (e.g., a wall, a ceiling, a beam, a column) within the above-described clinical environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility), thus allowing for easy installation of the same. Further, modular ACD system 54 may be configured to include a plurality of mixed-media ACD devices (e.g., mixed-media ACD device 232) when the above-described clinical environment is larger or a higher level of resolution is desired.

Modular ACD system 54 may be further configured to steer the one or more audio recording beams (e.g., audio recording beams 220, 222, 224) toward one or more encounter participants (e.g., encounter participants 226, 228, 230) of the patient encounter based, at least in part, upon machine vision encounter information 102. As discussed above, mixed-media ACD device 232 (and machine vision system 100/audio recording system 104 included therein) may be configured to monitor one or more encounter participants (e.g., encounter participants 226, 228, 230) of a patient encounter.

Specifically, machine vision system 100 (either as a stand-alone system or as a component of mixed-media ACD device 232) may be configured to detect humanoid shapes within the above-described clinical environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility). And when these humanoid shapes are detected by machine vision system 100, modular ACD system 54 and/or audio recording system 104 may be configured to utilize one or more of the discrete audio acquisition devices (e.g., audio acquisition devices 202, 204, 206, 208, 210, 212, 214, 216, 218) to form an audio recording beam (e.g., audio recording beams 220, 222, 224) that is directed toward each of the detected humanoid shapes (e.g., encounter participants 226, 228, 230).

As discussed above, ACD computer system 12 may be configured to receive machine vision encounter information 102 and audio encounter information 106 from machine vision system 100 and audio recording system 104 (respectively); and may be configured to provide visual information 110 and audio information 114 to display rendering system 108 and audio rendering system 112 (respectively). Depending upon the manner in which modular ACD system 54 (and/or mixed-media ACD device 232) is configured, ACD computer system 12 may be included within mixed-media ACD device 232 or external to mixed-media ACD device 232.

As discussed above, ACD computer system 12 may execute all or a portion of multi-channel compression process 10, wherein the instruction sets and subroutines of multi-channel compression process 10 (which may be stored on one or more of e.g., storage devices 16, 20, 22, 24, 26) may be executed by ACD computer system 12 and/or one or more of ACD client electronic devices 28, 30, 32, 34.

The Multi-Channel Compression Process:

In some implementations consistent with the present disclosure, systems and methods may be provided for multi-channel speech compression. For example and as discussed above, various audio recording devices and various computing devices may be utilized during speech processing. Consider the example of a far field automated speech recognition ASR system where multi microphone systems are typically used at the front-end to enable signal enhancement and beamforming. It is well known that a microphone array based front-end can have great benefits for ASR, with two common approaches being popular in the art: 1) multi-channel end to end (E2E) ASR (i.e., where all available microphone channels are used in a neural E2E ASR system); and 2) beamforming (i.e., where a signal processing or neural network-based algorithm intelligently combines the multi-microphone signals in a way that the source speech is enhanced, and the interference is minimized).

Consider a distributed ASR system where the audio is acquired through a microphone array in an acoustic environment (e.g., a doctor's office) and consider that due to deployment efficiency reasons and computational limitations, the local device in the doctor's office cannot run the whole ASR pipeline nor is there sufficient bandwidth to transmit all the raw microphone signals to the back-end system. The audio is first pre-processed with some signal corrections (such as level, sample rate, etc.) and then beamformed into a single channel signal, which is then transmitted to the back-end (i.e., for consumption by the ASR and natural language understanding (NLU) and/or clinical language understanding (CLU) processing) pipeline. In this configuration, the beamforming acts also as a means of reducing the bandwidth requirements from multiple channels (e.g. from 16) down to 1 channel for transmitting a stream of data to the back-end ASR system. This processing pipeline ensures the audio is human intelligible and can also be used for ASR.

In another scenario, a multi-channel E2E ASR system could be split (i.e., where a front-end system resides on the local machine and then a bottleneck feature stream is sent to the back-end ASR to complete the ASR+NLU+CLU processing). However, in this configuration one loses the capability for humans to be able to listen to the audio and requires a great overhead in maintaining the 'front-end' neural network on many deployed devices.

As such, existing methods are not able to exploit fully the physical acoustical relationships between speech signals captured/recorded using a microphone array. As will be described in greater detail below, by utilizing the known and fixed geometric position of each audio recording device in the microphone array, the spatial information associated with the microphone signals may be used to enhance coding and compression of multi-channel speech signals.

Microphone Array Audio Compression Using Acoustic Relative Transfer Functions (RTFs)

As discussed above and referring also at least to FIG. 4-5, multi-channel compression process 10 may select 400 a reference audio acquisition device from a plurality of audio acquisition devices of an audio recording system. Audio encounter information of the reference microphone may be encoded 402, thus defining encoded reference audio encounter information. A plurality of acoustic relative transfer functions between the reference microphone and the plurality of audio acquisition devices of the audio recording system may be generated 404. The encoded reference audio encounter information and a representation of the plurality of acoustic relative transfer functions may be transmitted 406.

Referring again to FIG. 3 and in some implementations, multiple audio acquisition devices or microphone devices may be deployed in an acoustic environment. For example, an audio recording device (e.g., audio recording system 104) may deployed on a wall further away from the speaker (e.g., participant 226). The audio recording system 104 may include a microphone array 200 having a plurality of discrete microphone assemblies. For example, audio recording system 104 may include a plurality of discrete audio acquisition devices (e.g., audio acquisition devices 202, 204, 206, 208, 210, 212, 214, 216, 218) that may form microphone array 200. In some implementations, each discrete audio acquisition device (e.g., audio acquisition devices 202, 204, 206, 208, 210, 212, 214, 216, 218) may be oriented and positioned in a known and fixed geometry relative to the other audio acquisition devices within the microphone array.

Figure 4:
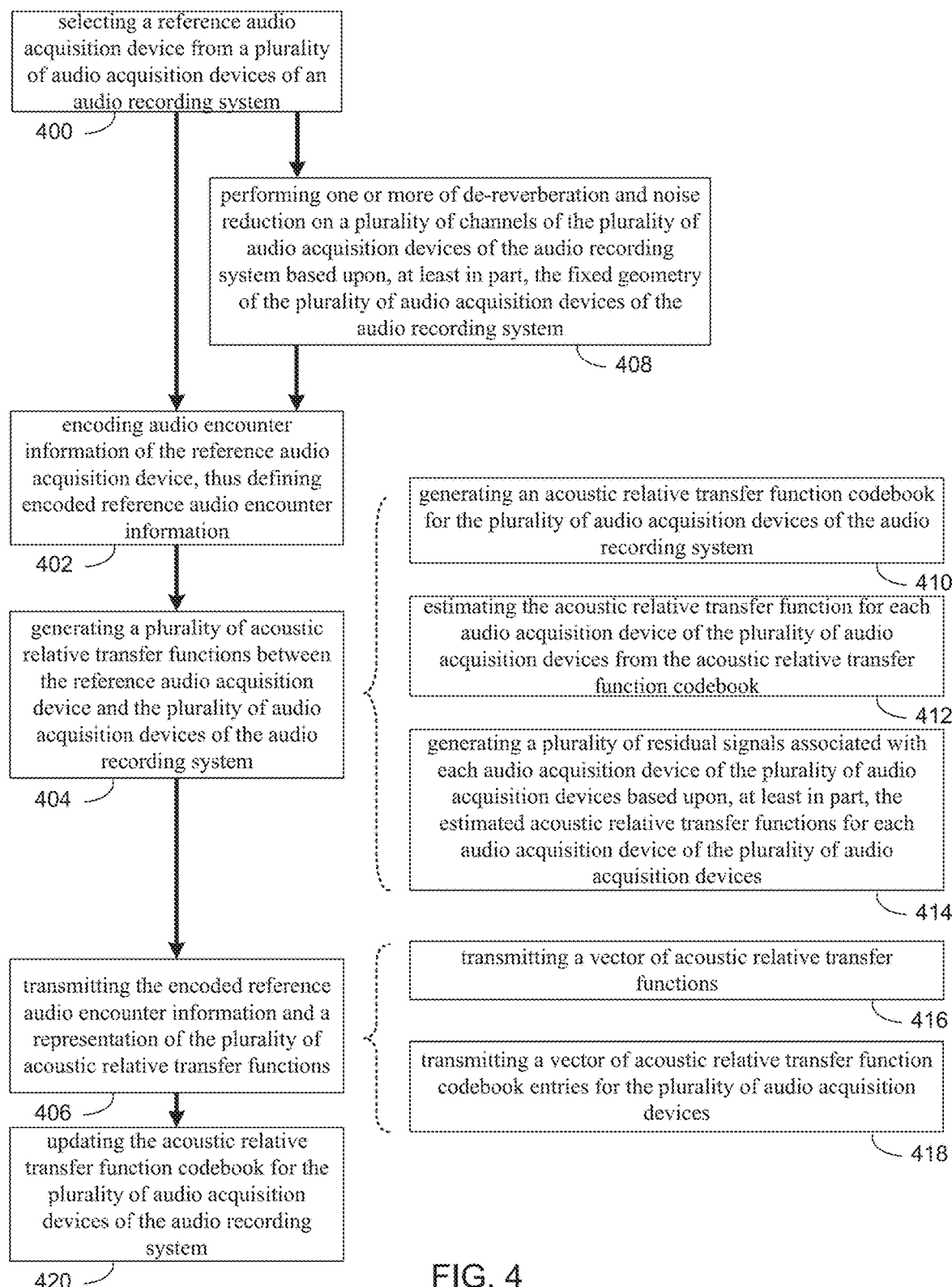
FIG. 4 is a flow chart of one implementation of the multi-channel compression process of FIG. 1.

In some implementations, multi-channel compression process 10 may obtain one or more speech signals using a plurality of audio acquisition devices or microphones from a microphone array, thus defining audio encounter information. For example and as shown in FIG. 4, multi-channel compression process 10 may obtain one or more speech signals (e.g., at least a portion of audio encounter information 106A obtained by audio recording system 104 from participant 226). As each audio acquisition device (e.g., audio acquisition devices 202, 204, 206, 208, 210, 212, 214, 216, 218) may individually receive a version of audio encounter information 106A, audio encounter information 106A may be represented as a plurality of discrete speech signals (e.g., speech signals 500, 502, 504, 506, 508, 510, 512, 514, 516). In other words, the plurality of discrete speech signals (e.g., speech signals 500, 502, 504, 506, 508, 510, 512, 514, 516) may represent audio encounter information 106A as received by each discrete audio acquisition device (e.g., audio acquisition devices 202, 204, 206, 208, 210, 212, 214, 216, 218).

In this example, suppose that audio acquisition device 202 receives speech signal 500; audio acquisition device 204 receives speech signal 502; audio acquisition device 206 receives speech signal 504; audio acquisition device 208 receives speech signal 506; audio acquisition device 210 receives speech signal 508; audio acquisition device 212 receives speech signal 510; audio acquisition device 214 receives speech signal 512; audio acquisition device 216 receives speech signal 514; and audio acquisition device 218 receives speech signal 516. Each speech signal (e.g., speech signals 500, 502, 504, 506, 508, 510, 512, 514, 516) may include certain signal characteristics (e.g., reverberation characteristics, noise characteristics, etc.) that are at least partially a function of the known and fixed geometry of the plurality of audio acquisition devices (e.g., audio acquisition devices 202, 204, 206, 208, 210, 212, 214, 216, 218) of the audio recording system (e.g., audio recording system 104). Accordingly and as will be discussed in greater detail below, multi-channel compression process 10 may utilize these signal characteristics to allow for improved speech signal encoding and compression in a multi-channel system.

Figure 6:
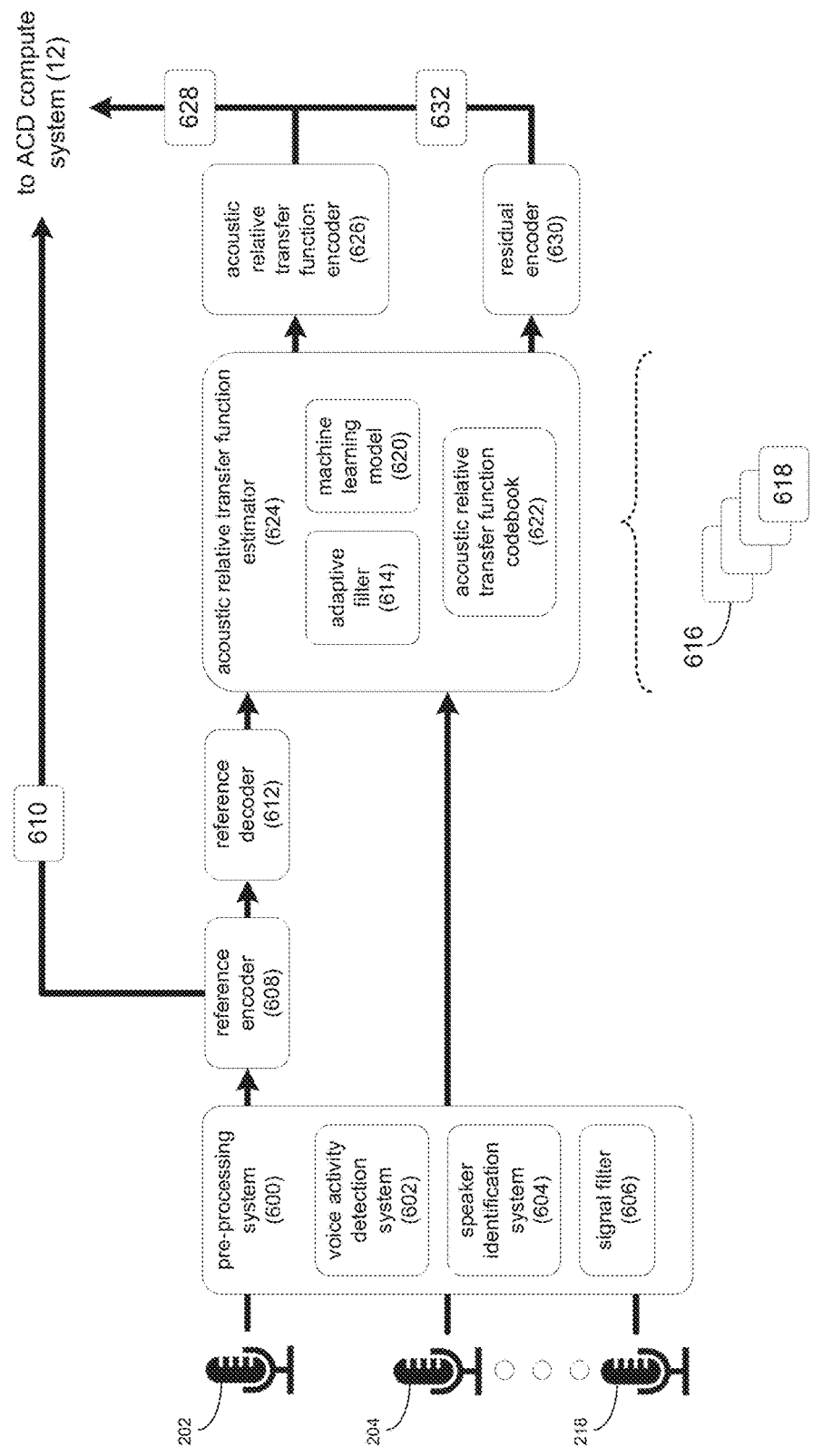

Multi-channel compression process 10 may select 400 a reference audio acquisition device from a plurality of audio acquisition devices of an audio recording system. For example, multi-channel compression process 10 may exploit the fixed and known geometry of an audio recording system where the neighboring signals differ in a manner determined by the geometry/shape of the individual audio acquisition devices. As will be discussed in greater detail below, multi-channel compression process 10 may use acoustic relative transfer functions (RTFs) that capture the relative differences in the speech signals between the discrete audio acquisition devices of an audio acquisition to compress multiple channels for back-end speech processing. Referring also to FIG. 6, multi-channel compression process 10 may select 400 a reference audio acquisition device (e.g., audio acquisition device 202) from a plurality of audio acquisition devices (e.g., audio acquisition devices 202, 204, 206, 208, 210, 212, 214, 216, 218).

Reference audio acquisition device 202 may be selected automatically by multi-channel compression process 10 and/or manually (e.g., via user input via a graphical user interface). For example, multi-channel compression process 10 may select 400 reference audio acquisition device 202 from the plurality of audio acquisition devices (e.g., audio acquisition devices 202, 204, 206, 208, 210, 212, 214, 216, 218) based upon, at least in part, one or more signal characteristics (e.g., the audio acquisition device with the "best" signal (e.g., lowest SNR, highest gain, etc.); the audio acquisition device most proximate to the audio source; a default audio acquisition device; etc.). Accordingly, it will be appreciated that multi-channel compression process 10 may select 400 the reference audio acquisition device based upon any number or type of characteristics within the scope of the present disclosure.

Multi-channel compression process 10 may perform 408, prior to encoding 402 the encoded reference audio encounter information, one or more of de-reverberation and noise reduction on a plurality of channels of the plurality of audio acquisition devices of the microphone array based upon, at least in part, the fixed geometry of the plurality of audio acquisition devices of the microphone array. For example, multi-channel compression process 10 may perform 408 pre-processing to optimize the acoustic relative transfer functions (RTFs) and residual signals. Multi-channel compression process 10 may perform 408 one or more of de-reverberation (i.e., removing some of the reverberant tail in the speech signals at each microphone to shorten the acoustic RTF filter length) and de-noising (e.g., removing some of the noise in each channel to reduce the number of bits needed to encode the residual). As shown in FIG. 6, performing 408 the de-reverberation and/or de-noising may be represented with pre-processing system 600.

For example and as discussed above, the audio encounter information (e.g., audio encounter information 106A) may be obtained or received by the plurality of audio acquisition devices (e.g., audio acquisition devices 202, 204, 206, 208, 210, 212, 214, 216, 218) in the form of a plurality of speech signals (e.g., speech signals 500, 502, 504, 506, 508, 510, 512, 514, 516). These speech signals may be stored (e.g., within one or more datasources (e.g., datasources 118)). Performing 408 de-reverberation and/or de-noising may include detecting one or more speech active portions from the plurality of speech signals. For example, the plurality of speech signals (e.g., speech signals 500, 502, 504, 506, 508, 510, 512, 514, 516) may include portions with speech activity and/or portions without speech activity. Referring again to FIG. 6, multi-channel compression process 10 may detect, using a voice activity detector system (e.g., voice activity detection system 602), one or more speech active portions of the plurality of speech signals. As is known in the art, a voice activity detection system (e.g., voice activity detection system 602) may include various algorithms configured to perform noise reduction on a signal and classify various portions of the signal as speech active or speech inactive.

Multi-channel compression process 10 may mark or otherwise indicate which portions of the plurality of speech signals (e.g., speech signals 500, 502, 504, 506, 508, 510, 512, 514, 516) are speech active and/or which portions of the plurality of speech signals are speech inactive. For example, multi-channel compression process 10 may generate metadata that identifies portions of the plurality of speech signals that include speech activity. In one example, multi-channel compression process 10 may generate acoustic metadata with timestamps indicating portions of the plurality of speech signals that include speech activity (e.g., start and end times for each portion). Multi-channel compression process 10 may label speech activity as a time domain label (i.e., a set of samples of the signal include or are speech) or as a set of frequency domain labels (i.e., a vector that gives the likelihood that a particular frequency bin in a certain time frame includes or is speech).

In some implementations, voice activity detection system 602 may utilize user input to classify particular portions of the signal as speech or non-speech. As will be discussed in greater detail below, multi-channel compression process 10 may utilize the one or more speech active portions to generate one or more acoustic relative transfer functions from speech signals of one audio acquisition device to speech signals of another audio acquisition device. Additionally, multi-channel compression process 10 may utilize the one or more speech inactive portions for identifying noise components from the plurality of speech signals (e.g., speech signals 500, 502, 504, 506, 508, 510, 512, 514, 516).

Performing 408 de-reverberation and/or de-noising may include identifying a speaker associated with the one or more speech active portions from the plurality of speech signals. For example, multi-channel compression process 10 may process the plurality of speech signals (e.g., speech signals 500, 502, 504, 506, 508, 510, 512, 514, 516) to identify a speaker associated with the one or more speech active portions. Multi-channel compression process 10 may be configured to access one or more datasources 118 (e.g., plurality of individual datasources 120, 122, 124, 126, 128), examples of which may include but are not limited to one or more of a user profile datasource, a voice print datasource, a voice characteristics datasource (e.g., for adapting the automated speech recognition models), a face print datasource, a humanoid shape datasource, an utterance identifier datasource, a wearable token identifier datasource, an interaction identifier datasource, a medical conditions symptoms datasource, a prescriptions compatibility datasource, a medical insurance coverage datasource, and a home healthcare datasource.

In some implementations, multi-channel compression process 10 may compare the data included within the user profile (defined within the user profile datasource) to at least a portion of the speech active portions from the plurality of speech signals using a speaker identification system (e.g., speaker identification system 604). The data included within the user profile may include voice-related data (e.g., a voice print that is defined locally within the user profile or remotely within the voice print datasource), language use patterns, user accent identifiers, user-defined macros, and user-defined shortcuts, for example. Specifically and when attempting to associate at least a portion of the speech active portions from the plurality of speech signals with at least one known encounter participant, multi-channel compression process 10 may compare one or more voice prints (defined within the voice print datasource) to one or more voices defined within the speech active portions from the plurality of speech signals. As is known in the art, a speaker identification system (e.g., speaker identification system 604) may generally include various algorithms for comparing speech signals to voice prints to identify particular known speakers.

As discussed above and for this example, assume that encounter participant 226 is a medical professional that has a voice print/profile. Accordingly and for this example, multi-channel compression process 10 may identify encounter participant 226 when comparing the one or more speech active portions of the plurality of speech signals (500, 502, 504, 506, 508, 510, 512, 514, 516) to the various voice prints/profiles included within the voice print datasource using speaker identification system 604. Accordingly and when processing 508 the first device speech signal, multi-channel compression process 10 may associate the one or more speech active portions with the voice print/profile of Doctor Susan Jones and may identify encounter participant 226 as "Doctor Susan Jones". While an example of identifying a single speaker has been discussed, it will be appreciated that this is for example purposes only and that multi-channel compression process 10 may identify any number of speakers from the one or more speech active portions of the first device speech signal within the scope of the present disclosure. Multi-channel compression process 10 may store the one or more speaker identities as metadata (e.g., within a datasource (e.g., datasource 118)). In some implementations, multi-channel compression process 10 may utilize the speaker identity to correlate speech portions between the plurality of speech signals.

Performing 408 de-reverberation and/or de-noising may include applying signal filtering to the one or more speech active portions associated with a predefined signal bandwidth, thus defining a plurality of filtered speech active portions. For example, speech components of a speech signal may be generally limited to particular frequencies of interest. Additionally, various speech processing systems may utilize various frequency ranges when processing speech. Accordingly, multi-channel compression process 10 may utilize one or more signal filters (e.g., signal filter 606) to filter the one or more speech active portions to a predefined signal bandwidth, thus defining a plurality of filtered speech active portions. In one example, signal filter 606 may be a band-pass filter. However, it will be appreciated that various filters may be utilized to filter the one or more speech active portions to a predefined signal bandwidth within the scope of the present disclosure.

For example, suppose an automated speech recognition (ASR) system (e.g., speech processing system 300) is configured to process speech signals in the frequency band between e.g., 300 Hz and 7000 Hz. Accordingly, multi-channel compression process 10 may apply signal filtering, using the signal filter (e.g., signal filter 606), to define a plurality of filtered speech active portions with a predefined signal bandwidth between e.g., 300 Hz and 7000 Hz. While an example predefined signal bandwidth of e.g., 300 Hz-7000 Hz has been described for one speech processing system, it will be appreciated that any predefined signal bandwidth for any type of speech processing system may be utilized within the scope of the present disclosure. For example, the predefined signal bandwidth may be a default range, a user-defined range, and/or may be automatically defined by multi-channel compression process 10.

In some implementations and as will be discussed in greater detail below, performing 408 de-reverberation and de-noising may result in easier acoustic relative transfer function (RTF) estimation and/or shorter RTFs. Multi-channel compression process 10 may apply single channel noise reduction, bandpass filtering, gain control etc. before estimating acoustic relative transfer functions (RTFs). This may remove unwanted noise from each speech signal and therefore give a larger compression ratio, with the assumption that noise is not useful for any downstream processes. In use cases like multi-party meetings or doctor-patient consultations, the noise field is likely well behaved and not very adverse (e.g., mostly ambient or HVAC-type noises with little babble or other loud machine noises) allowing for easier enhancement of the additive noise component.

Multi-channel compression process 10 may encode 402 audio encounter information of the reference audio acquisition device, thus defining encoded reference audio encounter information. Encoding audio encounter information may generally include the process of compressing, and reformatting data from one form to a target form. For example, multi-channel compression process 10 may encode 402 speech signals from the reference audio acquisition device (e.g., reference audio acquisition device 202) to compress the speech signal (e.g., speech signal 500) for more efficient transmission to a speech processing system back-end (e.g., represented in FIG. 6 as ACD compute system 12). To encode 402 speech signal 500 obtained by audio acquisition device 202, multi-channel compression process 10 may utilize any codec (e.g., a lossy codec, lossless codec, etc.). In the example of FIG. 6, this codec may be represented by reference encoder 608. It will be appreciated that any codec/encoder may be used to encode 402 speech signal 500 to generate encoded reference audio encounter information (e.g., encoded audio encounter information 610).

As will be described in greater detail below, multi-channel compression process 10 may reduce the transmission bandwidth required for processing acoustic encounter information from a multi-channel audio recording system with a front-end and back-end speech processing system. For example, conventional approaches to single channel speech processing across front-end and back-end systems generally includes encoding the individual channel for efficient transmission from a receiving front-end speech processing system for further processing by a back-end speech processing system. However, when extended to multi-channel speech processing systems, encoding each channel may result in either data loss through lossy compression or insufficient transmission bandwidth in lossless encoding. Accordingly, implementations of the present disclosure may provide for the encoding of the reference audio encounter information and the transmission of representations of the other channels of the multi-channel speech processing system.

Multi-channel compression process 10 may generate 404 a plurality of acoustic relative transfer functions between the reference audio acquisition device and the plurality of audio acquisition devices of the audio recording system. An acoustic relative transfer function (RTF) may generally include a ratio of acoustic transfer functions between two devices that maps one or more speech signal characteristics from one device/acoustic domain to another device/acoustic domain, thus resulting in a relative transfer function. For example and as discussed above, suppose multi-channel compression process 10 receives speech signal 500 using audio acquisition device 202 and speech signal 502 using audio acquisition device 204. In this example, multi-channel compression process 10 may generate 404 or estimate an acoustic RTF that maps the signal characteristics (e.g., reverberation, noise, speech signal, etc.) of speech signal 500 from audio acquisition device 202 to the signal characteristics of speech signal 502 obtained by audio acquisition device 204, or vice versa. As will be discussed in greater detail below, multi-channel compression process 10 may generate 404 a plurality of acoustic RTFs mapping speech signals from the reference audio acquisition device to the speech signals of another audio acquisition device using various means including, for example, filter estimation algorithms and/or systems in the time domain or the frequency domain.

Generating 404 a plurality of acoustic relative transfer functions between the reference audio acquisition device and the plurality of audio acquisition devices of the audio recording system may include modeling the relationships between the characteristics of the speech signals obtained by the reference audio acquisition device and the characteristics of the speech signals obtained by another audio acquisition device utilizing an adaptive filter. For example, multi-channel compression process 10 may provide the speech signals obtained by the reference audio acquisition device and the speech signals obtained by other audio acquisition devices as inputs to an adaptive filter (e.g., adaptive filter 614).

Adaptive filter 614 may be configured to estimate a filter that corresponds to the acoustic RTF between the speech active regions of the speech signals obtained by reference audio acquisition device 202 and the speech active regions of the speech signals obtained by the other audio acquisition devices. Specifically, multi-channel compression process 10 may model the mapping of the speech signals of the reference audio acquisition device to the speech signals of other audio acquisition devices, or vice versa, using the adaptive filter (e.g., adaptive filter 614) in the form of a plurality of acoustic RTFs (e.g., acoustic RTFs 616). Multi-channel compression process 10 may iteratively estimate, using the adaptive filter (e.g., adaptive filter 614), a filter mapping the characteristics of speech signals of the reference audio acquisition device to the speech signals of other audio acquisition devices, or vice versa, at each sample of the speech signals of the reference audio acquisition device and the speech signals of the other audio acquisition devices until the acoustic RTFs converge. For example, the accuracy of the model of the relationships may improve as the adaptive filter (e.g., adaptive filter 616) converges towards an optimal filter.

Convergence may indicate a threshold degree of mapping between the speech signals of the reference audio acquisition device to the speech signals of other audio acquisition devices. For example, when the acoustic RTF (e.g., acoustic RTF 618) is convolved with the speech signal (e.g., speech signal 500) obtained by the reference audio acquisition device (e.g., reference audio acquisition device 202), multi-channel compression process 10 should ideally provide the speech signal (e.g., speech signal 502) of audio acquisition device 204 or a significantly equivalent speech signal. In this manner, the acoustic RTF (e.g., acoustic RTF 618) may be generated 404 to map the components of the speech signal (e.g., speech signal 500) obtained by the reference audio acquisition device (e.g., reference audio acquisition device 202) to the speech signal (e.g., speech signal 502) of audio acquisition device 204, or vice versa. For best performance, multi-channel compression process 10 may use the adaptive filter's estimate when the filter has converged as much as possible towards the optimal filter. In a static acoustic scenario, the adaptive filter may converge to the vicinity of the optimal filter given enough iterations (time). In a dynamic acoustic scenario, the adaptive filter may be chasing the time-varying optimal filter.

Multi-channel compression process 10 may model the speech signals obtained by the reference audio acquisition device and the speech signals of the other audio acquisition devices utilizing machine learning system until the speech signals obtained by the reference audio acquisition device and the speech signals of the other audio acquisition devices converge. For example, multi-channel compression process 10 may train a machine learning system (e.g., machine learning system 620) to estimate a filter/acoustic RTF (e.g., acoustic relative transfer mapping 618) mapping the speech signal (e.g., speech signal 500) obtained by the reference audio acquisition device (e.g., reference audio acquisition device 202) to the speech signal (e.g., speech signal 502) of audio acquisition device 204, or vice versa, at each sample of speech signal 500 and speech signal 502 until the acoustic RTFs converge.

For example, the machine learning system (e.g., machine learning system 620) may be configured to "learn" how to estimate the filter/acoustic RTF (e.g., acoustic RTF 618) mapping the speech signal (e.g., speech signal 500) obtained by the reference audio acquisition device (e.g., reference audio acquisition device 202) to the speech signal (e.g., speech signal 502) obtained by audio acquisition device 204, or vice versa. In this manner, the machine learning system (e.g., machine learning system 620) may learn to estimate the acoustic RTF using, for example, a mean square error loss function between the estimated and true transfer function. At run-time, once the machine learning system is trained, the machine learning system may estimate an acoustic RTF given speech signals from the reference audio acquisition device and the other audio acquisition devices.

As is known in the art, a machine learning system or model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent). As it navigates its problem space, the program is provided feedback that's analogous to rewards, which it tries to maximize. While three examples of machine learning approaches have been provided, it will be appreciated that other machine learning approaches are possible within the scope of the present disclosure.

Accordingly, multi-channel compression process 10 may utilize a machine learning model or system (e.g., machine learning system 620) to estimate the filter/acoustic RTF (e.g., acoustic RTF 618) mapping the speech signals (e.g., speech signal 500) obtained by the reference audio acquisition device (e.g., reference audio acquisition device 202) to the speech signals (e.g., speech signal 502) of audio acquisition device 204, or vice versa. While examples of generating 404 the plurality of acoustic RTFs have been described utilizing machine learning system or an adaptive filter until the speech signals converge, it will be appreciated that multi-channel compression process 10 may generate 404 the plurality of acoustic RTFs in various ways within the scope of the present disclosure.

Generating 404 the plurality of acoustic relative transfer functions may include one or more of: generating one or more static acoustic relative transfer functions; and generating one or more dynamic acoustic relative transfer functions. For example, multi-channel compression process 10 may generate one or more static acoustic RTFs to map static characteristics from the speech signals obtained by the reference audio acquisition device to the speech signals obtained by the other audio acquisition devices. Multi-channel compression process 10 may generate the one or more static acoustic RTFs by using segments of speech from the speech signals obtained by the reference audio acquisition device to the speech signals obtained by the other audio acquisition devices and extracting a single acoustic RTF per segment as described above.

Multi-channel compression process 10 may generate one or more dynamic acoustic RTFs to map dynamic characteristics (i.e., time-varying) from the speech signals obtained by the reference audio acquisition device to the speech signals obtained by the other audio acquisition devices. Dynamic characteristics, such as reverberation, may account for speaker movement, movement of the speaker's body (e.g., head movement, torso movement, or other movements while a speaker is standing, seating, etc.), movement of a microphone device or portions of a microphone array, etc. For example, multi-channel compression process 10 may generate the one or more dynamic acoustic RTFs by extracting the acoustic RTFs for each contiguous segment for each speaker. Multi-channel compression process 10 may run the acoustic RTF estimation multiple times on the segments until initial convergence is achieved. Once initial convergence is achieved, multi-channel compression process 10 may continue to extract acoustic RTFs at predefined time increments (e.g., every subsequent sample or any other small time shift), resulting in a set of dynamic acoustic RTFs that model speaker movements in audio captured by the audio recording system (e.g., audio recording system 104).

In some implementations, the selection of the predefined time segments may be based upon, at least in part, a speaker localization algorithm or system, which may use audio encounter information (e.g., audio encounter information 106) and/or machine vision information (e.g., machine vision encounter information 102). For example, suppose mixed-media ACD device 232 includes machine vision system 100. Machine vision encounter information 102 may be used, at least in part, by multi-channel compression process 10 to control the predefined time increments (i.e., by setting to those times where a speaker is actually moving above a threshold in azimuth, elevation, and/or orientation of the head).

As discussed above, multi-channel compression process 10 may utilize audio encounter information (e.g., audio encounter information 106) and/or machine vision information (e.g., machine vision encounter information 102) when generating 404 the plurality of acoustic RTFs mapping characteristics from the speech signals obtained by the reference audio acquisition device to the speech signals obtained by the other audio acquisition devices. For example, multi-channel compression process 10 may utilize audio encounter information (e.g., audio encounter information 106) and/or machine vision information (e.g., machine vision encounter information 102) to define speaker location information within the monitored environment. Multi-channel compression process 10 may determine the range, azimuth, elevation, and/or orientation of speakers and may associate this speaker location information with the one or more acoustic RTFs (e.g., as metadata stored in a datastore).

In some implementations, generating 404 a plurality of acoustic relative transfer functions between the reference audio acquisition device and the plurality of audio acquisition devices of the audio recording system may include generating 410 an acoustic relative transfer function codebook for the plurality of audio acquisition devices of the audio recording system. An acoustic RTF codebook (e.g., acoustic RTF codebook 622) may include a data structure configured to store the one or more acoustic RTFs (e.g., plurality of acoustic RTFs 616) mapping characteristics from the speech signals obtained by the reference audio acquisition device to the speech signals of audio acquisition device 204. Generating 410 the acoustic relative transfer codebook (e.g., acoustic relative transfer codebook 622) may include generating 408 a plurality of acoustic RTFs (e.g., plurality of acoustic RTFs 616) as described above for various locations, speakers, etc. within an acoustic environment and associating each acoustic RTF with a unique "code" or identifier. In this manner, each acoustic RTF may be uniquely identifiable, or identifiable as the best match according to chosen matching criteria, from the plurality of acoustic RTFs of the acoustic RTF codebook. In some implementations, multi-channel compression process 10 may also, optionally, cluster the plurality of acoustic RTFs into a set of classes and assign a code to a prototype RTF for that class. In this manner, as well known in the art, the size of the codebook may be optimized to be much smaller than the total number of RTFs in the collection with minimal loss in performance.

In some implementations, the acoustic RTF codebook (e.g., acoustic relative transfer codebook 622) may be generated 410 for various reference audio acquisition devices of the plurality of audio acquisition devices (e.g., audio acquisition devices 202, 204, 206, 208, 210, 212, 214, 216, 218) of the audio recording system (e.g., audio recording system 104). Generating 410 the acoustic RTF codebook (e.g., acoustic relative transfer codebook 622) may include receiving speech signals from various pairs of audio acquisition devices and generating 408 acoustic RTFs for each pair of audio acquisition devices, as discussed above. As will be discussed in greater detail below, multi-channel compression process 10 may also generate and/or store speaker location information (e.g., range, azimuth, elevation, and/or orientation of speakers) associated with the one or more acoustic RTFs (e.g., acoustic RTF 618). As will be discussed in greater detail below, multi-channel compression process 10 may utilize the acoustic RTF codebook (e.g., acoustic RTF codebook 622) to map, at run-time, components of speech signals of one audio acquisition device to the speech signals of another audio acquisition device. In this manner, multi-channel compression process 10 may reduce the number and size of data to transmit to a speech processing back-end system by utilizing a reference speech signal and the acoustic RTFs for other acquisition devices relative to the reference speech signal.

In some implementations, generating 404 a plurality of acoustic relative transfer functions between the reference audio acquisition device and the plurality of audio acquisition devices of the audio recording system may include estimating 412 the acoustic relative transfer function for each audio acquisition device of the plurality of audio acquisition devices from the acoustic relative transfer function codebook. Estimating 412 the acoustic RTF for an audio acquisition device from the acoustic RTF codebook may generally include identifying a corresponding codebook entry for a given input speech signal. For example, various acoustic RTFs may be defined for various acoustic source locations, noise levels, etc. As such, when a speech signal is obtained, multi-channel compression process 10 may balance the computational and time delay associated with either identifying an acoustic RTF codebook entry or generating a bespoke acoustic RTF by estimating 412 a sufficiently converged acoustic RTF from the plurality of acoustic RTFs of the acoustic RTF codebook. As discussed above, convergence may indicate a threshold degree of mapping between the speech signals of the reference audio acquisition device to the speech signals of other audio acquisition devices.

Estimating 412 the acoustic RTF for each audio acquisition device of the plurality of audio acquisition devices from the acoustic RTF codebook is represented in FIG. 6 with acoustic RTF estimator 624. As discussed above, multi-channel compression process 10 may encode 402 the reference audio encounter information (e.g., encoded reference audio encounter information 610) for processing by a back-end speech processing system (e.g., represented by ACD compute system 12 in FIG. 6). As the back-end speech processing system will necessarily decode the reference audio encounter information (e.g., encoded reference audio encounter information 610) for processing, multi-channel compression process 10 may similarly decode the reference audio encounter information (e.g., encoded reference audio encounter information 610) before estimating 412 the acoustic RTF for each audio acquisition device of the plurality of audio acquisition devices from the acoustic RTF codebook (e.g., using reference decoder 612 as shown in FIG. 6). In this manner, the estimating 412 of the acoustic RTFs may utilize the same decoded version of the reference audio encounter information (e.g., encoded reference audio encounter information 610) as the back-end speech processing system.

Accordingly, the threshold degree of mapping between the speech signals of different audio acquisition devices may determine how multi-channel compression process 10 estimates 412 the acoustic RTF for each audio acquisition device of the plurality of audio acquisition devices from the acoustic RTF codebook. In some implementations, the threshold degree of mapping for convergence may be variable, may be user-defined, may be automatically defined by multi-channel compression process 10, etc. Accordingly, it will be appreciated that the threshold degree may be determined in many ways within the scope of the present disclosure.

In some implementations, generating 404 a plurality of acoustic relative transfer functions between the reference audio acquisition device and the plurality of audio acquisition devices of the audio recording system may include generating 414 a plurality of residual signals associated with each microphone of the plurality of audio acquisition devices based upon, at least in part, the estimated acoustic relative transfer functions for each microphone of the plurality of audio acquisition devices. A residual signal may generally include the difference between the speech signal obtained by a reference audio acquisition device and the speech signal obtained by another audio acquisition device when estimating 412 the acoustic relative transfer function. For example, an acoustic RTF that perfectly maps the speech signals from an audio acoustic device to the speech signals of a reference audio acoustic device will have no residual signal. By contrast, an acoustic RTF that poorly maps the speech signals from an audio acoustic device to the speech signals of a reference audio acoustic device will have significant residual signals. As the ability to efficiently represent multiple channels of speech signals across multiple audio acquisition devices may be largely dependent upon the mapping of the acoustic RTF for a given input speech signal and audio acquisition device, the residual signal may be defined to represent any disparity between the result of the acoustic RTF and the speech signal of the reference audio acquisition device for a given audio acquisition device.

Multi-channel compression process 10 may transmit 406 the encoded reference audio encounter information and a representation of the plurality of acoustic RTFs. As discussed above, many speech processing systems include front-end processing and back-end processing. In the example of ASR, front-end speech processing may generally include receiving speech signals and performing some signal processing to enhance the back-end speech processing. However, when extended to multi-channel speech processing systems, encoding each channel may result in either data loss through lossy compression, where such data lost may include, for example, signal representation inaccuracies in the time domain, in the magnitude spectrum and/or in the phase spectrum, or insufficient transmission bandwidth in lossless encoding. Moreover, in some conventional compression approaches, the spatial information may be lost during compression. As discussed above and will be elaborated in further detail below, the spatial information may represent an important aspect of the microphone array coding (since it explicitly models the spatial relationships). Accordingly, multi-channel compression process 10 may reduce the transmission bandwidth required for processing acoustic encounter information from a multi-channel audio recording system with a front-end and back-end speech processing system by transmitting 406 the encoded reference audio encounter information (e.g., encoded reference audio encounter information 610) and a representation of the plurality of acoustic RTFs (e.g., plurality of acoustic RTFs 616).

In some implementations, transmitting 406 the encoded reference audio encounter information and a representation of the plurality of acoustic relative transfer functions may include one or more of: transmitting 416 a vector of acoustic relative transfer functions; and transmitting 418 a vector of acoustic RTF codebook entries for the plurality of audio acquisition devices. As discussed above, the plurality of acoustic RTFs may be generated 402 to represent the mapping of speech signals from a reference audio acquisition device to the speech signals of another audio acquisition device. The plurality of acoustic RTFs may be defined as a vector or a plurality of vectors mapping particular portions of the reference speech signal to the speech signal of each respective audio acquisition device of the audio recording system. Multi-channel compression process 10 may utilize an encoder/codec (e.g., acoustic RTF encoder 626) to encode the plurality of acoustic RTFs into a vector of acoustic RTFs. In this manner, multi-channel compression process 10 may transmit 416 a vector of acoustic RTFs (e.g., vector of acoustic RTFs 628).

In addition to transmitting 416 a vector of acoustic relative transfer functions, multi-channel compression process 10 may transmit the plurality of residual signals. Similarly, multi-channel compression process 10 may utilize an encoder/codec (e.g., residual encoder 630) to encode the plurality of residual signals for transmitting to the back-end speech processing system. In the example of FIG. 6, residual encoder 630 may encode the plurality of residual signals to generate encoded plurality of residual signals 632. In some implementations, the residual encoder (e.g., residual encoder 630) may be configured to control the overall bit rate of transmission by allocating more or less bits to the encoding of the residual signals. The residual signals maybe be encoded using entropy coding techniques as is known in the art. In a scenario where no residual signals are generated or encoded, it is likely that mostly the additive noise components and uncorrelated components are 'lost' in the process, which will likely impact many speech processing applications, such as ASR, in a positive way.

As discussed above, multi-channel compression process 10 may generate an acoustic RTF codebook of codebook entries for each acoustic relative transfer function. With an acoustic RTF codebook, multi-channel compression process 10 may transmit 418 a vector of acoustic RTF codebook entries for the plurality of audio acquisition devices as opposed to transmitting the acoustic RTFs themselves. In this manner, multi-channel compression process 10 may further reduce the transmission bandwidth required for transmitting multi-channel audio encounter information to a back-end speech processing system.

In one example, suppose that the acoustic environment is an enclosed room measuring 3.5 meters by 3 meters with audio recording system 104 mounted on a wall of the room. In this example, suppose that the room may include 2.5 meters of an arch of potential positions in the room where the arc may be swept in 0.5 degree steps in azimuth and 1 centimeter steps in range. Accordingly, the number of acoustic RTF entries for a codebook for this room may be 250*360=90,000 entries for 90,000 acoustic RTFs. For this particular room, only 17 bits may be needed to represent the codebook entries for each frame.

Further suppose that codebook entries are transmitted every 10 milliseconds. Then the required additional bit rate for the acoustic RTF codebook transmission would be 1.7 kilobits per second for each additional channel (in addition to the reference channel). Therefore, for an 8 channel audio signal, the acoustic RTF component would be an addition of just 1.7 kilobits per second and an additional, configurable component for the transmission of the residual signals.

For comparison, suppose the reference channel uses a 256 kilobits per second bit rate using an audio codec. In this example, the baseline transmission of eight channels would be 2,048 kilobits per second compared to the above approach that would require only 268 kilobits per second (e.g., 7 channels*1.7 kilobits per second+256 kilobits per second for the reference channel). This example shows the potential gains possible with multi-channel compression process 10 where, in this example, if the additive noise is not required to be modeled and the residual signal can be mostly ignored, only 268 kilobits per second are required to transmit the eight channels of audio. This represents a 7.6 times lower bit rate. The gains are more substantial for larger arrays.

Multi-channel compression process 10 may update 420 one or more of the plurality of acoustic relative transfer functions and the acoustic relative transfer function codebook for the plurality of audio acquisition devices of the microphone array. As will be discussed in greater detail below, multi-channel compression process 10 may determine when to update 420 the acoustic RTFs and/or the acoustic RTF codebook based upon various factors or conditions including, for example, in response to detecting movement from changes in the acoustic RTFs; detecting movement via the machine vision system (e.g., machine vision system 102); threshold changes in residual energy; based on Voice Activity Detection (VAD); and/or periodically. Updating 420 the plurality of acoustic relative transfer functions themselves may improve encoding accuracy in time-varying acoustic scenarios. As will be discussed in greater detail below, multi-channel compression process 10 may utilize the plurality of acoustic RTFs to determine when to update the acoustic RTF codebook for the plurality of audio acquisition devices of the audio recording system.

Figure 7:
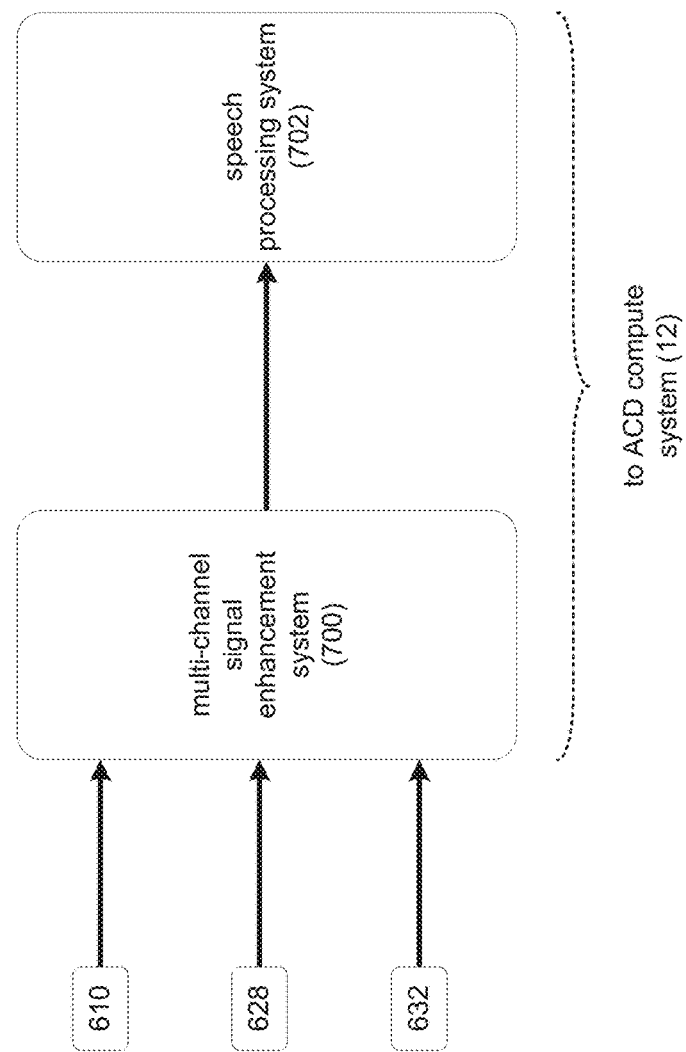
FIGS. 7-8 are diagrammatic views of a ACD compute system operating as a back-end speech processing system.
Figure 8:
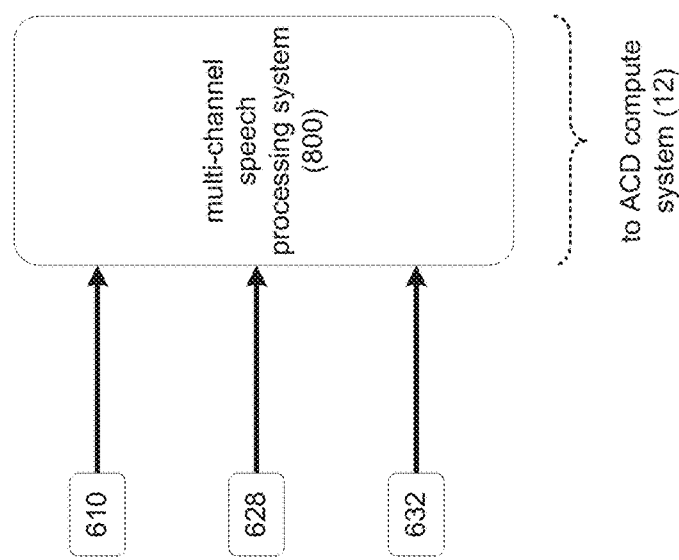

Referring also to FIGS. 7-8 and in some implementations, multi-channel compression process 10 may transmit 406 the encoded reference audio encounter information (e.g., encoded reference audio encounter information 610), a representation of the plurality of acoustic RTF vectors (e.g., vector of acoustic RTFs 628/vector of acoustic RTF codebook entries), and/or an encoded plurality of residual signals (e.g., encoded plurality of residual signals 632) to a back-end speech processing system. In the example of FIG. 7, multi-channel compression process 10 may transmit the encoded reference audio encounter information (e.g., encoded reference audio encounter information 610), a representation of the plurality of acoustic RTF vectors (e.g., vector of acoustic RTFs 628/vector of acoustic RTF codebook entries), and/or an encoded plurality of residual signals (e.g., encoded plurality of residual signals 632) to a multi-channel signal enhancement system (e.g., multi-channel signal enhancement system 700).

Multi-channel signal enhancement system 700 may decode encoded reference audio encounter information 610, vector of acoustic RTFs 628/vector of acoustic RTF codebook entries, and/or encoded plurality of residual signals 632. Multi-channel signal enhancement system 700 may utilize the representation of the plurality of acoustic RTFs and/or the plurality of residual signals to recreate audio encounter information from the decoded reference audio encounter information for each channel of the audio recording system. For example, multi-channel compression process 10 may recreate audio encounter information 106A by generating decoded representations of audio encounter information/speech signals 500, 502, 504, 506, 508, 510, 512, 514, 516 obtained by audio acquisition devices 202, 204, 206, 208, 210, 212, 214, 216, 218. As discussed above, in cases where no residual signals or limited residual signals are transmitted, the decoded representations may not be a perfect match. However, they may be sufficient for a particular speech processing system/application.

As discussed above, multi-channel compression process 10 may transmit a vector of acoustic RTF codebook entries pertaining to an acoustic RTF codebook known to both the front-end speech processing system and the back-end speech processing system. For example, suppose vector of acoustic RTFs 628 includes codebook entries for a plurality of acoustic RTFs. In this example, multi-channel compression process 10 may utilize the acoustic RTF codebook (e.g., acoustic relative transfer function codebook 626) to decode representations of audio encounter information/speech signals 500, 502, 504, 506, 508, 510, 512, 514, 516 obtained by audio acquisition devices 202, 204, 206, 208, 210, 212, 214, 216, 218 from the vector of acoustic RTF codebook entries and encoded reference audio encounter information 610.

In one example, multi-channel signal enhancement system 700 may be configured to perform beamforming on the decoded audio encounter information to generate a single channel representation of the audio encounter information which may be provided to a speech processing system (e.g., speech processing system 702) and/or for human listening. As discussed above, examples of speech processing system 702 may generally include ASR, voice biometric systems, speaker diarization systems, etc.

In the example of FIG. 8, multi-channel compression process 10 may transmit the encoded reference audio encounter information (e.g., encoded reference audio encounter information 610), a representation of the plurality of acoustic RTF vectors (e.g., vector of acoustic RTFs 628/vector of acoustic RTF codebook entries), and/or an encoded plurality of residual signals (e.g., encoded plurality of residual signals 632) to a multi-channel speech processing system (e.g., multi-channel speech processing system 800). In one example, multi-channel speech processing system 800 may be a multi-channel self-attention channel combinator (SACC) speech processing system. As is known in the art, a SACC leverages the self-attention mechanism to combine multi-channel audio signals in the magnitude spectral domain. While an example of a SACC has been described for multi-channel speech processing system 800, it will be appreciated that any multi-channel speech processing system may be used within the scope of the present disclosure.

Detecting Acoustic Changes Using RTFs and Residuals

Figure 9:
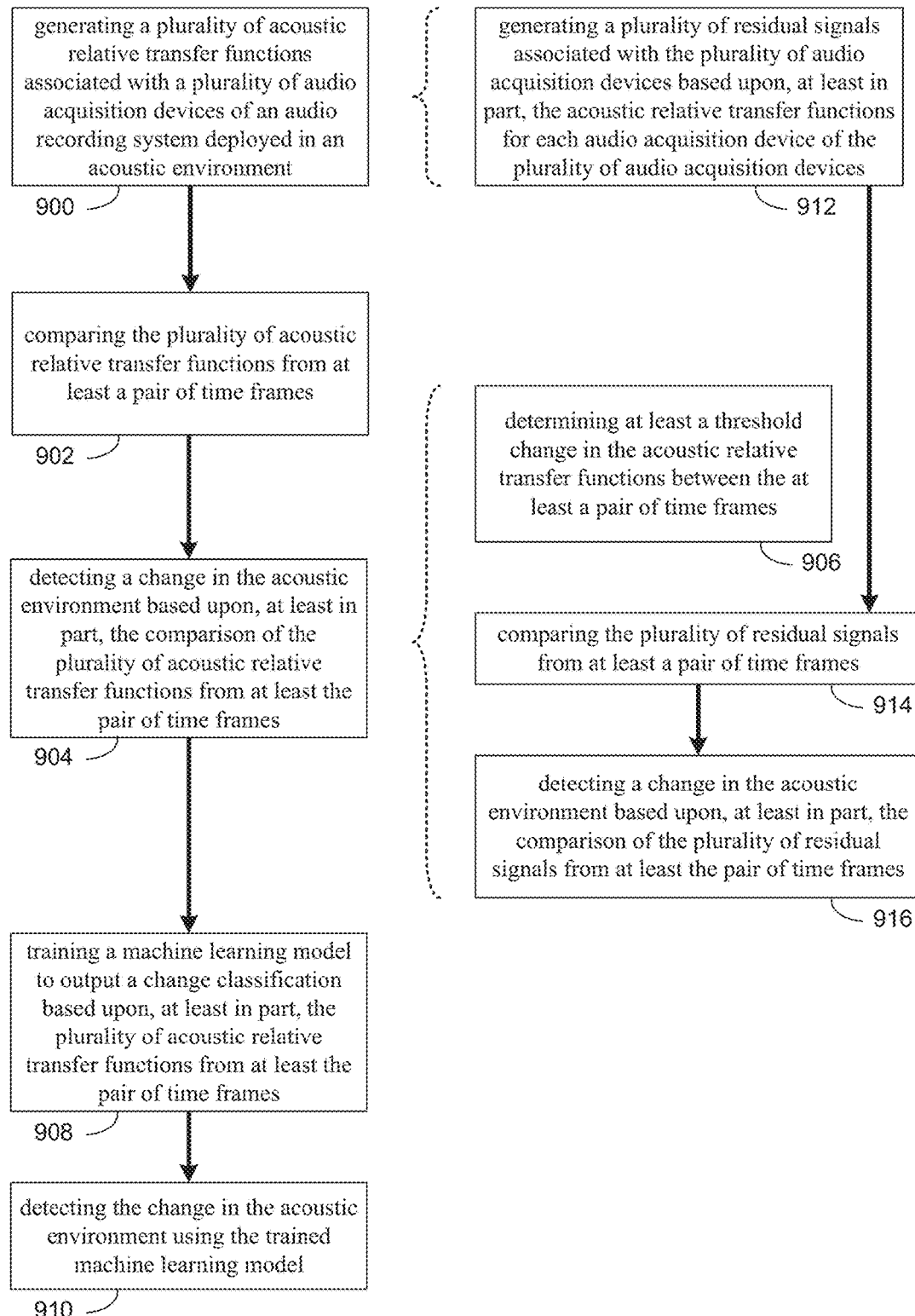
FIG. 9 is a flow chart of one implementation of the multi-channel compression process of FIG. 1.
Figure 10:
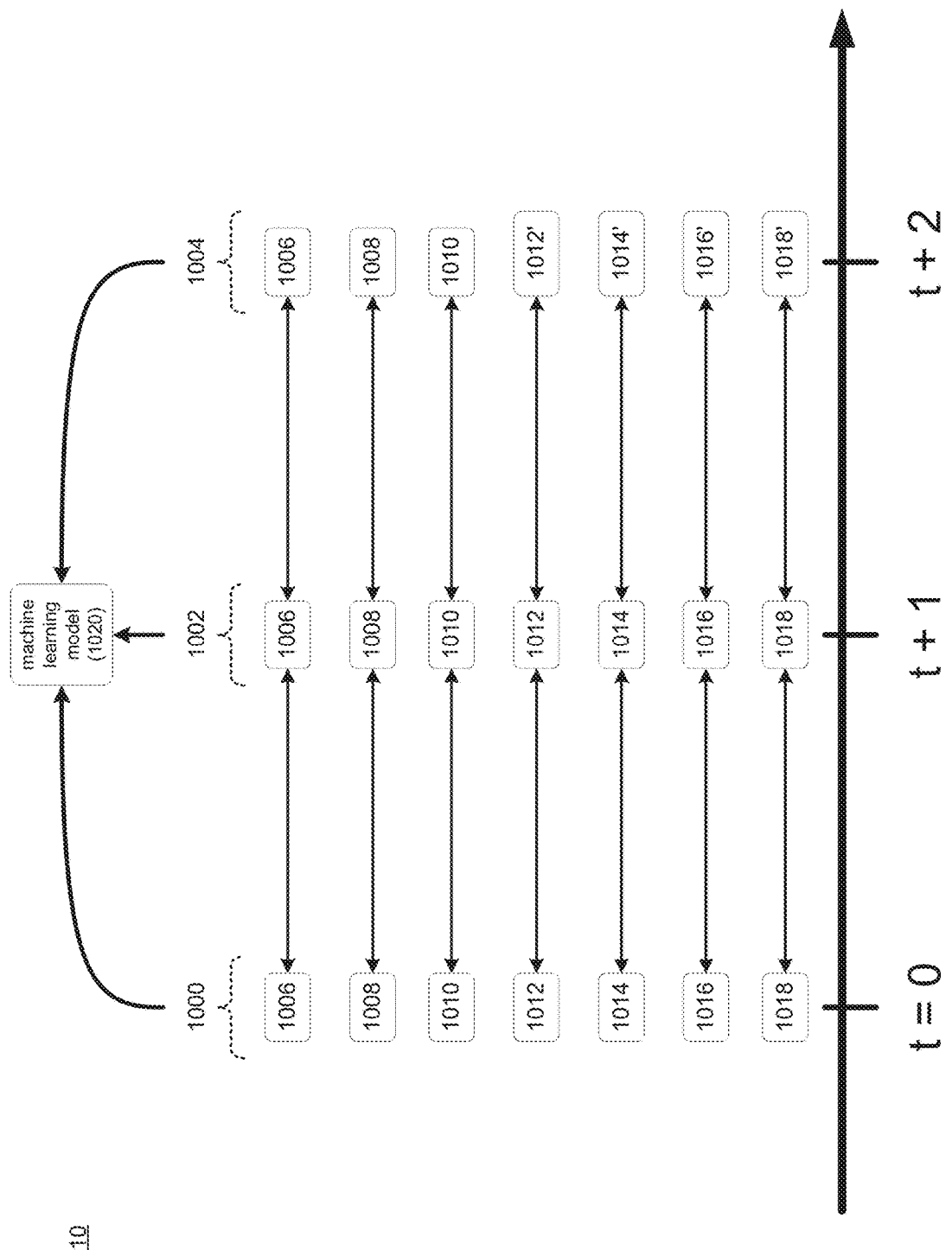
FIG. 10 is a diagrammatic view of a plurality of acoustic relative transfer functions according to one implementation of the multi-channel compression process of FIG. 1.

Referring also to FIGS. 9-10, multi-channel compression process 10 may generate 900 a plurality of acoustic relative transfer functions associated with a plurality of audio acquisition devices of an audio recording system deployed in an acoustic environment. At least a pair of the plurality of acoustic relative transfer functions from time frames may be compared 902. A change in the acoustic environment may be detected 904 based upon, at least in part, the comparison of the plurality of acoustic relative transfer functions from at least the pair of time frames.

As discussed above, acoustic RTFs may be utilized to represent multi-channel speech signals from a plurality of audio acquisition devices of an audio recording system using a speech signal from a reference audio acquisition device. In addition to reducing the bandwidth associated with transmitting multi-channel speech signals to a back-end speech processing system, the plurality of acoustic RTFs may be utilized to detect certain properties associated with an acoustic environment.

For example and as will be discussed in greater detail below, multi-channel compression process 10 may process the plurality of acoustic RTFs to identify changes in an acoustic environment. In one example, changes in the plurality of acoustic RTF may indicate that an acoustic source (e.g., a speaker) is moving within an acoustic environment. In another example, changes in the plurality of acoustic RTF may indicate a change in an acoustic source (e.g., a different speaker begins speaking). In some implementations, the ability to detect changes in an acoustic environment may help improve the accuracy and/or efficiency of a speech processing system. For example, suppose that a speech processing system is configured to perform speaker diarization. In this example and as discussed above, a speaker tracking component may be utilized to track acoustic sources or speakers within the acoustic environment. As will be discussed in greater detail below, multi-channel compression process 10 may allow the speaker tracking component to use the changes in acoustic RTFs and/or residual signals along with other features (such as past acoustic RTFs, residual signals, or speaker identification) to improve tracking of the speakers. While an example of improving speaker identification has been described, it will be appreciated that this is for example purposes only and that the detection of changes in an acoustic environment using acoustic relative transfer functions and residual signals may improve other speech processing systems within the scope of the present disclosure.

Figure 5:
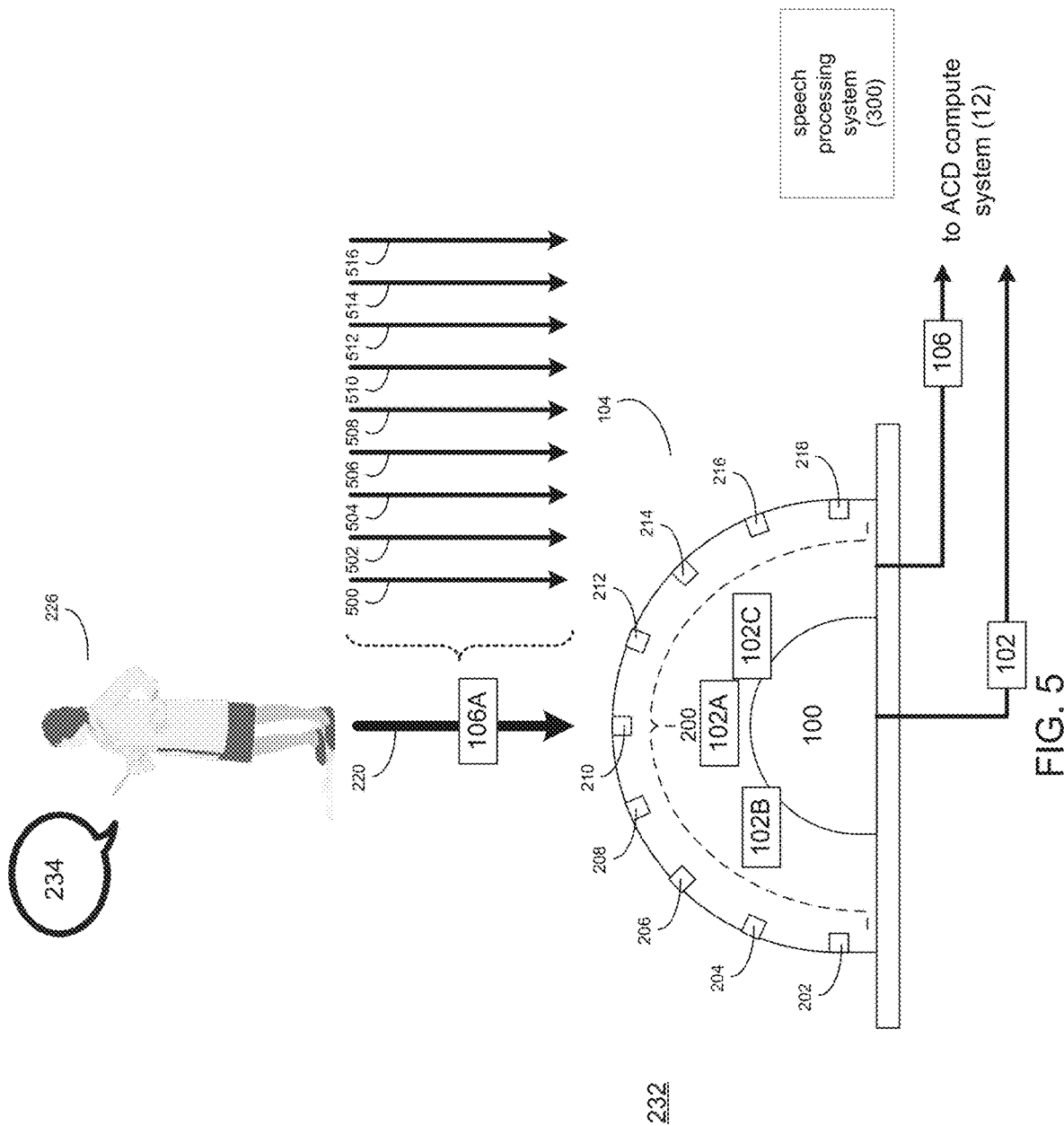
FIGS. 5-6 are diagrammatic views of a modular ACD system according to various implementations of the multi-channel compression process of FIG. 1.

Multi-channel compression process 10 may generate 900 a plurality of acoustic relative transfer functions associated with a plurality of audio acquisition devices of an audio recording system deployed in an acoustic environment. As discussed above and referring again to FIGS. 5-6, multi-channel compression process 10 may generate 900 a plurality of acoustic RTFs (e.g., plurality of acoustic RTFs 616) associated with a plurality of audio acquisition devices (e.g., audio acquisition devices 202, 204, 206, 208, 210, 212, 214, 216, 218) of an audio recording system (e.g. audio recording system 104). As shown in FIG. 5, audio acquisition device 202 may receive speech signal 500; audio acquisition device 204 may receive speech signal 502; audio acquisition device 206 may receive speech signal 504; audio acquisition device 208 may receive speech signal 506; audio acquisition device 210 may receive speech signal 508; audio acquisition device 212 may receive speech signal 510; audio acquisition device 214 may receive speech signal 512; audio acquisition device 216 may receive speech signal 514; and audio acquisition device 218 may receive speech signal 516. Referring again to FIG. 6, multi-channel compression process 10 may generate 900 plurality of acoustic RTFs 616 in the manner described above.

Multi-channel compression process 10 may compare 902 at least a pair of the plurality of acoustic relative transfer functions from time frames. For example, as acoustic relative transfer functions are generated, multi-channel compression process 10 may determine whether the acoustic RTF changes over time. In some implementations, as changes occur in an acoustic environment (e.g., from movement of a speaker or changes in a speaker) over time, the acoustic RTFs generated may also change over time. Referring also to FIG. 10, suppose multi-channel compression process 10 generates 900 e.g., three sets of acoustic RTFs (e.g., acoustic RTF sets 1000, 1002, 1004) at three different time frames (e.g., t=0; t+1; and t+2). In this example, acoustic RTF set 1000 may include acoustic RTFs 1006, 1008, 1010, 1012, 1014, 1016, 1018 which represents the mapping of a speech signal from a reference audio acquisition device to speech signals of other audio acquisition devices at time=0. At time, t+1, multi-channel compression process 10 may generate 900 acoustic RTF set 1002 with acoustic RTFs 1006, 1008, 1010, 1012, 1014, 1016, 1018.

In this example, multi-channel compression process 10 may compare 902 the plurality of acoustic RTFs from at least the pair of time frames (e.g., compare acoustic RTF set 1000 from time frame t=0 and acoustic RTF set 1002 from time frame t+1). Accordingly, multi-channel compression process 10 may compare the respective acoustic RTFs of acoustic RTF set 1000 to those of acoustic RTF set 1002. In this example, multi-channel compression process 10 may determine no change in the acoustic RTF set 1002 from acoustic RTF set 1000 over time frames. Continuing with this example, suppose multi-channel compression process 10 generates 900 acoustic RTF 1004 associated with time frame t+2 as encounter participant 226 is moving within the acoustic environment. In this example, multi-channel compression process 10 may compare acoustic RTF set 1002 from time frame t+1 and acoustic RTF 1004 from time frame t+2). Accordingly, multi-channel compression process 10 may compare the respective acoustic RTFs of acoustic RTF set 1002 to those of acoustic RTF set 1004. In this example and as will be discussed in greater detail below, multi-channel compression process 10 may detect 904 a change in the acoustic RTF set 1004 relative to acoustic RTF set 1002 over time frames.

In one example, comparing 902 the respective acoustic RTFs of an acoustic RTF set to those of another acoustic RTF set may include determining a Euclidean difference between the respective acoustic RTFs. However, it will be appreciated that any known comparison metric may be used to compare 902 the plurality of acoustic RTFs from at least the pair of time frames within the scope of the present disclosure.

Multi-channel compression process 10 may detect 904 a change in the acoustic environment based upon, at least in part, the comparison of the plurality of acoustic relative transfer functions from at least the pair of time frames. For example and as discussed above, multi-channel compression process 10 may compare 902 the plurality of acoustic RTFs from at least the pair of time frames. As discussed previously and as shown in FIG. 10, multi-channel compression process 10 may compare 902 each acoustic RTF of at least a pair of time frames (e.g., acoustic RTF set 1000 of time frame t=0 compared to acoustic RTF set 1002 of time frame t+1; and acoustic RTF set 1002 of time frame t+1 compared to acoustic RTF set 1004 of time frame t+2). As shown in FIG. 10, suppose that acoustic RTFs 1012', 1014', 1016', 1018' of acoustic RTF set 1004 changes relative to acoustic RTFs 1012, 1014, 1016, 1018 of acoustic RTF set 802. In this example, multi-channel compression process 10 may detect 904 a change in the acoustic environment based upon, at least in part, the comparison of the plurality of acoustic RTFs (e.g., acoustic RTF sets 1000, 1002, 1004) from at least the pair of time frames (e.g., time frame t+1; and time frame t+2).

In some implementations, detecting 904 a change in the acoustic environment based upon, at least in part, the comparison of the plurality of acoustic relative transfer functions from at least the pair of time frames may include determining 906 at least a threshold change in the plurality of acoustic relative transfer functions between the at least a pair of time frames. For example, a threshold change may be defined (e.g., by a user via a graphical user interface; automatically by multi-channel compression process 10; etc.) for the plurality of acoustic RTFs across time frames. In some implementations, the threshold change may be a threshold number of acoustic RTFs over a threshold period of time (e.g., a number of acoustic RTFs over a threshold period of time). In the example of FIG. 10, suppose the threshold change includes changes to at least three acoustic RTFs over at least one pair of time frames. Accordingly, multi-channel compression process 10 may determine 906 at least a threshold change in the plurality of acoustic RTFs between the at least a pair of time frames. For example, as acoustic RTF set 1004 includes four changes to acoustic RTFs over a period of one pair of time frames when compared to acoustic RTF set 1002.

In some implementations, a plurality of threshold changes may be defined to represent a plurality of changes in an acoustic environment. For example, multi-channel compression process 10 may define various thresholds for changes to a plurality of acoustic RTFs and may associate these thresholds with particular changes to an acoustic environment. In this manner, multi-channel compression process 10 may correlate changes in acoustic relative transfer functions with changes in an acoustic environment such that, upon determining a particular set of changes to the plurality of acoustic RTFs, multi-channel compression process 10 may detect a specific change in the acoustic environment.

Multi-channel compression process 10 may train 908 a machine learning model to output a change classification based upon, at least in part, the plurality of acoustic RTFs from at least the pair of time frames. For example, multi-channel compression process 10 may utilize a machine learning model (e.g., machine learning model 1020) to receive, as input, the plurality of acoustic RTFs (e.g., acoustic RTF sets 1000, 1002, 1004). As discussed above, machine learning model 1020 may be trained to determine at least a threshold change in the plurality of acoustic RTFs. For example, multi-channel compression process 10 may provide training data correlating a specific change in an acoustic environment with particular changes in the plurality of acoustic RTFs. A change classification output may indicate whether there has been change to an acoustic environment generally (i.e., a significant movement or an insignificant movement) and/or may indicate a specific change within the acoustic environment based upon, at least in part, the plurality of acoustic RTFs from at least the pair of time frames.

In some implementations, detecting 904 a change in the acoustic environment based upon, at least in part, the comparison of the plurality of acoustic relative transfer functions from at least the pair of time frames may include detecting 910 the change in the acoustic environment using the trained machine learning model. For example and as discussed above, the trained machine learning model (e.g., machine learning model 1020) may be configured to detect a change in the acoustic environment generally or to detect a particular change in the acoustic environment (i.e., whether the change is movement of an acoustic source or whether the acoustic source has changed).

In some implementations, generating 900 a plurality of acoustic relative transfer functions associated with a plurality of audio acquisition devices of an audio recording system deployed in an acoustic environment may include generating 912 a plurality of residual signals associated with the plurality of audio acquisition devices based upon, at least in part, the acoustic RTFs for each audio acquisition device of the plurality of audio acquisition devices. As discussed above, a residual signal may generally include the difference between the speech signal obtained by a reference audio acquisition device and the speech signal obtained by another audio acquisition device when estimating the acoustic relative transfer function. For example, an acoustic relative transfer function that perfectly maps the speech signals from an audio acoustic device to the speech signals of a reference audio acoustic device will have no residual signal. By contrast, an acoustic relative transfer function that poorly maps the speech signals from an audio acoustic device to the speech signals of a reference audio acoustic device will have significant residual signals. As the ability to efficiently represent multiple channels of speech signals across multiple audio acquisition devices may be largely dependent upon the mapping of the acoustic relative transfer function for a given input speech signal and audio acquisition device, the residual signal may be defined to represent any disparity between the result of the acoustic relative transfer function and the speech signal of the reference audio acquisition device for a given audio acquisition device.

In some implementations, detecting 904 a change in the acoustic environment based upon, at least in part, the comparison of the plurality of acoustic relative transfer functions from at least the pair of time frames may include: comparing 914 the plurality of residual signals from at least a pair of time frames; and detecting 916 a change in the acoustic environment based upon, at least in part, the comparison of the plurality of residual signals from at least the pair of time frames. As discussed above relative to comparing 902 the plurality of acoustic RTFs, multi-channel compression process 10 may similarly compare 914 the plurality of residual signals from at least a pair of time frames and may detect 916 a change in the acoustic environment based upon, at least in part, the comparison of the plurality of residual signals. For example, multi-channel compression process 10 may similarly detect 916 a change in the acoustic environment (e.g., whether the change is movement of an acoustic source or whether the acoustic source has changed) based upon, at least in part, the comparison 914 of the plurality of residual signals from at least the pair of time frames.

In some implementations, multi-channel compression process 10 may utilize both a plurality of acoustic RTFs and a plurality of residual signals to detect 904 a change in the acoustic environment. For example and as discussed above, multi-channel compression process 10 may compare acoustic relative transfer functions and residual signals over successive or time frames to detect at least a threshold change. By utilizing both acoustic RTFs and residual signals, multi-channel compression process 10 may detect 904 changes in the acoustic environment from changes in the acoustic RTFs and/or the residual signals.

In some implementations, detecting 904 a change in the acoustic environment based upon, at least in part, the comparison of the plurality of acoustic relative transfer functions from at least the pair of time frames may include providing an indication of the detected change in the acoustic environment. For example and as discussed above, suppose mixed-media ACD device 232 includes a speaker tracking component to track acoustic sources (i.e., speakers) within an acoustic environment. In this example and in response to detecting a change in the acoustic environment based upon, at least in part, the comparison of at least the pair of time frames from the plurality of acoustic RTFs, multi-channel compression process 10 may utilize the detected change to enhance the speaker tracking capabilities.

In another example, suppose mixed-media ACD device 232 includes machine vision system 102. In this example, multi-channel compression process 10 may provide an indication of the detected change in the acoustic environment based upon, at least in part, the comparison of at least the pair of time frames from the plurality of acoustic RTFs to mixed-media ACD device 232 to configure or modify machine vision system 102. For example, suppose multi-channel compression process 10 detects 904 a change in the acoustic environment based upon, at least in part, the comparison of the plurality of acoustic RTFs from at least the pair of time frames that suggests that an encounter participant is entering a room. In this example, mixed-media ACD device 232 may configure or modify machine vision system 102 to visually track the new encounter participant.

In yet another example and as discussed above, multi-channel compression process 10 may update the acoustic relative transfer function codebook for the plurality of audio acquisition devices of the microphone array in response to detecting movement from changes in the acoustic RTFs. In this example, multi-channel compression process 10 may determine that based on the detected change(s) in the acoustic environment, that the acoustic relative transfer function codebook needs updating (e.g., to add codebook entries pertaining to the detected change). In one example where the detected change in the plurality of acoustic RTFs and/or the plurality of residual signals is associated with a particular change in the acoustic environment, multi-channel compression process 10 may utilize this information to perform a targeted update of the acoustic relative transfer function codebook (e.g., by generating specific acoustic relative transfer function codebook entries).

While several examples have been provided for using the indication of the detected change in the acoustic environment based upon, at least in part, the comparison of the plurality of acoustic RTFs and/or the plurality of residual signals from at least the pair of time frames, it will be appreciated that these are for example purposes only and that the detected change in acoustic environment based upon, at least in part, the comparison of the plurality of acoustic RTFs and/or the plurality of residual signals from at least the pair of time frames may be used for various other purposes within the scope of the present disclosure.

Acoustic Source Localization Using Acoustic RTFs

Figure 11:
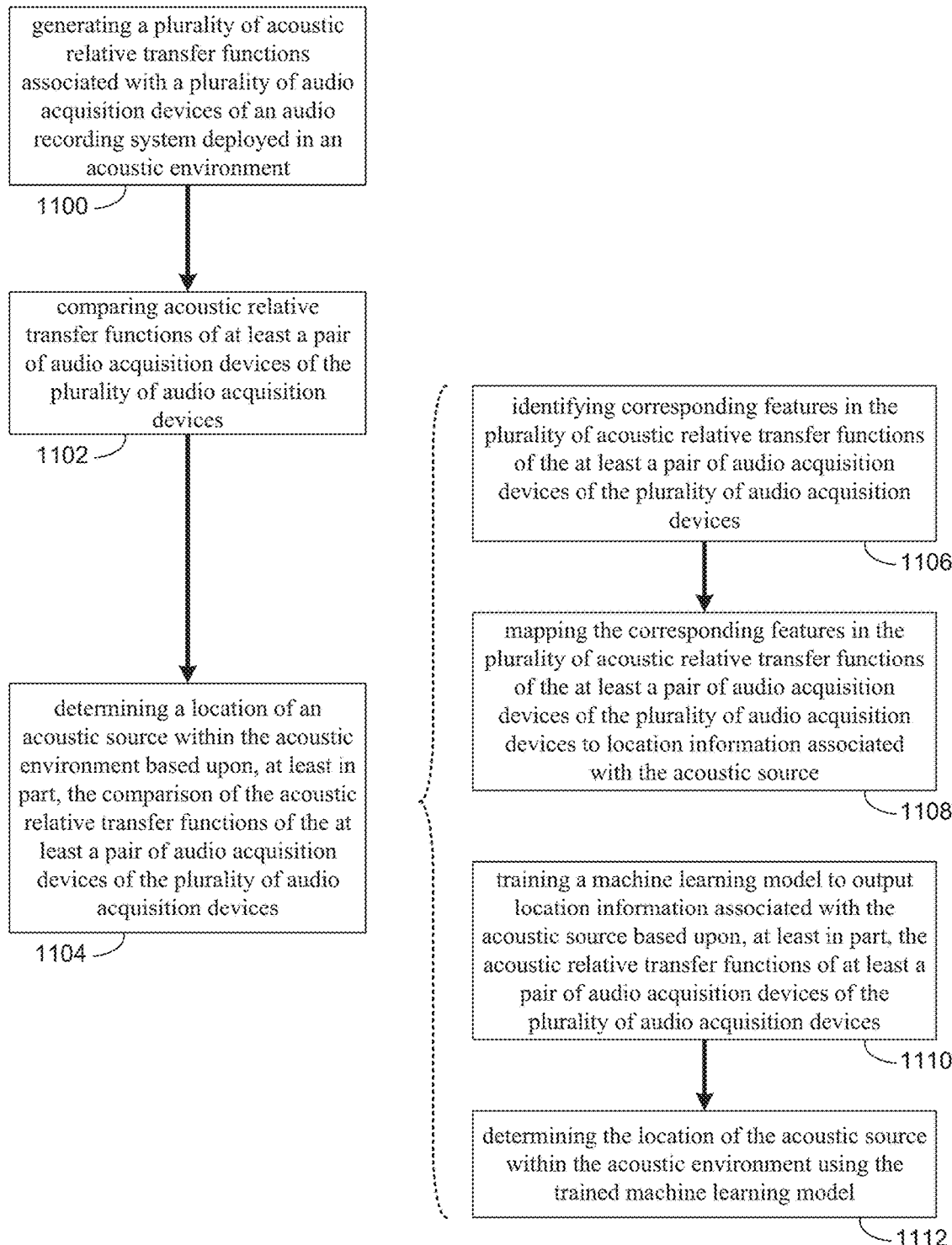
FIG. 11 is a flowchart of one implementation of the multi-channel compression process of FIG. 1.
Figure 12:
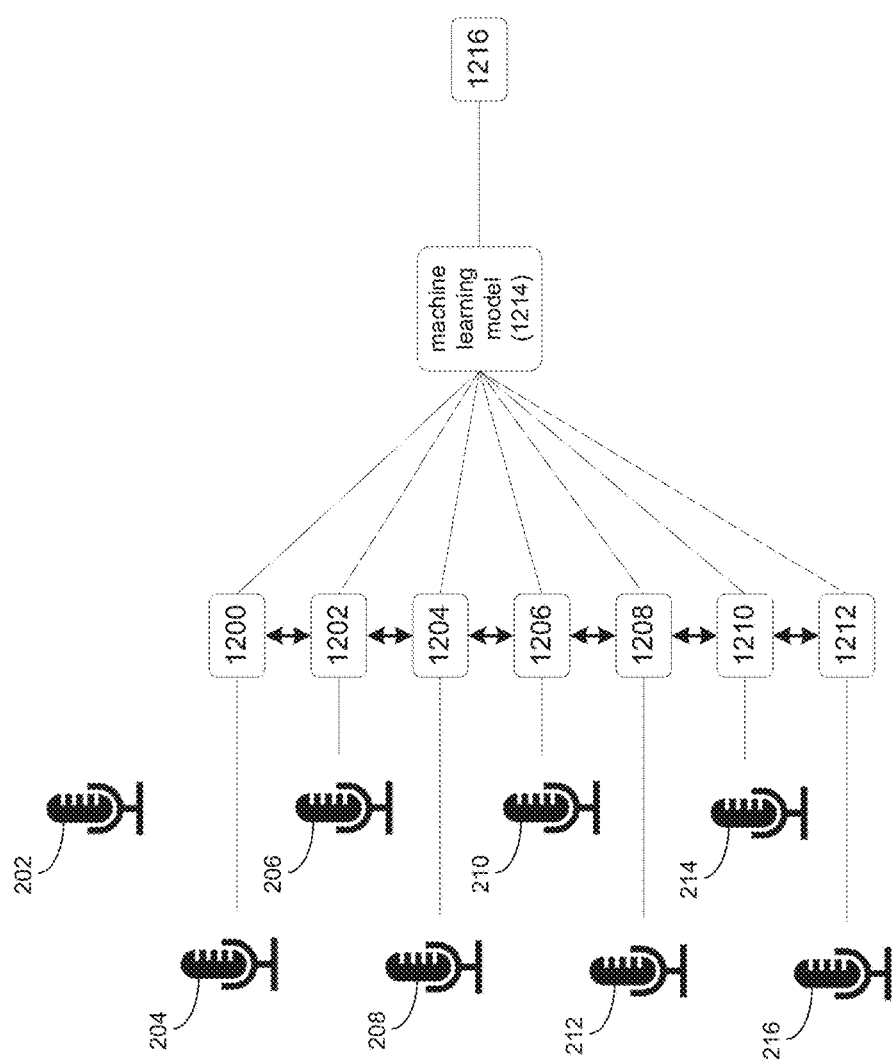
FIG. 12 is a diagrammatic view of a modular ACD system according to one implementation of the multi-channel compression process of FIG. 1.

Referring also to FIGS. 11-12, multi-channel compression process 10 may generate 1100 a plurality of acoustic relative transfer functions associated with a plurality of audio acquisition devices of an audio recording system deployed in an acoustic environment. Acoustic relative transfer functions of at least a pair of audio acquisition devices of the plurality of audio acquisition devices may be compared 1102. Location information associated with an acoustic source within the acoustic environment may be determined 1104 based upon, at least in part, the comparison of the acoustic relative transfer functions of the at least a pair of audio acquisition devices of the plurality of audio acquisition devices.

For example and as will be discussed in greater detail below, multi-channel compression process 10 may process the plurality of acoustic RTFs to locate acoustic sources within an acoustic environment. In one example, the plurality of acoustic relative transfer function when combined with the predefined and known geometry of the audio recording system (i.e., positioning of microphones within a microphone array) may allow for the determination of a speaker's location within an acoustic environment. In some implementations, the ability to locate acoustic sources may help improve the accuracy and/or efficiency of a speech processing system. For example, suppose that a speech processing system is configured to perform speaker diarization. In this example and as discussed above, a speaker tracking component may be utilized to track acoustic sources or speakers within the acoustic environment. As will be discussed in greater detail below, multi-channel compression process 10 may allow the speaker tracking component to use location information associated with the acoustic RTFs along with other features (such as past acoustic RTFs, and/or speaker identification) to improve tracking of the speakers. While an example of improving speaker identification has been described, it will be appreciated that this is for example purposes only and that the determination of location information from acoustic environment using acoustic relative transfer functions and residual signals may improve other speech processing systems within the scope of the present disclosure.

Multi-channel compression process 10 may generate 1100 a plurality of acoustic relative transfer functions associated with a plurality of audio acquisition devices of an audio recording system deployed in an acoustic environment. As discussed above and referring again to FIGS. 5-6, multi-channel compression process 10 may generate 1100 a plurality of acoustic RTFs (e.g., plurality of acoustic RTFs 616) associated with a plurality of audio acquisition devices (e.g., audio acquisition devices 202, 204, 206, 208, 210, 212, 214, 216, 218) of an audio recording system (e.g. audio recording system 104). As shown in FIG. 5, audio acquisition device 202 may receive speech signal 500; audio acquisition device 204 may receive speech signal 502; audio acquisition device 206 may receive speech signal 504; audio acquisition device 208 may receive speech signal 506; audio acquisition device 210 may receive speech signal 508; audio acquisition device 212 may receive speech signal 510; audio acquisition device 214 may receive speech signal 512; audio acquisition device 216 may receive speech signal 514; and audio acquisition device 218 may receive speech signal 516. Referring again to FIG. 6, multi-channel compression process 10 may generate 700 plurality of acoustic RTFs 616 in the manner described above.

As discussed above, multi-channel compression process 10 may transmit 406 the encoded reference audio encounter information (e.g., encoded reference audio encounter information 610), a representation of the plurality of acoustic RTF vectors (e.g., vector of acoustic RTFs 628/vector of acoustic RTF codebook entries), and/or an encoded plurality of residual signals (e.g., encoded plurality of residual signals 632) to a back-end speech processing system. Accordingly, multi-channel compression process 10 may perform audio source localization by comparing 1102 the plurality of acoustic RTFs at the back-end speech processing system with significantly reduced transmission bandwidth between the front-end speech processing system and the back-end speech processing system.

Multi-channel compression process 10 may compare 1102 acoustic relative transfer functions of at least a pair of audio acquisition devices of the plurality of audio acquisition devices. Comparing 1102 acoustic RTFs of at least a pair of audio acquisition devices of the plurality of audio acquisition devices may generally include comparing the acoustic relative transfer function generated 1100 for one audio acquisition device to another acoustic relative transfer function generated 1100 for another audio acquisition device. Referring also to FIG. 12, suppose audio recording system 104 includes e.g., eight audio acquisition devices (e.g., audio acquisition devices 202, 204, 206, 208, 210, 212, 214, 216) of which audio acquisition device 202 is selected as the reference audio acquisition device. In this example, multi-channel compression process 10 may generate 1100 a plurality of acoustic RTFs (e.g., acoustic RTFs 1200, 1202, 1204, 1206, 1208, 1210, 1212) corresponding to the plurality of audio acquisition devices (e.g., audio acquisition devices 204, 206, 208, 210, 212, 214, 216). Multi-channel compression process 10 may compare 1102 the acoustic RTFs by, for example, comparing each acoustic relative transfer function to each other acoustic relative transfer function. In addition, multi-channel compression process 10 may compare 1102 acoustic RTFs based on the known and fixed relationship of the plurality of audio acquisition devices. For example, multi-channel compression process 10 may compare 1102 the acoustic RTFs of adjacent audio acquisition devices and/or a set of adjacent audio acquisition devices (e.g., the nearest "n" number of audio acquisition devices). As shown in FIG. 12, the arrows between the plurality of acoustic RTFs may represent comparing 1102 each of the acoustic RTFs.

Multi-channel compression process 10 may determine 1104 location information associated with an acoustic source within the acoustic environment based upon, at least in part, the comparison of the acoustic relative transfer functions of the at least a pair of audio acquisition devices of the plurality of audio acquisition devices. Location information may generally any information that identifies or defines the relative position of an acoustic source within an acoustic environment. For example, location information may include azimuth information and distance information. Distance information may generally include a distance measurement from the acoustic source (i.e., the distance to the audio recording system measured starting from the acoustic source), and a distance measurement to the acoustic source (i.e., the distance to the acoustic source measured starting from the audio recording system). As described above, with azimuth information and/or a distance information, the location of an acoustic source may be determined. While azimuth information and a distance or range from the acoustic source have been described as example location information, it will be appreciated that various types of location information may be determined 1104 from the comparison of the acoustic RTFs within the scope of the present disclosure.

In some implementations, determining 1104 location information associated with an acoustic source within the acoustic environment based upon, at least in part, the comparison of the acoustic RTFs of at least a pair of audio acquisition devices of the plurality of audio acquisition devices may include identifying 1106 corresponding features in the plurality of acoustic RTFs of the at least a pair of audio acquisition devices of the plurality of audio acquisition devices. For example, multi-channel compression process 10 may identify particular corresponding features in an acoustic relative transfer function of one audio acquisition device and may track the corresponding features across the acoustic RTFs of the other audio acquisition devices. Corresponding features may generally include particular signal characteristics that are identifiable in at least a pair of acoustic RTFs. For example, suppose acoustic relative transfer function 1200 includes one or more peaks or peak values. Multi-channel compression process 10 may compare 1102 acoustic relative transfer function 1200 with acoustic relative transfer function 1202 to identify 1106 the one or more corresponding peaks or peak values. While an example of a peak has been described for a corresponding feature, it will be appreciated that other corresponding features may be identified 1106 within the plurality of acoustic RTFs within the scope of the present disclosure.

In some implementations, determining 1104 location information associated with an acoustic source within the acoustic environment based upon, at least in part, the comparison of the acoustic relative transfer functions of at least a pair of audio acquisition devices of the plurality of audio acquisition devices may include mapping 1108 the corresponding features in the plurality of acoustic relative transfer functions of the at least a pair of audio acquisition devices of the plurality of audio acquisition devices to the location information associated with the acoustic source. Multi-channel compression process 10 may map the corresponding features identified in the plurality of acoustic RTFs to the location information associated with the acoustic source. For example, multi-channel compression process 10 may utilize the fixed and known geometry of the plurality of audio acquisition devices to correlate corresponding features from acoustic RTFs with particular locations of an acoustic source within an acoustic environment. In some implementations, mapping 1108 the corresponding features identified in the plurality of acoustic RTFs to the location information associated with the acoustic source may include correlating the corresponding features with azimuth information and/or distance information. The process of mapping 1108 the corresponding features identified in the plurality of acoustic RTFs to the location information associated with the acoustic source may include calculating the azimuth information and/or distance information using the corresponding features from the plurality of acoustic RTFs.

Multi-channel compression process 10 may train 1110 a machine learning model to output location information associated with the acoustic source based upon, at least in part, the acoustic relative transfer functions of at least a pair of audio acquisition devices of the plurality of audio acquisition devices. For example, multi-channel compression process 10 may utilize a machine learning model (e.g., machine learning model 1214) to receive, as input, the plurality of acoustic RTFs (e.g., acoustic RTFs 1200, 1202, 1204, 1206, 1208 1210, 1212). As discussed above, machine learning model 1214 may be trained to output location information associated with the acoustic source based upon, at least in part, the acoustic RTFs of at least a pair of audio acquisition devices of the plurality of audio acquisition devices. For example, multi-channel compression process 10 may provide training data correlating particular corresponding features across a plurality of acoustic RTFs to location information associated with an acoustic source. As shown in FIG. 12, the location information generated by machine learning model 1214 may be represented as location information 1216. In some implementations, training data for training machine learning model 1214 may correlate particular corresponding features across a plurality of acoustic RTFs for a particular acoustic source to location information associated with the acoustic source. For example, training data may indicate how corresponding features are represented across the plurality of acoustic RTFs for a particular acoustic source (e.g., a known speaker, a particular noise source, a type of noise source, etc.)

In some implementations, determining 1104 location information associated with an acoustic source within the acoustic environment based upon, at least in part, the comparison of the acoustic relative transfer functions of at least a pair of audio acquisition devices of the plurality of audio acquisition devices may include determining 1112 the location information associated with the acoustic source within the acoustic environment using the trained machine learning model. For example and as discussed above, the trained machine learning model (e.g., machine learning model 1214) may be configured to determine 1112 the location information (e.g., location information 1216) for an acoustic source (e.g., encounter participant 226) within the acoustic environment in response to processing the plurality of acoustic RTFs (e.g., acoustic RTFs 1200, 1202, 1204, 1206, 1208, 1210, 1212) as inputs. In this example, machine learning model 1214 may be configured to estimate azimuth information and/or distance information based upon, at least in part, the input acoustic RTFs.

In some implementations, multi-channel compression process 10 may provide the location information associated with the acoustic source to another device or system. For example and as discussed above, suppose mixed-media ACD device 232 includes a speaker tracking component to track acoustic sources (i.e., speakers) within an acoustic environment. In this example and in response to determining the location information based upon, at least in part, the plurality of acoustic RTFs, multi-channel compression process 10 may utilize the location information to enhance the speaker tracking capabilities.

In another example, suppose mixed-media ACD device 232 includes machine vision system 102. In this example, multi-channel compression process 10 may provide the location information associated with the acoustic source based upon, at least in part, the plurality of acoustic RTFs to mixed-media ACD device 232 to configure or modify machine vision system 102. For example, suppose multi-channel compression process 10 determines location information associated with an acoustic source that suggests that an encounter participant is walking around the room. In this example, mixed-media ACD device 232 may configure or modify machine vision system 102 to visually track the new encounter participant using the location information.

In yet another example and as discussed above, multi-channel compression process 10 may update the acoustic relative transfer function codebook for the plurality of audio acquisition devices of the microphone array in response to detecting movement from changes in the acoustic RTFs. In this example, multi-channel compression process 10 may determine that based on the location information that the acoustic relative transfer function codebook needs updating (e.g., to add codebook entries pertaining to the detected change). In one example suppose that multi-channel compression process 10 determines the location of a new encounter participant based upon, at least in part, the plurality of acoustic RTFs, multi-channel compression process 10 may utilize this information to perform a targeted update of the acoustic relative transfer function codebook (e.g., by generating specific acoustic relative transfer function codebook entries).

While several examples have been provided for using the location information, it will be appreciated that these are for example purposes only and that the location information associated with an acoustic source determined based upon, at least in part, the plurality of acoustic RTFs may be used for various other purposes within the scope of the present disclosure.

Acoustic Space Adapted Codebooks

Figure 13:
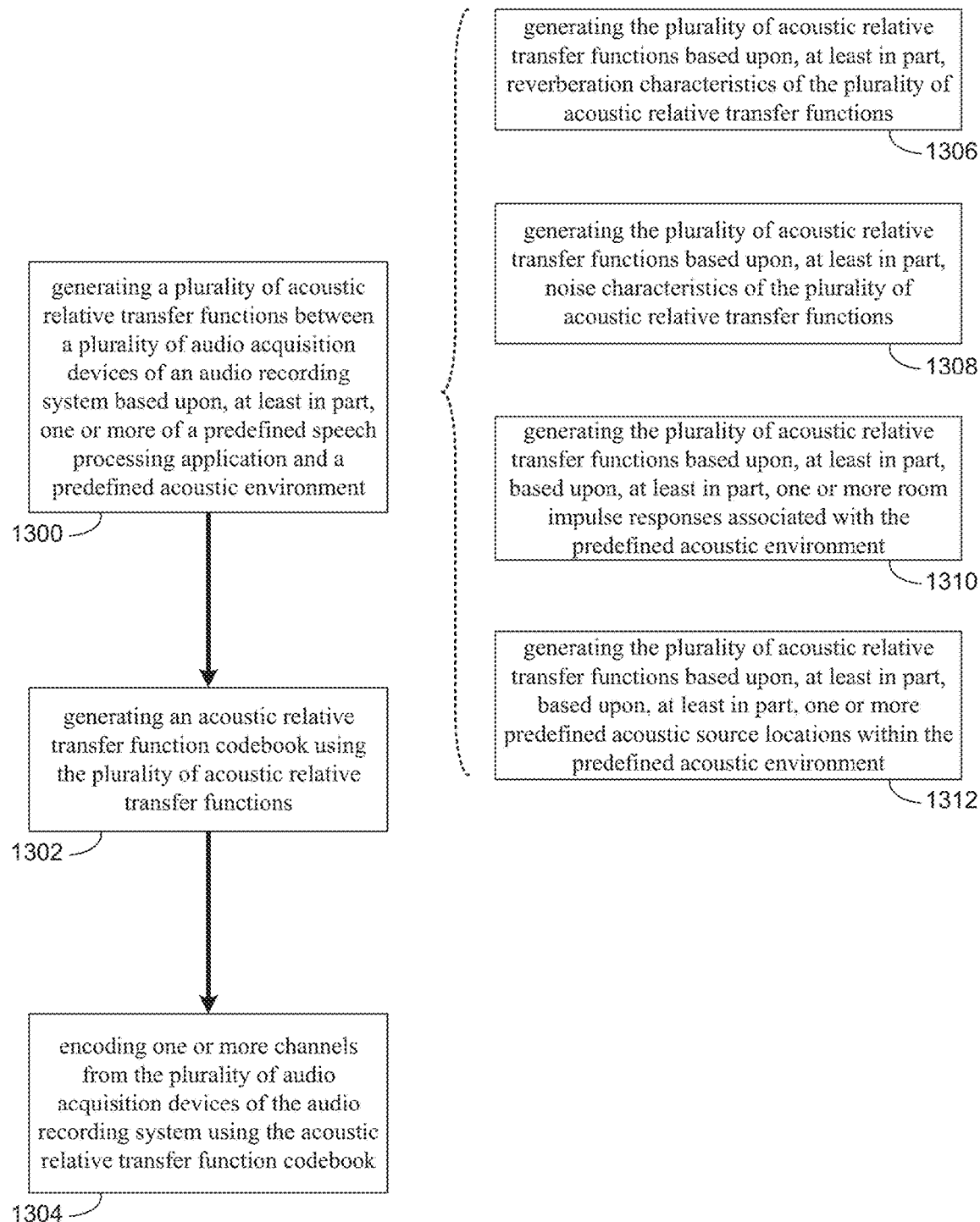
FIG. 13 is a flow chart of one implementation of the multi-channel compression process of FIG. 1.

Referring also to FIG. 13, multi-channel compression process 10 may generate 1300 a plurality of acoustic relative transfer functions between a plurality of audio acquisition devices of an audio recording system based upon, at least in part, one or more of a predefined speech processing application and a predefined acoustic environment. An acoustic relative transfer function codebook may be generated 1302 using the plurality of acoustic relative transfer functions. One or more channels from the plurality of audio acquisition devices of the audio recording system may be encoded 1304 using the acoustic relative transfer function codebook.

For example and as will be discussed in greater detail below, multi-channel compression process 10 may allow for the generation of acoustic relative transfer function codebooks for particular speech processing applications and/or for specific acoustic environments. For instance, suppose that an audio recording system is utilized with a particular speech processing system/application (e.g., ASR). In this example, effective ASR may rely more on early reverberation than later reverberation. Additionally, particular noise signals of each audio acquisition device may be unnecessary and undesirable when transmitting the audio encounter information to a back-end speech processing system. Accordingly, multi-channel compression process 10 may generate focused acoustic relative transfer function codebooks for particular speech processing systems/applications.

Additionally, when an acoustic environment is "known", multi-channel compression process 10 may allow for the generation of a focused set or subset of acoustic relative transfer function codebooks that represent the signal characteristics of the acoustic environment (e.g., reverberation, noise, etc.). For example, suppose that the acoustic environment includes a doctor's office with an examination table and a doctor's desk. In this example, multi-channel compression process 10 may utilize these known locations within the acoustic environment to generate acoustic RTFs for areas that are mostly likely to have an acoustic source and not for areas that are unlikely to have an acoustic source (e.g., open space, noise source, etc.). In this manner, multi-channel compression process 10 may provide acoustic relative transfer function codebooks with fewer entries. Accordingly, time and resources wasted developing robust acoustic RTFs for portions of an acoustic environment unlikely to be utilized during speech processing may be preserved. Additionally, the number of bits required to encode the acoustic relative transfer function codebook may be reduced, thus enhancing the bandwidth for transmitting audio encounter information to a speech processing back-end system.

Multi-channel compression process 10 may generate 1300 a plurality of acoustic relative transfer functions between a plurality of audio acquisition devices of an audio recording system based upon, at least in part, one or more of a predefined speech processing application and a predefined acoustic environment. As discussed above and referring again to FIGS. 5-6, multi-channel compression process 10 may generate 1300 a plurality of acoustic RTFs (e.g., plurality of acoustic RTFs 616) associated with a plurality of audio acquisition devices (e.g., audio acquisition devices 202, 204, 206, 208, 210, 212, 214, 216, 218) of an audio recording system (e.g. audio recording system 104). As shown in FIG. 5, audio acquisition device 202 may receive speech signal 500; audio acquisition device 204 may receive speech signal 502; audio acquisition device 206 may receive speech signal 504; audio acquisition device 208 may receive speech signal 506; audio acquisition device 210 may receive speech signal 508; audio acquisition device 212 may receive speech signal 510; audio acquisition device 214 may receive speech signal 512; audio acquisition device 216 may receive speech signal 514; and audio acquisition device 218 may receive speech signal 516.

When generating 1300 the plurality of acoustic relative transfer functions between the plurality of audio acquisition devices of the audio recording system, multi-channel compression process 10 may generate acoustic RTFs generally as described and populate the acoustic RTF codebook with a subset of the generated acoustic RTFs (e.g., by filtering a subset of acoustic RTFs from the plurality of acoustic RTFs based upon, at least in part, one or more of a predefined speech processing application and a predefined acoustic environment) and/or may generate acoustic RTFs specifically for the predefined speech processing system/application and/or predefined acoustic environment. In this manner, multi-channel compression process 10 may generate acoustic RTFs generally from which a subset may be used for a particular speech processing application and/or a specific acoustic environment; or multi-channel compression process 10 may generate specific acoustic RTFs for the particular speech processing application and/or the specific acoustic environment.

As discussed above, multi-channel compression process 10 may generate 1300 a plurality of acoustic RTFs for a predefined speech processing application/system. In one example, the predefined speech processing application includes automated speech recognition (ASR). As discussed above and is known in the art, effective ASR may rely more on certain signal characteristics. For example, an effective ASR system may utilize early reverberation (i.e., reflections obtained within about the first fifty milliseconds) while avoiding later reverberation (i.e., reflections obtained arriving after about fifty milliseconds). Additionally, in ASR, the particular noise signals of each audio acquisition device may be unnecessary and undesirable when transmitting the audio encounter information to a back-end speech processing system. Accordingly, multi-channel compression process 10 may generate a plurality of acoustic RTFs for the predefined speech processing application based upon, at least in part, signal characteristics associated with the predefined speech processing application. While an example of ASR has been provided for the predefined speech processing application, it will be appreciated that this is for example purposes only and that multi-channel compression process 10 may generate 1300 acoustic RTFs for any predefined speech processing application within the scope of the present disclosure.

Generating 1300 a plurality of acoustic relative transfer functions between a plurality of audio acquisition devices of an audio recording system based upon, at least in part, one or more of a predefined speech processing application and a predefined acoustic environment may include generating 1306 the plurality of acoustic relative transfer functions based upon, at least in part, reverberation characteristics of the plurality of acoustic relative transfer functions. Continuing with the above example where the predefined speech processing application/system is ASR, multi-channel compression process 10 may generate 1306 a plurality of acoustic RTFs for the plurality of audio acquisition devices that include early reverberation. For example, multi-channel compression process 10 may generate 1306 acoustic RTFs that include reflections within e.g., the first fifty milliseconds of a speech signal being obtained. As is known in the art, early reflections may enhance the performance of ASR systems. In another example, multi-channel compression process 10 may not generate acoustic RTFs with later reverberation. For instance, multi-channel compression process 10 may not generate and/or may filter any acoustic RTFs from the plurality of acoustic RTFs for ASR that include reflections after e.g., the first fifty milliseconds. In this manner, multi-channel compression process 10 may generate 1306 the plurality of acoustic RTFs based upon, at least in part, reverberation characteristics of the plurality of acoustic RTFs.

In some implementations, generating 1300 a plurality of acoustic relative transfer functions between a plurality of audio acquisition devices of an audio recording system based upon, at least in part, one or more of a predefined speech processing application and a predefined acoustic environment may include generating 1308 the plurality of acoustic relative transfer functions based upon, at least in part, noise characteristics of the plurality of acoustic relative transfer functions. Continuing with the above example where the predefined speech processing application/system is ASR, multi-channel compression process 10 may not generate acoustic RTFs with noise components. For instance, multi-channel compression process 10 may not generate and/or may filter any acoustic RTFs from the plurality of acoustic RTFs for ASR that include the noise field captured across the different audio acquisition devices. For example, ASR typically does not benefit from processing a noise field(s). Accordingly, multi-channel compression process 10 may generate acoustic RTFs without a noise field and/or may filter acoustic RTFs with a noise field from the plurality of acoustic RTFs to generate a relevant, targeted subset of acoustic RTFs that do not include a noise field. In this manner, multi-channel compression process 10 may generate 1308 the plurality of acoustic RTFs for the ASR system based upon, at least in part, noise characteristics of the plurality of acoustic RTFs.

As discussed above for the example of ASR, multi-channel compression process 10 may generate 1300 a plurality of acoustic RTFs to utilize for generating an acoustic RTF codebook that minimizes word error rate (WER). For example with an ASR system, multi-channel compression process 10 may retain the least amount of noise and reverberation while keeping all phase information intact for spatial filtering. While the above examples have referenced reverberation and noise characteristics, it will be appreciated that multi-channel compression process 10 may generate 1300 the plurality of acoustic RTFs based upon, at least in part, any signal characteristics or combination of signal characteristics of the plurality of acoustic RTFs within the scope of the present disclosure.

As discussed above, multi-channel compression process 10 may generate 1300 a plurality of acoustic RTFs for a predefined acoustic environment. A predefined acoustic environment may generally include an environment with one or more acoustic sources that may be recorded using an audio recording system. The predefined nature of the acoustic environment may indicate known locations for the audio recording system within the acoustic environment; known dimensions of the acoustic environment; known locations for furniture within the acoustic environment; and/or known positions where speakers are like to be and/or known positions of noise sources. In one example, the predefined acoustic environment may include a medical office environment with one or more doctor's offices. As discussed above, a given acoustic environment may have certain acoustic properties based upon the shape of the room, the size of the room, the number and placement of furniture (e.g., an examination table, patient seating, a doctor's desk, etc.). In this example, given the placement of furniture, the likely positions for speakers to be standing the room, the known noise sources (e.g., HVAC system), etc., multi-channel compression process 10 may generate acoustic RTFs that represent various target areas for effective speech processing. Accordingly, multi-channel compression process 10 may generate a plurality of acoustic RTFs for the predefined acoustic environment based upon, at least in part, one or more room impulse responses and/or one or more predefined acoustic source locations associated with the acoustic environment. While an example of a medical office environment has been provided for the predefined acoustic environment, it will be appreciated that this is for example purposes only and that multi-channel compression process 10 may generate 1300 acoustic RTFs for any predefined acoustic environment within the scope of the present disclosure.

Generating 1300 a plurality of acoustic relative transfer functions between a plurality of audio acquisition devices of an audio recording system based upon, at least in part, one or more of a predefined speech processing application and a predefined acoustic environment may include generating 1310 the plurality of acoustic relative transfer functions based upon, at least in part, based upon, at least in part, one or more room impulse responses associated with the predefined acoustic environment. For example and referring again to FIG. 3, suppose that the predefined acoustic environment includes a medical office environment with multiple encounter participants (e.g., encounter participants 226, 228, 230, 236). In this example, the reverberation characteristics of the predefined acoustic environment may be known in the form of one or more room impulse responses. As is known in the art, a room impulse response is a representation of the reverberation observed between an acoustic source and an audio acquisition device deployed within a room. In some implementations, multi-channel compression process 10 may utilize the one or more room impulse responses associated with the acoustic environment to generate 1310 acoustic RTFs for commensurate with the expected reverberation of the acoustic environment. In another example, multi-channel compression process 10 may not generate acoustic RTFs with reverberation characteristics that are not possible or likely to be observed within the acoustic environment. For instance, multi-channel compression process 10 may not generate and/or may filter any acoustic RTFs from the plurality of acoustic RTFs with reverberation characteristics inconsistent with the one or more room impulse responses. In this manner, multi-channel compression process 10 may generate 1310 the plurality of acoustic RTFs based upon, at least in part, based upon, at least in part, one or more room impulse responses associated with the predefined acoustic environment.

Generating 1300 a plurality of acoustic relative transfer functions between a plurality of audio acquisition devices of an audio recording system based upon, at least in part, one or more of a predefined speech processing application and a predefined acoustic environment may include generating 1312 the plurality of acoustic relative transfer functions based upon, at least in part, based upon, at least in part, one or more predefined acoustic source locations within the predefined acoustic environment. As discussed above and continuing with the example of FIG. 3, suppose the acoustic environment includes a doctor's office with the doctor's desk, a patient seating area, and an examination table. In this example, multi-channel compression process 10 may utilize these predefined acoustic source locations to generate 1312 acoustic RTFs that include these known locations while not generating acoustic RTFs and/or filtering acoustic RTFs from the plurality of RTFs that are outside of these predefined acoustic source locations. In this manner, multi-channel compression process 10 may generate 1312 the plurality of acoustic RTFs based upon, at least in part, based upon, at least in part, one or more predefined acoustic source locations within the predefined acoustic environment.

Multi-channel compression process 10 may generate 1302 an acoustic relative transfer function codebook using the plurality of acoustic relative transfer functions. As discussed above, an acoustic relative transfer function codebook (e.g., acoustic relative transfer function codebook 622) may include a data structure configured to store the one or more acoustic RTFs (e.g., plurality of acoustic RTFs 616) mapping characteristics from the speech signals obtained by the reference audio acquisition device to the speech signals of another audio acquisition device. Generating 1302 the acoustic relative transfer codebook (e.g., acoustic relative transfer codebook 622) may include generating a plurality of acoustic RTFs (e.g., plurality of acoustic RTFs 616) as described above for various locations, speakers, etc. within an acoustic environment and associating each acoustic relative transfer function with a unique "code" or identifier. In this manner, each acoustic relative transfer function may be uniquely identifiable from the plurality of acoustic RTFs of the acoustic relative transfer function codebook.

In some implementations, the acoustic relative transfer function codebook (e.g., acoustic relative transfer codebook 622) may be generated 1302 for various reference audio acquisition devices of the plurality of audio acquisition devices (e.g., audio acquisition devices 202, 204, 206, 208, 210, 212, 214, 216, 218) of the audio recording system (e.g., audio recording system 104). Generating 1302 the acoustic relative transfer function codebook (e.g., acoustic relative transfer codebook 622) may include receiving speech signals from various pairs of audio acquisition devices and generating acoustic RTFs for each pair of audio acquisition devices, as discussed above. As will be discussed in greater detail below, multi-channel compression process 10 may also generate and/or store speaker location information (e.g., range, azimuth, elevation, and/or orientation of speakers) associated with the one or more acoustic RTFs (e.g., acoustic relative transfer function 618).

In some implementations, generating 1300 a plurality of acoustic RTFs between a plurality of audio acquisition devices of an audio recording system based upon, at least in part, one or more of a predefined speech processing application and a predefined acoustic environment may result in a more efficient, more target acoustic relative transfer function codebook for the predefined speech processing application and/or predefined acoustic environment by including the most relevant acoustic RTFs and omitting unnecessary or unlikely acoustic RTFs. In addition, with fewer acoustic RTF codebook entries, multi-channel compression process 10 may enhance transmission bandwidth compared to exhaustive acoustic RTF codebooks.

For example and as discussed above, suppose that the acoustic environment is an enclosed room measuring 3.5 meters by 3 meters with audio recording system 104 mounted on a wall of the room. In this example, suppose that the room may include 2.5 meters of an arch of potential positions in the room where the arc may be swept in 0.5 degree steps in azimuth and 1 centimeter steps in range. Accordingly, the number of acoustic relative transfer function entries for a codebook for this room may be 250*360=90,000 entries for 90,000 acoustic RTFs. For this particular room, only 17 bits may be needed to represent the codebook entries for each frame. Further suppose that codebook entries are transmitted every 10 milliseconds. Then the required additional bit rate for the acoustic relative transfer function codebook transmission would be 1.7 kilobits per second for each additional channel. Therefore, for an 8 channel audio signal, the acoustic relative transfer function component would be an addition of just 1.7 kilobits per second.

Now suppose that only 65,000 entries for 65,000 acoustic RTFs are generated 1300 for a predefined speech processing application and/or a predefined acoustic environment. In this example, only 16 bits may be needed to represent the codebook entries for each frame. Further suppose that codebook entries are transmitted every 10 milliseconds. Then the required additional bit rate for the acoustic relative transfer function codebook transmission would be 1.6 kilobits per second for each additional channel. This would reduce the required additional bit rate for the acoustic relative transfer function codebook transmission from 1.7 kilobits per second to 1.6 kilobits per second for each additional channel.

Multi-channel compression process 10 may encode 1304 one or more channels from the plurality of audio acquisition devices of the audio recording system using the acoustic relative transfer function codebook. As discussed above, with an acoustic relative transfer function codebook generated for a predefined speech processing application and/or a predefined acoustic environment, multi-channel compression process 10 may encode 1304 and transmit a vector of acoustic relative transfer function codebook entries for the plurality of audio acquisition devices as opposed to transmitting the acoustic RTFs themselves. In this manner, multi-channel compression process 10 may reduce the transmission bandwidth required for transmitting audio encounter information to a back-end speech processing system.

Decomposing RTFs

Figure 14:
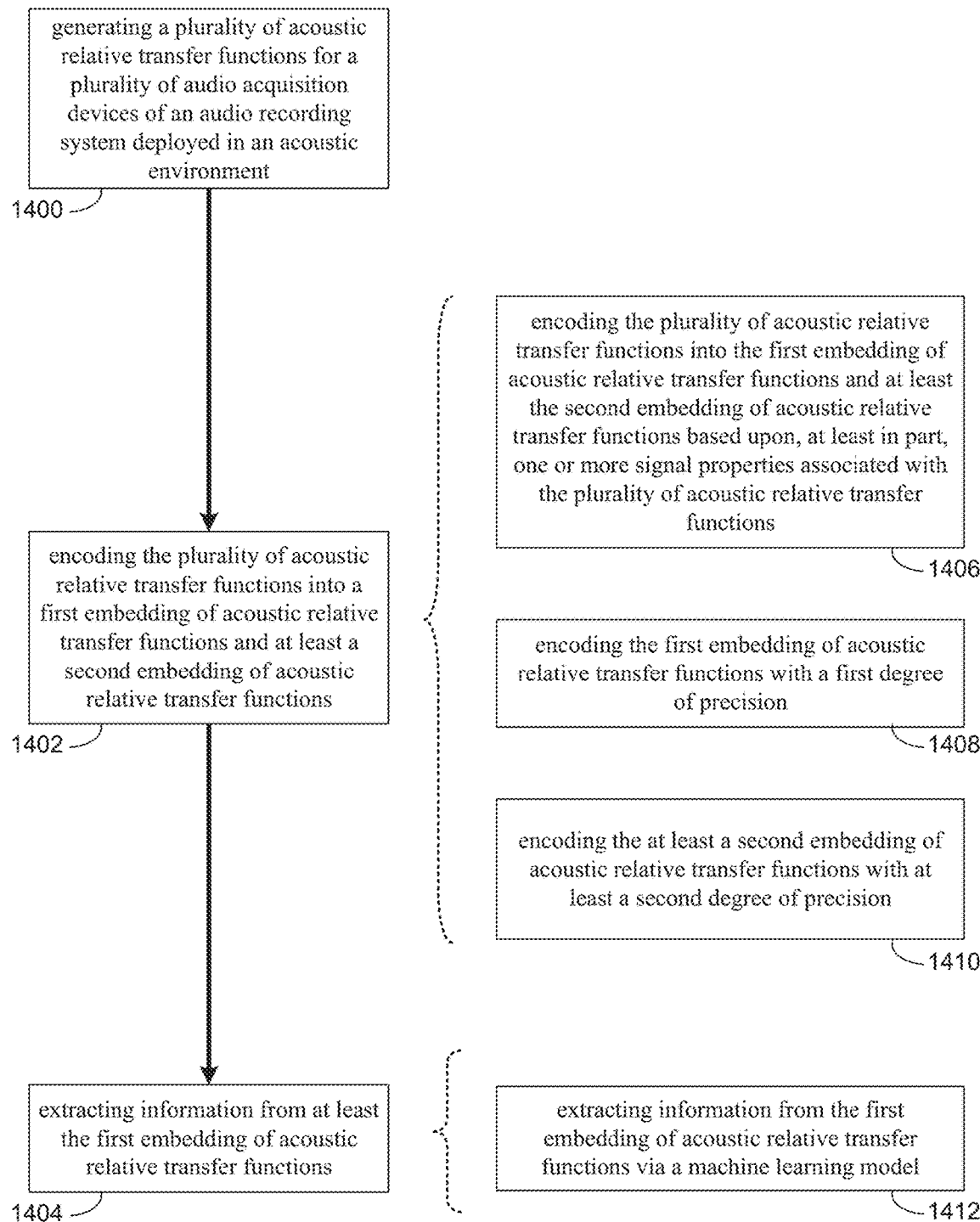
FIG. 14 is a flow chart of one implementation of the multi-channel compression process of FIG. 1.
Figure 15:
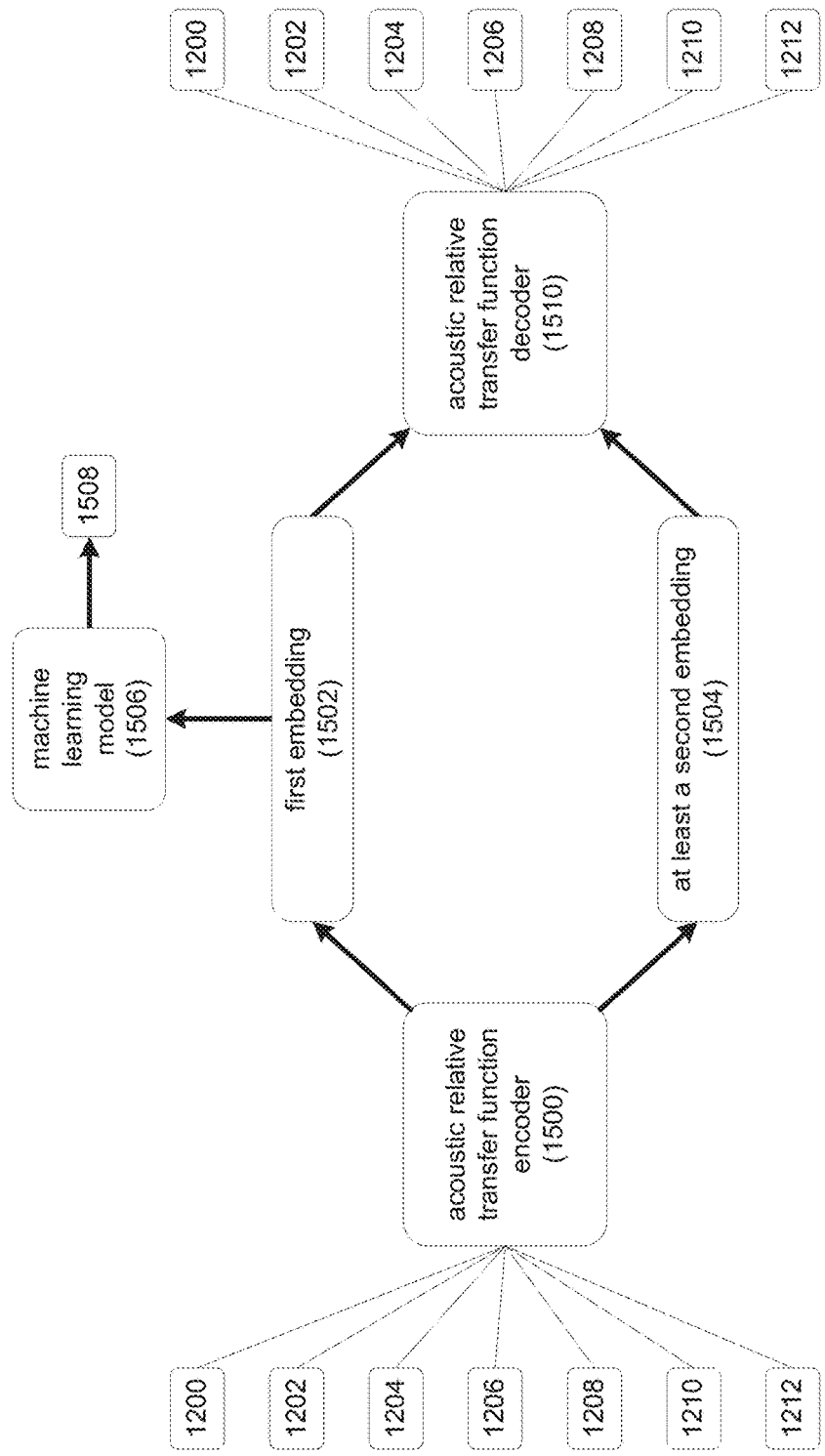
FIG. 15 is a diagrammatic view of a modular ACD system according to one implementation of the multi-channel compression process of FIG. 1.

Referring also to FIGS. 14-15, multi-channel compression process 10 may generate 1400 a plurality of acoustic relative transfer functions for a plurality of audio acquisition devices of an audio recording system deployed in an acoustic environment. The plurality of acoustic relative transfer functions may be encoded 1402 into a first embedding of acoustic relative transfer functions and at least a second embedding of acoustic relative transfer functions. Information may be extracted 1404 from at least the first embedding of acoustic relative transfer functions.

As discussed above, acoustic RTFs may be utilized to represent multi-channel speech signals from a plurality of audio acquisition devices of an audio recording system using a speech signal from a reference audio acquisition device. In addition to reducing the bandwidth associated with transmitting multi-channel speech signals to a back-end speech processing system, the plurality of acoustic RTFs may be utilized to detect certain properties associated with an acoustic environment.

For example and as will be discussed in greater detail below, multi-channel compression process 10 may decompose the plurality of acoustic RTFs into a plurality of embeddings representing different aspects of the information in the acoustic RTF. In some implementations, different embeddings may be encoded with varying degrees of precision based on the information in the acoustic RTF. Accordingly, multi-channel compression process 10 may allow a plurality of acoustic RTFs to be split into different embeddings based on the information in the acoustic RTFs and to encode the embeddings separately based on the information therein. In this manner, multi-channel compression process 10 may reduce bandwidth associated with transmitting the acoustic RTFs to a back-end speech processing system by providing variable encoding for particular embeddings of acoustic RTFs.

Multi-channel compression process 10 may generate 1400 a plurality of acoustic relative transfer functions for a plurality of audio acquisition devices of an audio recording system deployed in an acoustic environment. As discussed above and referring again to FIGS. 5-6, multi-channel compression process 10 may generate 1400 a plurality of acoustic RTFs (e.g., plurality of acoustic RTFs 616) associated with a plurality of audio acquisition devices (e.g., audio acquisition devices 202, 204, 206, 208, 210, 212, 214, 216, 218) of an audio recording system (e.g. audio recording system 104). As shown in FIG. 5, audio acquisition device 202 may receive speech signal 500; audio acquisition device 204 may receive speech signal 502; audio acquisition device 206 may receive speech signal 504; audio acquisition device 208 may receive speech signal 506; audio acquisition device 210 may receive speech signal 508; audio acquisition device 212 may receive speech signal 510; audio acquisition device 214 may receive speech signal 512; audio acquisition device 216 may receive speech signal 514; and audio acquisition device 218 may receive speech signal 516. Referring again to FIG. 6, multi-channel compression process 10 may generate 1400 plurality of acoustic RTFs 616 in the manner described above.

Multi-channel compression process 10 may encode 1402 the plurality of acoustic relative transfer functions into a first embedding of acoustic relative transfer functions and at least a second embedding of acoustic relative transfer functions. As described above, encoding may generally include the process of compressing and reformatting data from one form to a target form. Referring also to FIG. 15, multi-channel compression process 10 may encode, via an encoder/codec (e.g., acoustic relative transfer function encoder 1500), the plurality of acoustic RTFs (e.g., acoustic RTFs 1200, 1202, 1204, 1206, 1208, 1210, 1212) into a first embedding of acoustic RTFs (e.g., first embedding 1502) and at least a second embedding of acoustic RTFs (e.g., at least a second embedding 1504). In some implementations, the encoder (e.g., acoustic RTF encoder 1500) may be a machine learning model trained to convert acoustic RTFs into a plurality of embeddings.

Encoding 1402 the plurality of acoustic relative transfer functions into a first embedding of acoustic relative transfer functions and at least a second embedding of acoustic relative transfer functions may include encoding 1406 the plurality of acoustic relative transfer functions into the first embedding of acoustic relative transfer functions and at least the second embedding of acoustic relative transfer functions based upon, at least in part, one or more signal properties associated with the plurality of acoustic relative transfer functions. For example, multi-channel compression process 10 may encode 1402 the plurality of acoustic RTFs (e.g., plurality of acoustic RTFs 1200, 1202, 1204, 1206, 1208, 1210, 1212) into any number of embeddings, where each embedding may include different information from the plurality of acoustic RTFs.

In some implementations, the first embedding of acoustic RTFs (e.g., first embedding 1502) may be encoded 1406 to include location information associated with one or more acoustic sources within the acoustic environment. As discussed above, location information associated with one or more acoustic sources may generally include azimuth information, distance information, elevation information, etc. that may be identified within the plurality of acoustic RTFs in the form of corresponding features across the acoustic RTFs. For example and as discussed above, a peak may be identified within the plurality of acoustic RTFs as a function of time. While an example of location information has been described for the information of the first embedding (e.g., first embedding 1502), it will be appreciated that this is for example purposes only and that the first embedding may include any type of information from the plurality of acoustic RTFs within the scope of the present disclosure.

Continuing with the above example, the at least a second embedding of acoustic RTFs (e.g., at least a second embedding 1504) may be encoded 1406 to include reverberation information associated with the acoustic environment. Reverberation information associated with the acoustic environment may generally include information about how audio encounter information reflects within the acoustic environment before being obtained by the plurality of audio acquisition devices. While an example of reverberation information has been described for the information of the at least a second embedding (e.g., at least a second embedding 1504), it will be appreciated that this is for example purposes only and that the at least a second embedding may include any type of information from the plurality of acoustic RTFs within the scope of the present disclosure.

Encoding 1402 the plurality of acoustic relative transfer functions into a first embedding of acoustic relative transfer functions and at least a second embedding of acoustic relative transfer functions may include encoding 1408 the first embedding of acoustic relative transfer functions with a first degree of precision; and encoding 1410 the at least a second embedding of acoustic relative transfer functions with at least a second degree of precision. For example, suppose multi-channel compression process 10 encodes 1402 the plurality of acoustic RTFs (e.g., plurality of acoustic RTFs 1200, 1202, 1204, 1206, 1208, 1210, 1212) into first embedding 1502 with location information and at least a second embedding 1504 with reverberation information. In this example, first embedding 1502 may include an "early" part of the plurality of acoustic RTFs while at least a second embedding 1504 may include the "late" part of the plurality of acoustic RTFs. Accordingly, multi-channel compression process 10 may encode 1408 first embedding 1502 with a first degree of precision (e.g., a high degree of precision consuming more bandwidth to preserve the information) and may encode 1410 at least a second embedding 1504 with at least a second degree of precision (e.g., a low degree of precision consuming less bandwidth to allow some information loss). In this manner and as will be discussed in greater detail below, by encoding the plurality of acoustic RTFs into a plurality of embeddings, multi-channel compression process 10 may perform various types of information extraction on certain embeddings without modifying the plurality of acoustic RTFs.

Multi-channel compression process 10 may extract 1404 information from at least the first embedding of acoustic relative transfer functions. For example and as discussed above, the plurality of acoustic RTFs may include information (i.e., reverberation information, location information, etc.) associated with the acoustic environment and/or one or more acoustic sources. However, this information may be distributed through the plurality of acoustic RTFs. Accordingly, multi-channel compression process 10 may allow information to be extracted 1404 from an embedding of acoustic RTFs.

Extracting 1404 information from the first embedding of acoustic relative transfer functions may include extracting 1412 information from the first embedding of acoustic relative transfer functions via a machine learning model. Referring again to FIG. 15, a machine learning model (e.g., machine learning model 1506) may be configured to receive, as input, an embedding (e.g., first embedding 1502) and may extract information from embedding (e.g., information 1508 as shown in FIG. 15). In some implementations, multi-channel compression process 10 may train machine learning model 1506 to extract particular information from the at least first embedding (e.g., first embedding 1502). Suppose, for example purposes only, that first embedding 1502 includes location information associated with one or more acoustic sources within the acoustic environment. In this example, multi-channel compression process 10 may extract 1412 location information 1508 from first embedding 1502 using machine learning model 1506. In this manner, multi-channel compression process 10 may allow specific types of information to be extracted 1412 from embeddings of acoustic RTFs using a machine learning model. In some implementations, machine learning model 1506 may be trained to minimize the direction-of-arrival (DOA) estimation error between the reconstructed signal after encoding and the uncompressed signal when extracting information from an embedding (e.g., first embedding 1502). While FIG. 15 shows a single machine learning model receiving input from first embedding 1502, it will be appreciated that any number of machine learning models may be used for any number of embeddings of acoustic RTFs to extract 1412 any type of information within the scope of the present disclosure.

In some implementations, multi-channel compression process 10 may similarly decode the first embedding of acoustic RTFs (e.g., first embedding 1502) and the at least a second embedding of acoustic RTFs (e.g., at least a second embedding 1504) back into the plurality of acoustic RTFs. Referring again to FIG. 15, multi-channel compression process 10 may decode, via a decoder (e.g., acoustic RTF decoder 1510) back into the plurality of acoustic RTFs (e.g., plurality of acoustic RTFs 1200, 1202, 1204, 1206, 1208, 1210, 1212). In this manner, information may be extracted from particular embeddings without altering the plurality of acoustic RTFs.

Audio Visual Sensor Driven Multi-Channel Speech Compression

Figure 16:
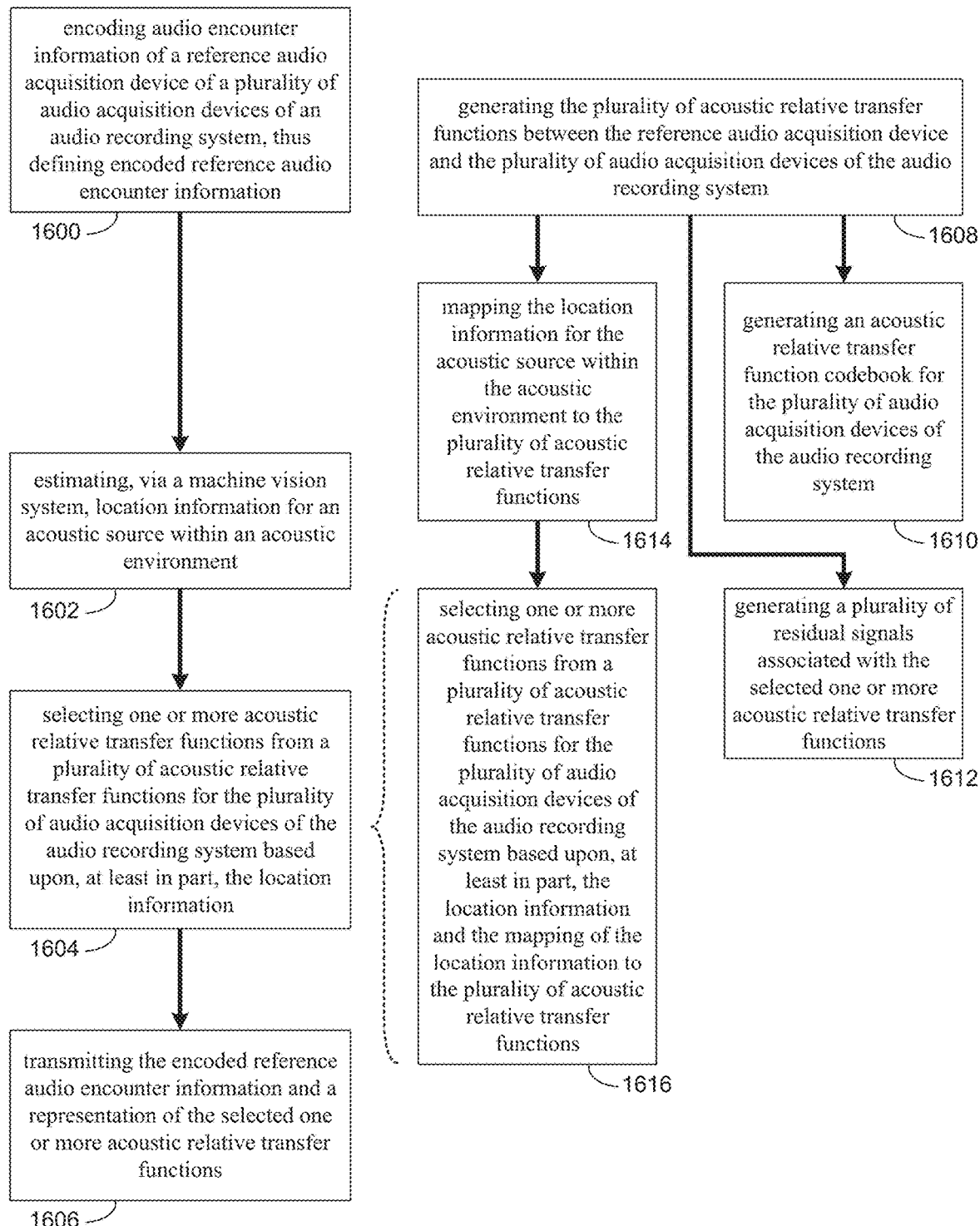
FIGS. 16-17 are flow charts of various implementations of the multi-channel compression process of FIG. 1.

Referring also to FIG. 16, multi-channel compression process 10 may encode 1600 audio encounter information of a reference audio acquisition device of a plurality of audio acquisition devices of an audio recording system, thus defining encoded reference audio encounter information. Location information may be estimated 1602, via a machine vision system, for an acoustic source within an acoustic environment. One or more acoustic relative transfer functions may be selected 1604 from a plurality of acoustic relative transfer functions for the plurality of audio acquisition devices of the audio recording system based upon, at least in part, the location information. The encoded reference audio encounter information and a representation of the selected one or more acoustic relative transfer function may be transmitted 1606.

As discussed above, acoustic RTFs may be utilized to represent multi-channel speech signals from a plurality of audio acquisition devices of an audio recording system using a speech signal from a reference audio acquisition device. As will be discussed in greater detail below, multi-channel compression process 10 may incorporate location information from one or more visual sensors or machine vision systems to "drive" the compression of multi-channel speech signals as discussed above. For example, a machine vision system may be installed in doctor's office and configured to determine location information for one or more acoustic sources. The location information may be used to select a specific acoustic RTF from a plurality of acoustic RTFs. This approach may allow the selection of acoustic RTFs without estimating RTFs at run-time, thus making the process more robust to potential acoustic RTF estimation errors.

Multi-channel compression process 10 may encode 1600 audio encounter information of a reference audio acquisition device of a plurality of audio acquisition devices of an audio recording system, thus defining encoded reference audio encounter information. As discussed above and referring again to FIG. 5, multi-channel compression process 10 may encode 1600 speech signals from the reference audio acquisition device (e.g., reference audio acquisition device 202) to compress the speech signal (e.g., speech signal 500) for more efficient transmission to a speech processing system back-end (e.g., represented in FIG. 6 as ACD compute system 12). To encode 1600 speech signal 500 obtained by audio acquisition device 202, multi-channel compression process 10 may utilize any codec (e.g., a lossy codec, lossless codec, etc.). This codec is represented in the example of FIG. 6, by reference encoder 608. It will be appreciated that any codec/encoder may be used to encode 1600 audio encounter information to generate encoded reference audio encounter information (e.g., encoded audio encounter information 610).

Multi-channel compression process 10 may generate 1608 the plurality of acoustic relative transfer functions between the reference audio acquisition device and the plurality of audio acquisition devices of the audio recording system. As discussed above and referring again to FIGS. 5-6, multi-channel compression process 10 may generate 1608 a plurality of acoustic RTFs (e.g., plurality of acoustic RTFs 616) associated with a plurality of audio acquisition devices (e.g., audio acquisition devices 202, 204, 206, 208, 210, 212, 214, 216, 218) of an audio recording system (e.g. audio recording system 104). As shown in FIG. 5, audio acquisition device 202 may receive speech signal 500; audio acquisition device 204 may receive speech signal 502; audio acquisition device 206 may receive speech signal 504; audio acquisition device 208 may receive speech signal 506; audio acquisition device 210 may receive speech signal 508; audio acquisition device 212 may receive speech signal 510; audio acquisition device 214 may receive speech signal 512; audio acquisition device 216 may receive speech signal 514; and audio acquisition device 218 may receive speech signal 516. Referring again to FIG. 6, multi-channel compression process 10 may generate 1608 plurality of acoustic RTFs 616 in the manner described above.

Generating 1608 a plurality of acoustic relative transfer functions between the reference audio acquisition device and the plurality of audio acquisition devices of the audio recording system may include generating 1610 an acoustic relative transfer function codebook for the plurality of audio acquisition devices of the audio recording system. As discussed above and referring again to FIG. 6, an acoustic relative transfer function codebook (e.g., acoustic relative transfer function codebook 622) may include a data structure configured to store the one or more acoustic RTFs (e.g., plurality of acoustic RTFs 616) mapping characteristics from the speech signals obtained by the reference audio acquisition device to the speech signals of another audio acquisition device. Generating 1608 the acoustic relative transfer codebook (e.g., acoustic relative transfer codebook 622) may include generating a plurality of acoustic RTFs (e.g., plurality of acoustic RTFs 616) as described above for various locations, speakers, etc. within an acoustic environment and associating each acoustic relative transfer function with a unique "code" or identifier. In this manner, each acoustic relative transfer function may be uniquely identifiable from the plurality of acoustic RTFs of the acoustic relative transfer function codebook.

In some implementations, the acoustic relative transfer function codebook (e.g., acoustic relative transfer codebook 622) may be generated 1608 for various reference audio acquisition devices of the plurality of audio acquisition devices (e.g., audio acquisition devices 202, 204, 206, 208, 210, 212, 214, 216, 218) of the audio recording system (e.g., audio recording system 104). Generating 1608 the acoustic relative transfer function codebook (e.g., acoustic relative transfer codebook 622) may include receiving speech signals from various pairs of audio acquisition devices and generating acoustic RTFs for each pair of audio acquisition devices, as discussed above. As will be discussed in greater detail below, multi-channel compression process 10 may also generate and/or store speaker location information (e.g., range, azimuth, elevation, and/or orientation of speakers) associated with the one or more acoustic RTFs (e.g., acoustic relative transfer function 618).

Generating 1608 a plurality of acoustic relative transfer functions between the reference audio acquisition device and the plurality of audio acquisition devices of the audio recording system may include generating 1612 a plurality of residual signals associated with the selected one or more acoustic relative transfer functions. As discussed above, a residual signal may generally include the difference between the speech signal obtained by a reference audio acquisition device and the speech signal obtained by another audio acquisition device when estimating the acoustic relative transfer function. With the plurality of residual signals, multi-channel compression process 10 may represent any mismatch between the selected acoustic RTF and/or acoustic RTF codebook entry. In this manner, signal information may be preserved when transmitting the multi-channel audio encounter information despite potentially imperfect acoustic RTFs and/or acoustic RTF codebook entries.

Multi-channel compression process 10 may map 1614 the location information for the acoustic source within the acoustic environment to the plurality of acoustic relative transfer functions. For example and as discussed above, suppose the acoustic environment includes a doctor's office with the doctor's desk, a patient seating area, and an examination table. In this example, multi-channel compression process 10 may map 1614 these predefined locations where a speaker is most likely to speak within the acoustic environment to the corresponding acoustic RTFs. In some implementations, multi-channel compression process 10 may map 1614 the location information for an acoustic source within the acoustic environment to particular entries of an acoustic RTF codebook. For example, multi-channel compression process 10 may map 1614 speaker location information (e.g., range, azimuth, elevation, and/or orientation of speakers) with the one or more acoustic RTFs (e.g., acoustic relative transfer function 618) of the acoustic relative transfer function codebook (e.g., acoustic relative transfer codebook 622). In this manner and as will be discussed in greater detail below, multi-channel compression process 10 may map a particular acoustic source location to a specific acoustic RTF codebook entry that may be selected at run-time.

Referring again to the example of FIG. 3, suppose the acoustic environment includes a doctor's office with the doctor's desk, a patient seating area, and an examination table. In this example, multi-channel compression process 10 may be configured to map 1614 one or more acoustic RTFs to each location within the acoustic environment. Additionally, suppose that acoustic RTF codebook 622 includes entries for various locations within the acoustic environment. In this example, multi-channel compression process 10 may be trained (e.g., via a machine learning model) or may automatically map 1614 the location information to the plurality of acoustic RTFs. In one example, multi-channel compression process 10 may update acoustic RTF codebook 622 to include location information for each relevant acoustic RTF codebook entry.

Multi-channel compression process 10 may estimate 1602, via a machine vision system, location information for an acoustic source within an acoustic environment. As discussed above, mixed-media ACD device 232 (and machine vision system 100/audio recording system 104 included therein) may be configured to monitor one or more encounter participants (e.g., encounter participants 226, 228, 230) of a patient encounter. Specifically, machine vision system 100 (either as a stand-alone system or as a component of mixed-media ACD device 232) may be configured to detect and track humanoid shapes within the above-described acoustic environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility). In addition to detecting and tracking humanoid shapes, machine vision system 100 may estimate 1602 location information for the detected acoustic sources within an acoustic environment.

For example and referring again to FIG. 3, suppose that a particular acoustic environment includes one or more acoustic sources (e.g., encounter participants 226, 228, 230, 236). In this example, multi-channel compression process 10 may estimate 1602 location information for each acoustic source using known methods for converting machine vision encounter information (e.g., machine vision encounter information 102) into location information within the acoustic environment (e.g., the relative coordinates of the acoustic source based on a coordinate system defined for the acoustic environment).

Multi-channel compression process 10 may select 1604 one or more acoustic relative transfer functions from a plurality of acoustic relative transfer functions for the plurality of audio acquisition devices of the audio recording system based upon, at least in part, the location information. Referring again to FIG. 3, suppose that e.g., four encounter participants are in a doctor's office: encounter participant 228 is seated near an examination table; encounter participants 226 is standing near the doctor's desk; and encounter participants 230 and 236 are seated in a patient waiting area. In this example, multi-channel compression process 10 may estimate 1602 the location information for each acoustic source (e.g., encounter participants 226, 228, 230, 236) as described above. Multi-channel compression process 10 may select 1604 one or more acoustic RTFs for the particular location information by generating 1608 the acoustic RTFs at run-time and/or by selecting acoustic RTFs from a plurality of generated acoustic RTFs.

Selecting 1604 one or more acoustic relative transfer functions from a plurality of acoustic relative transfer functions for the plurality of audio acquisition devices of the audio recording system based upon, at least in part, the location information may include selecting 1616 one or more acoustic relative transfer functions from a plurality of acoustic relative transfer functions for the plurality of audio acquisition devices of the audio recording system based upon, at least in part, the location information and the mapping of the location information to the plurality of acoustic relative transfer functions. In some implementations and continuing with the above example, multi-channel compression process 10 may identify corresponding acoustic RTFs from an acoustic RTF codebook (e.g., acoustic RTF codebook 622) based upon, at least in part, the location information estimated 1602 by machine vision system 100 and location information recorded in the acoustic RTF codebook for each entry. For example, multi-channel compression process 10 may compare the location information estimated 1602 by machine vision system 100 with location information associated or mapped to particular acoustic RTF codebook entries. In this example, multi-channel compression process 10 may select 1616 one or more acoustic RTF codebook entries corresponding to the location information for encounter participant 228; one or more acoustic RTF codebook entries corresponding to the location information for encounter participant 226; one or more acoustic RTF codebook entries corresponding to the location information for encounter participant 230; and one or more acoustic RTF codebook entries corresponding to the location information for encounter participant 236. While an example of e.g., four acoustic sources has been described, it will be appreciated that this is for example purposes only and that any number of acoustic RTFs may be selected 1616 for any number of acoustic sources within the scope of the present disclosure.

In this example, multi-channel compression process 10 may allow the location information estimated by the machine vision system (e.g., machine vision system 100) to drive the selection of particular acoustic RTFs for acoustic sources. In this manner, multi-channel compression process 10 may provide acoustic RTF selection using location information, thus bypassing the need to generate or estimate acoustic RTFs at run-time when the location information is mapped to an existing acoustic RTF/acoustic RTF codebook entry. However, it will be appreciated that multi-channel compression process 10 may generate 1608 or estimate acoustic RTFs at run-time, as necessary (e.g., in response to the location information not being mapped to a particular acoustic RTF/acoustic RTF codebook entry).

Multi-channel compression process 10 may transmit 1606 the encoded reference audio encounter information and a representation of the selected one or more acoustic relative transfer functions. As discussed above, many speech processing systems include front-end processing and back-end processing. In the example of ASR, front-end speech processing may generally include receiving speech signals and performing some signal processing to enhance the back-end speech processing. However, when extended to multi-channel speech processing systems, encoding each channel may result in either data loss through lossy compression or insufficient transmission bandwidth in lossless encoding. Accordingly, multi-channel compression process 10 may reduce the transmission bandwidth required for processing acoustic encounter information from a multi-channel audio recording system with a front-end and back-end speech processing system by transmitting 1606 the encoded reference audio encounter information (e.g., encoded reference audio encounter information 610) and a representation of the plurality of acoustic RTFs (e.g., plurality of acoustic RTFs 616).

In some implementations, transmitting 1606 the encoded reference audio encounter information and a representation of the selected one or more acoustic relative transfer functions may include one or more of: transmitting a vector of acoustic relative transfer functions; and transmitting a vector of acoustic relative transfer function codebook entries for the plurality of audio acquisition devices. Multi-channel compression process 10 may utilize an encoder/codec (e.g., acoustic relative transfer function encoder 626) to encode the selected one or more acoustic RTFs into a vector of acoustic RTFs. In this manner, multi-channel compression process 10 may transmit a vector of acoustic RTFs (e.g., vector of acoustic RTFs 628).

In addition to transmitting a vector of acoustic RTFs, multi-channel compression process 10 may transmit the plurality of residual signals. Similarly, multi-channel compression process 10 may utilize an encoder/codec (e.g., residual encoder 630) to encode the plurality of residual signals for transmitting to the back-end speech processing system. In the example of FIG. 6, residual encoder 630 may encode the plurality of residual signals to generate encoded plurality of residual signals 632. In some implementations, the residual encoder (e.g., residual encoder 630) may be configured to control the overall bit rate of transmission by allocating more or less bits to the encoding of the residual signals. The residual signals maybe be encoded using entropy coding techniques as is known in the art. However, it will be appreciated that any known encoding methodology may be used within the scope of the present disclosure.

Audio Visual Sensor Guided Multi-Channel Speech Compression

Figure 17:
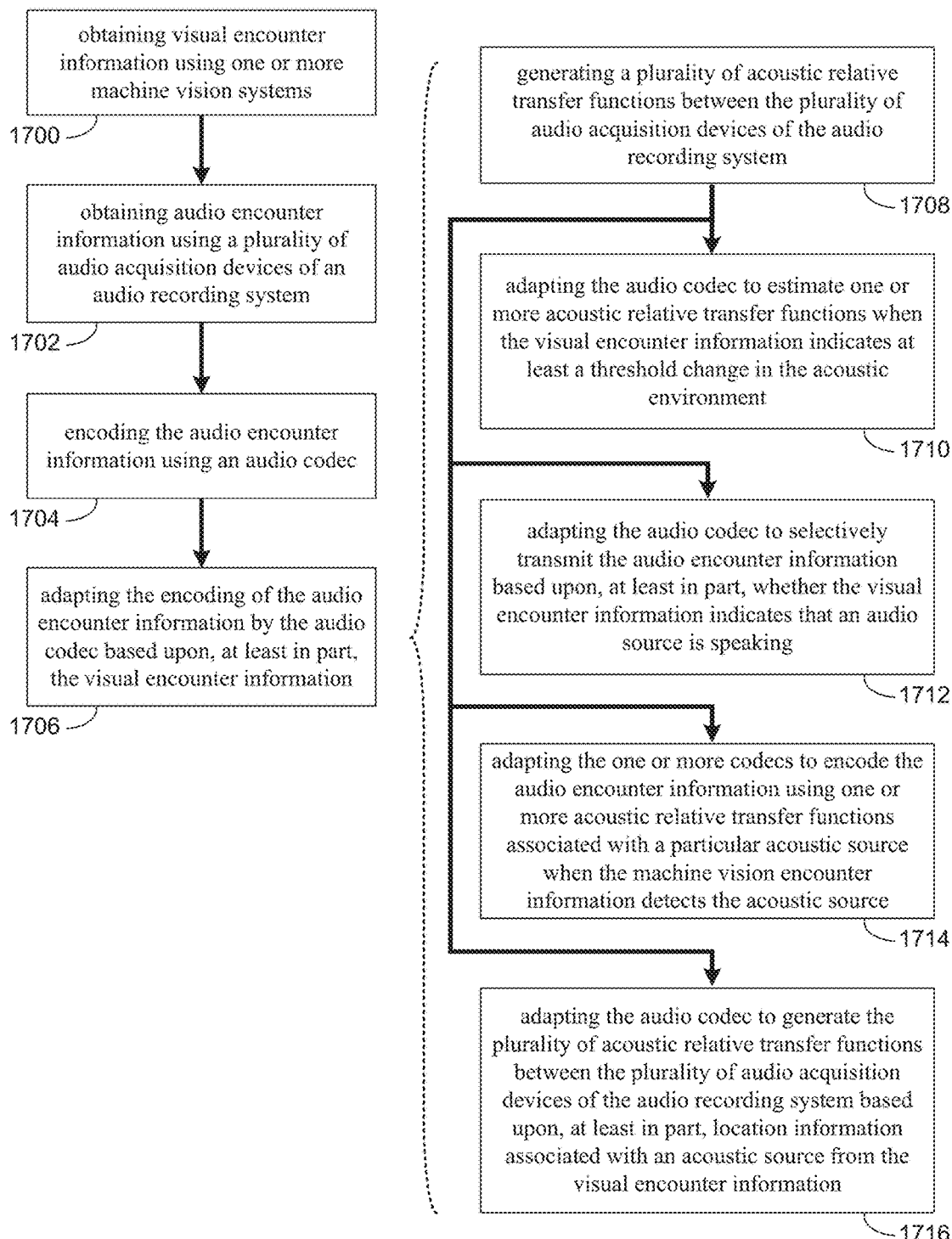

Referring also to FIG. 17, multi-channel compression process 10 may obtain 1700 machine vision encounter information using one or more machine vision systems. Audio encounter information may be obtained 1702 using a plurality of audio acquisition devices of an audio recording system. The audio encounter information may be encoded 1704 using an audio codec. The encoding of the audio encounter information by the audio codec may be adapted 1706 based upon, at least in part, the machine vision encounter information.

As discussed above, codecs may be used to perform encoding and compression of audio encounter information. However and as discussed above, transmission bandwidth between a front-end speech processing system and a back-end speech processing system is limited (i.e., longer latency results in poorer speech processing performance). As such, multi-channel compression process 10 may adapt one or more codecs for particular acoustic environments and/or based on observed activity within an acoustic environment. In this manner, multi-channel compression process 10 may utilize machine vision encounter information to adapt a codec to minimize unnecessary processing by the one or more codecs, thus resulting in better compression of audio encounter information. Accordingly, multi-channel compression process 10 may use this vision encounter information to adapt codec parameters for more efficient multi-channel audio encounter information compression.

Multi-channel compression process 10 may obtain 1700 machine vision encounter information using one or more machine vision systems. As discussed above, machine vision system 100 may be configured to obtain 1700 machine vision encounter information 102. For example, machine vision encounter information 102 may include location information of one or more acoustic sources; information concerning the movement of the one or more acoustic sources (e.g., encounter participant 226 is moving her head to the left); information concerning whether the acoustic source is speaking (e.g., detected mouth movement); and/or speaker identification information (e.g., encounter participant 226 is Doctor Jones). While examples of different types of machine vision encounter information 102 have been provided, it will be appreciated that these are for example purposes only and that any machine vision encounter information may be obtained within the scope of the present disclosure.

Multi-channel compression process 10 may obtain 1702 audio encounter information using a plurality of audio acquisition devices of an audio recording system. As discussed above, audio recording system 104 may be configured to obtain audio encounter information 106. Referring again to FIG. 5, audio recording system 104 may include a plurality of discrete audio acquisition devices (e.g., audio acquisition devices 202, 204, 206, 208, 210, 212, 214, 216, 218) configured to obtain 1702 audio encounter information 106A in the form of a plurality of speech signals (e.g., speech signals 500, 502, 504, 506, 508, 510, 512, 514, 516), respectively.

Multi-channel compression process 10 may encode 1704 the audio encounter information using one or more codecs. As discussed above, encoding audio encounter information may generally include the process of compressing, and reformatting data from one form to a target form. For example, multi-channel compression process 10 may encode 1704 audio encounter information obtained by a reference audio acquisition device (e.g., reference audio acquisition device 202) to compress the audio encounter information (e.g., speech signal 500) for more efficient transmission to a speech processing system back-end (e.g., represented in FIG. 6 as ACD compute system 12). To encode 1704 speech signal 500 obtained by audio acquisition device 202, multi-channel compression process 10 may utilize any codec (e.g., a lossy codec, lossless codec, etc.). In the example of FIG. 6, this codec may be represented by reference encoder 608. It will be appreciated that any codec/encoder may be used to encode 1704 speech signal 500 to generate encoded reference audio encounter information (e.g., encoded audio encounter information 610). In addition and as discussed above, multi-channel compression process 10 may encode the plurality of acoustic RTFs into a vector of acoustic RTFs using an encoder/codec (e.g., acoustic relative transfer function encoder 626). In this manner, multi-channel compression process 10 may transmit a vector of acoustic RTFs (e.g., vector of acoustic RTFs 628) representative of the plurality of acoustic RTFs.

Similarly, multi-channel compression process 10 may utilize an encoder/codec (e.g., residual encoder 630) to encode the plurality of residual signals for transmitting to the back-end speech processing system. In the example of FIG. 6, residual encoder 630 may encode the plurality of residual signals to generate encoded plurality of residual signals 632. In some implementations, the residual encoder (e.g., residual encoder 630) may be configured to control the overall bit rate of transmission by allocating more or less bits to the encoding of the residual signals.

As discussed above, multi-channel compression process 10 may reduce the transmission bandwidth required for processing acoustic encounter information from a multi-channel audio recording system with a front-end and back-end speech processing system. For example, conventional approaches to single channel speech processing across front-end and back-end systems generally includes encoding the individual channel for efficient transmission from a receiving front-end speech processing system for further processing by a back-end speech processing system. However, when extended to multi-channel speech processing systems, encoding each channel may result in either data loss through lossy compression or insufficient transmission bandwidth in lossless encoding. Accordingly, implementations of the present disclosure may adapt the encoding of the reference audio encounter information and representations of the other channels for efficient transmitting to the multi-channel speech processing system.

Multi-channel compression process 10 may adapt 1706 the encoding of the audio encounter information by the one or more codecs based upon, at least in part, the machine vision encounter information. For example and as described above, machine vision encounter information 102 may include information that may enhance the encoding of the audio encounter information. In one example, machine vision encounter information 102 may indicate that an acoustic source has left the acoustic environment and/or is no longer speaking. In this example, multi-channel compression process 10 may adapt 1706 the encoding of the audio encounter information to cease encoding particular audio encounter information when an acoustic source has left the acoustic environment and/or when the acoustic source is not speaking. Accordingly and in this example, the encoding and compression of audio encounter information 106 may be improved. As will be described in greater detail below, adapting 1706 the encoding of audio encounter information 106 may generally include adapting 1706 one or more parameters of any of reference encoder 608; acoustic RTF encoder 626; and/or residual encoder 628) based upon, at least in part, machine vision encounter information 102.

Multi-channel compression process 10 may generate 1708 a plurality of acoustic relative transfer functions between the plurality of audio acquisition devices of the audio recording system. As discussed above and referring again to FIGS. 5-6, multi-channel compression process 10 may generate 1708 a plurality of acoustic RTFs (e.g., plurality of acoustic RTFs 616) associated with a plurality of audio acquisition devices (e.g., audio acquisition devices 202, 204, 206, 208, 210, 212, 214, 216, 218) of an audio recording system (e.g. audio recording system 104). As shown in FIG. 5, audio acquisition device 202 may obtain speech signal 500; audio acquisition device 204 may obtain speech signal 502; audio acquisition device 206 may obtain speech signal 504; audio acquisition device 208 may obtain speech signal 506; audio acquisition device 210 may obtain speech signal 508; audio acquisition device 212 may obtain speech signal 510; audio acquisition device 214 may obtain speech signal 512; audio acquisition device 216 may obtain speech signal 514; and audio acquisition device 218 may obtain speech signal 516. Referring again to FIG. 6, multi-channel compression process 10 may generate 1708 plurality of acoustic RTFs 616 in the manner described above.

Adapting 1706 the encoding of the audio encounter information by the one or more codecs based upon, at least in part, the machine vision encounter information may include adapting 1710 the one or more codecs to estimate one or more acoustic relative transfer functions when the machine vision encounter information indicates at least a threshold change in the acoustic environment. For example, suppose the machine vision encounter information (e.g., machine vision encounter information 102) indicates a change in the acoustic environment (i.e., encounter participant 226 moves to a different location within the acoustic environment). In this example, multi-channel compression process 10 may use machine vision encounter information 102 to guide the one or more codecs (e.g., reference encoder 608; acoustic RTF encoder 626; and/or residual encoder 628) to estimate/generate acoustic RTFs to address the new acoustic source location within the acoustic environment. As discussed above, multi-channel compression process 10 may generate new acoustic RTFs and/or may estimate a different acoustic RTF from an acoustic RTF codebook (e.g., acoustic RTF codebook 622).

Adapting 1706 the encoding of the audio encounter information by the one or more codecs based upon, at least in part, the machine vision encounter information may include adapting 1712 the one or more codecs to selectively encode the audio encounter information based upon, at least in part, whether the machine vision encounter information indicates that an audio source is speaking. For example, suppose the machine vision encounter information (e.g., machine vision encounter information 102) indicates that an audio source is speaking. In this example, multi-channel compression process 10 may use machine vision encounter information 102 to guide the one or more codecs (e.g., reference encoder 608; acoustic RTF encoder 626; and/or residual encoder 628) to encode the audio encounter information as the acoustic source is speaking. In another example, suppose machine vision encounter information 102 indicates that an audio source is not speaking. In this example, multi-channel compression process 10 may use machine vision encounter information 102 to guide the one or more codecs (e.g., reference encoder 608; acoustic RTF encoder 626; and/or residual encoder 628) to not encode the audio encounter information as the acoustic source is not speaking. For example, multi-channel compression process 10 may direct the one or more codecs to enter a "DTX" or "do not transmit" mode. In this manner, multi-channel compression process 10 may prevent unnecessary encoding of audio encounter information when acoustic sources are not speaking.

Adapting 1706 the encoding of the audio encounter information by the one or more codecs based upon, at least in part, the machine vision encounter information may include adapting 1714 the one or more codecs to encode the audio encounter information using one or more acoustic relative transfer functions associated with a particular acoustic source when the machine vision encounter information detects the acoustic source. For example, suppose that machine vision encounter information 102 detects a particular acoustic source (e.g., the acoustic source is encounter participant 226 (i.e., Doctor Jones)). In this example, multi-channel compression process 10 may adapt 1706 the one or more codecs (e.g., reference encoder 608; acoustic RTF encoder 626; and/or residual encoder 628) to encode audio encounter information 106 using one or more acoustic RTFs associated with the particular acoustic source (i.e., Doctor Jones). For example, suppose that multi-channel compression process 10 generates an acoustic RTF codebook with one or more acoustic RTFs associated with particular encounter participants (e.g., encounter participants 226, 228, 230, 236) and that encounter participant 226 is Doctor Jones. In this example, multi-channel compression process 10 may adapt 1706 the one or more codecs to encode audio encounter information 106 using the one or more acoustic RTFs associated with Doctor Jones.

Adapting 1706 the encoding of the audio encounter information by the one or more codecs based upon, at least in part, the machine vision encounter information may include adapting 1716 the one or more codecs to generate the plurality of acoustic relative transfer functions between the plurality of audio acquisition devices of the audio recording system based upon, at least in part, location information associated with an acoustic source from the machine vision encounter information. For example, suppose that machine vision encounter information 102 includes location information for a particular acoustic source (e.g., as the new acoustic source enters the acoustic environment). In this example, multi-channel compression process 10 may adapt 1706 the one or more codecs (e.g., reference encoder 608; acoustic RTF encoder 626; and/or residual encoder 628) with the location information (e.g., azimuth) such that the one or more codecs can use that information to initialize the acoustic RTF vector and thus converge much more quickly. In another example where the generation of acoustic RTFs is performed by a machine learning model, this side information (i.e. azimuth) may help improve the acoustic RTF estimate (i.e., the acoustic RTF may be generated more quickly and more accurately).

While multiple examples of particular machine vision encounter information and corresponding adaptations to the one or more codecs have been described, it will be appreciated that these are for example purposes only and that multi-channel compression process 10 may utilize machine vision encounter information to adapt 1706 the one or more codes in various ways within the scope of the present disclosure.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   generating a plurality of acoustic relative transfer functions associated with a plurality of audio acquisition devices of an audio recording system deployed in an acoustic environment, wherein generating the plurality of acoustic relative transfer functions includes generating a plurality of residual signals associated with the plurality of audio acquisition devices based upon, at least in part, the acoustic relative transfer functions for each audio acquisition device of the plurality of audio acquisition devices;
   comparing the plurality of acoustic relative transfer functions from at least a pair of time frames; and
   detecting a change in the acoustic environment based upon, at least in part, the comparison of the plurality of acoustic relative transfer functions from at least the pair of time frames from the plurality of acoustic relative transfer functions, wherein detecting the change in the acoustic environment includes:
      comparing the plurality of residual signals from at least a pair of time frames; and
      detecting a change in the acoustic environment based upon, at least in part, the comparison of the plurality of residual signals from at least the pair of time frames.

2. The computer-implemented method of claim 1, wherein the plurality of audio acquisition devices of the audio recording system are positioned within a fixed geometry relative to each other.

3. The computer-implemented method of claim 1, wherein detecting a change in the acoustic environment based upon, at least in part, the comparison of the plurality of acoustic relative transfer functions from at least the pair of time frames includes determining at least a threshold change in the acoustic relative transfer functions between the at least a pair of time frames.

4. The computer-implemented method of claim 1, further comprising:
   training a machine learning model to output a change classification based upon, at least in part, the plurality of acoustic relative transfer functions from at least the pair of time frames.

5. The computer-implemented method of claim 4, wherein detecting a change in the acoustic environment based upon, at least in part, the comparison of the plurality of acoustic relative transfer functions from at least the pair of time frames includes detecting the change in the acoustic environment using the trained machine learning model.

6. A computer program product comprising a non-transitory computer readable medium having a plurality of instructions stored thereon which, when executed by a processor, cause the processor to perform operations comprising:
   generating a plurality of acoustic relative transfer functions associated with a plurality of audio acquisition devices of an audio recording system deployed in an acoustic environment, wherein generating the plurality of acoustic relative transfer functions includes generating a plurality of residual signals associated with the plurality of audio acquisition devices based upon, at least in part, the acoustic relative transfer functions for each audio acquisition device of the plurality of audio acquisition devices;
   comparing the plurality of acoustic relative transfer functions from at least a pair of time frames; and
   detecting a change in the acoustic environment based upon, at least in part, the comparison of the plurality of acoustic relative transfer functions from at least the pair of time frames from the plurality of acoustic relative transfer functions, wherein detecting the change in the acoustic environment includes:
      comparing the plurality of residual signals from at least a pair of time frames; and
      detecting a change in the acoustic environment based upon, at least in part, the comparison of the plurality of residual signals from at least the pair of time frames.

7. The computer program product of claim 6, wherein the plurality of audio acquisition devices of the audio recording system are positioned within a fixed geometry relative to each other.

8. The computer program product of claim 6, wherein detecting a change in the acoustic environment based upon, at least in part, the comparison of the plurality of acoustic relative transfer functions from at least the pair of time frames includes determining at least a threshold change in the acoustic relative transfer functions between the at least a pair of time frames.

9. The computer program product of claim 6, wherein the operations further comprise: training a machine learning model to output a change classification based upon, at least in part, the plurality of acoustic relative transfer functions from at least the pair of time frames.

10. The computer program product of claim 9, wherein detecting a change in the acoustic environment based upon, at least in part, the comparison of the plurality of acoustic relative transfer functions from at least the pair of time frames includes detecting the change in the acoustic environment using the trained machine learning model.

11. A computing system comprising:
a memory; and
a processor configured to generate a plurality of acoustic relative transfer functions associated with a plurality of audio acquisition devices of an audio recording system deployed in an acoustic environment, wherein generating the plurality of acoustic relative transfer functions includes generating a plurality of residual signals associated with the plurality of audio acquisition devices based upon, at least in part, the acoustic relative transfer functions for each audio acquisition device of the plurality of audio acquisition devices, wherein the processor is further configured to compare the plurality of acoustic relative transfer functions from at least a pair of time frames, and wherein the processor is further configured to detect a change in the acoustic environment based upon, at least in part, the comparison of the plurality of acoustic relative transfer functions from at least the pair of time frames from the plurality of acoustic relative transfer functions, wherein detecting the change in the acoustic environment includes: comparing the plurality of residual signals from at least a pair of time frames, and detecting a change in the acoustic environment based upon, at least in part, the comparison of the plurality of residual signals from at least the pair of time frames.

12. The computing system of claim 11, wherein the plurality of audio acquisition devices of the audio recording system are positioned within a fixed geometry relative to each other.

13. The computing system of claim 11, wherein detecting a change in the acoustic environment based upon, at least in part, the comparison of at least the pair of time frames from the plurality of acoustic relative transfer functions includes determining at least a threshold change in the acoustic relative transfer functions between the at least a pair of time frames.

14. The computing system of claim 11, wherein the processor is further configured to:
train a machine learning model to output a change classification based upon, at least in part, the plurality of acoustic relative transfer functions from at least the pair of time frames.

15. The computing system of claim 14, wherein detecting a change in the acoustic environment based upon, at least in part, the comparison of the plurality of acoustic relative transfer functions from at least the pair of time frames includes detecting the change in the acoustic environment using the trained machine learning model.

\* \* \* \* \*